United States Patent [19]
Taylor et al.

[11] Patent Number: 5,848,184
[45] Date of Patent: Dec. 8, 1998

[54] DOCUMENT PAGE ANALYZER AND METHOD

[75] Inventors: Suzanne Amy Taylor, West Chester; Mark Lipshutz, Philadelphia, both of Pa.

[73] Assignee: Unisys Corporation, Blue Bell, Pa.

[21] Appl. No.: 496,917

[22] Filed: Jun. 30, 1995

Related U.S. Application Data

[63] Continuation of Ser. No. 31,794, Mar. 15, 1993, abandoned.

[51] Int. Cl.$^6$ ............................................ G06K 9/34
[52] U.S. Cl. ....................... 382/173; 382/180; 707/517
[58] Field of Search ..................... 364/419.06, 419.05, 364/419.08, 419.1, 419.19; 395/144–148, 100, 116; 382/173, 176, 177, 178, 180, 284, 305, 312, 321; 707/500, 513–514, 517–525; 358/462

[56] References Cited

U.S. PATENT DOCUMENTS

| 4,730,252 | 3/1988 | Bradshaw | 364/403 |
| 4,803,651 | 2/1989 | Galkowski | 395/500 |

(List continued on next page.)

OTHER PUBLICATIONS

Data Sources Software Catalog, 1$^{st}$ Edition 1990—vol. 2, pp. J–515 to J–516 and J–583 to J–588.

S. Tsujimoto and H. Asada, "Understanding Multi–Articled Documents" in *10th International Conference on Pattern Recognition* (IEEE, Atlantic City, NJ) 16–21 Jun. 1990, pp. 551–556.

J. A. Pastor and S. L. Taylor, "Recognizing Structured Forms Using Neural Networks" in *International Joint Conference on Neural Networks*, Seattle, WA 1991.

W. Lam and D. Niyogi, *Block Segmentation of Document Images Using the X–Y Tree Approach*. Tech. Report TR88–14, Department of Computer Science, State University of New York at Buffalo, Buffalo, NY, Jun. 1988.

S. L. Taylor, M. Lipshutz and C. Weir, "Document Structure Interpretation by Integrating Multiple Knowledge Sources" in *Proceedings: Symposium on Document Analysis and Information Retrieval* (University of Nevada, Las Vegas, Las Vegas, NV, Mar. 16–18, 1992) pp. 58–76.

S. L. Taylor and R. Fritzson, "Registration and Region Extraction of Data from Forms" in *Proceedings: 11th IAPR International Conference on Pattern Recognition*, the Hague, the Netherlands, Aug. 30–Sep. 3, 1992 (IEEE Computer Society Press, Los Alamitos, CA, 1992) pp. 173–176.

(List continued on next page.)

*Primary Examiner*—Leo H. Boudreau
*Assistant Examiner*—Bhavesh Mehta
*Attorney, Agent, or Firm*—John B. Sowell; Mark T. Starr; Steven B. Samuels

[57] ABSTRACT

Apparatus and method are provided which determine the geometric and logical structure of a document page from its image. The document image is partitioned into regions (both text and non-text) which are then organized into related "article" groups in the correct reading order. The invention uses image-based features, text-based features, and assumptions based on knowledge of expected layout, to find the correct reading order of the text blocks on a document page. It can handle complex layouts which have multiple configurations of columns on a page and inset material (such as figures and inset text blocks). The apparatus comprises two main components, a geometric page segmentor and a logical page organizer. The geometric page segmentor partitions a binary image of a document page into fundamental units of text or non-text, and produces a list of rectangular blocks, their locations on the page in points ($\frac{1}{72}$ inch), and the locations of horizontal rule lines on the page. The logical page organizer receives a list of text region locations, rule line locations, associated ASCII text (as found from an OCR) for the text blocks, and a list of text attributes (such as face style and point size). The logical page organizer groups appropriately the components (both text and non-text) which comprise a document page, sequences them in a correct reading order and establishes the dominance pattern (e.g., find the lead article on a newspaper page).

5 Claims, 26 Drawing Sheets

U.S. PATENT DOCUMENTS

| | | | |
|---|---|---|---|
| 4,928,252 | 5/1990 | Gabbe et al. | 395/102 |
| 4,937,439 | 6/1990 | Wanninger et al. | 235/456 |
| 4,964,030 | 10/1990 | Suzuki et al. | 364/416.06 |
| 4,965,763 | 10/1990 | Zamora | 364/419.19 |
| 4,974,260 | 11/1990 | Rudak | 382/57 |
| 4,980,829 | 12/1990 | Okajima et al. | 364/419.05 |
| 5,001,653 | 3/1991 | Buchanan et al. | 395/102 |
| 5,018,083 | 5/1991 | Watanabe et al. | 395/147 |
| 5,038,392 | 8/1991 | Morris et al. | 382/61 |
| 5,043,891 | 8/1991 | Goldstein et al. | 364/419.1 |
| 5,073,953 | 12/1991 | Westdijk | 382/176 |
| 5,164,899 | 11/1992 | Sobotka et al. | 364/419.08 |
| 5,167,016 | 11/1992 | Bagley et al. | 395/144 |
| 5,179,650 | 1/1993 | Fukui et al. | 395/148 |
| 5,181,162 | 1/1993 | Smith et al. | 364/419.19 |
| 5,185,698 | 2/1993 | Hesse et al. | 364/419.1 |
| 5,185,813 | 2/1993 | Tsujimoto | 382/180 |
| 5,191,525 | 3/1993 | LeBrun et al. | 364/419.1 |
| 5,191,613 | 3/1993 | Graziano et al. | 380/25 |
| 5,193,147 | 3/1993 | Amari et al. | 395/145 |
| 5,222,236 | 6/1993 | Potash et al. | 395/600 |
| 5,228,121 | 7/1993 | Fontaine et al. | 395/145 |
| 5,335,087 | 8/1994 | Cho | 358/432 |
| 5,335,290 | 8/1994 | Cullen et al. | 382/180 |
| 5,369,716 | 11/1994 | Sangu | 382/317 |
| 5,555,362 | 9/1996 | Yamashita et al. | 395/779 |
| 5,613,016 | 3/1997 | Saitoh | 382/174 |
| 5,680,479 | 10/1997 | Wang et al. | 382/180 |
| 5,701,500 | 12/1997 | Ikeo et al. | 382/180 |

OTHER PUBLICATIONS

P. H. Winston "Image Understanding" in *Artificial Intelligence*, 2nd ed. (Addison–Wesley, Reading, MA, 1984) pp. 335–383.

S. C. Hinds, J. L. Fisher and D. P. D'Amato, "A Document Skew Detection Method Using Run–Length Encoding and the Hough Transform" in *10th International Conference on Pattern Recognition* Atlantic City, NJ, 16–21 Jun. 1990 (IEEE Computer Society Press, Los Alamitos, CA, 1990), pp. 464–468.

J. L. Fisher, S. C. Hinds and D. P. D'Amato, "A Rule–Based System for Document Image Segmentation" in *10th International Conference on Pattern Recognition*, Atlantic City, NJ, 16–21 Jun. 1990 (IEEE Computer Society Press, Los Alamitos, CA, 1990) pp. 567–572.

K. Y. Wong, R. G. Casey and F. M. Wahl, "Document Analysis System" in *IBM Journal of Research and Development*, vol. 26, No. 6, Nov. 1982, pp. 647–656.

S. L. Taylor, R. Fritzson and J. A. Pastor "Extraction of Data from Preprinted Forms" in *Machine Vision and Applications*, vol. 5, No. 3, Summer 1992, pp. 211–222.

A COMBINATION APPROACH IS USED FOR GEOMETRIC SEGMENTATION

X-Y PARTITIONING

RLSA/CONNECTED COMPONENTS

COMBINATION APPROACH

*CONNECTED COMPONENT BOUNDING BOXES ARE MERGED TOGETHER TO FORM LARGER BOUNDING BOXES*

CLUSTER THE BLOCKS BY STARTING X VALUE:
  [[A,B], [C,D,E], [F,G], [H,I], [J]]
CONSTRUCT ALL POSSIBLE COLUMN CHAINS:
  B    E    F    H
  B    D         H
  B    C
  B    E    G         J
  B    E    F    I    J
CHOSE THE CHAIN CORRESPONDING TO THE LARGEST AREA:
  B    D         H

*A "CHAINING" PROCEDURE IS USED TO DETERMINE COLUMN BOUNDARIES*

COARSE SEGMENTATION DEFINES THE COLUMN
BANDS OF THE EXAMPLE IN FIGURE 2

TREE CONSTRUCTION WITH NON-COLUMN-ALIGNED
INSET BLOCKS IS SIMPLIFIED BY SEPARATING
THE INSET BLOCKS

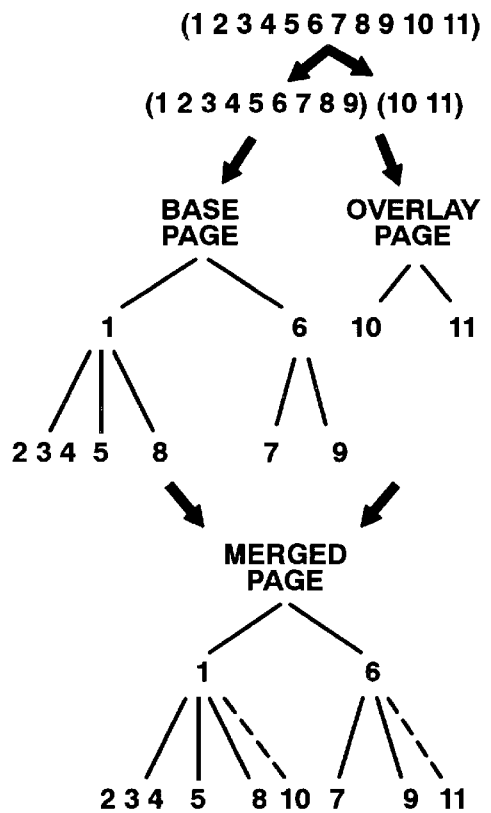
THE USE OF AN "OVERLAY" PLANE
REDUCES FRAGMENTATION
*Figure 9*
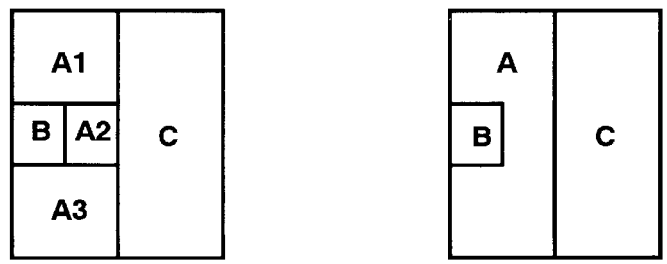
SEGMENTATION
WITHOUT OVERLAY
SEGMENTATION
UNDER OVERLAY
*Figure 10*
*Figure 11*

INSET BOXES ARE CLASSIFIED BY EXTENT AND LOCATION

ZONING IS MORE DIFFICULT WHEN INSET BOXES ARE PRESENT

STEP 100: DETECT AND REMOVE LINES

STEP 101: XY TREE SEGMENTATION

STEP 102: RUN-LENGTH SMOOTHING ALGORITHM

STEP 103: CONNECTED COMPONENT ANALYSIS

STEP 104: MERGING

STEP 105: OPTICAL CHARACTER RECOGNITION

STEP 106: FIND BLOCK FEATURES

STEP 107: FIND PAGE FEATURES

STEP 108: DETERMINE COLUMN BOUNDARIES

STEP 111: COLUMN CHAINS

STEP 112: COLUMN CHAIN INDUCTIVE STEP

STEP 109: CREATE GEOMETRIC STRUCTURE TREE

STEP 113: DETERMINE GEOMETRIC STRUCTURE TREE

STEP 114: BLOCK/COLUMN ALIGNMENT TEST

STEP 115: BUILD GEOMETRIC STRUCTURE TREE

STEP 116: BUILD GEOMETRIC STRUCTURE TREE
INITIAL STEP

STEP 117: BUILD GEOMETRIC STRUCTURE TREE
INDUCTIVE STEP

**STEP 118: BUILD GEOMETRIC STRUCTURE TREE
FIND NODE CHILDREN**

STEP 110: LOGICAL TRANSFORMATION

DOCUMENT PAGE ANALYZER AND METHOD

This application is a continuation of application Ser. No. 08/031,794 filed Mar. 15, 1993, now abandoned.

A portion of the disclosure of this patent document contains material which is subject to copyright protection. The owner has no objection to the facsimile reproduction by anyone of the patent document or the patent disclosure, as it appears in the U.S. Patent and Trademark Office patent file or records, but otherwise reserves all copyright rights whatsoever.

FIELD OF THE INVENTION

The present invention relates to information processing, and more particularly to processing of documents or other visibly processable media, for example for capture and storage of the content of same. The present invention also relates to computers and data processing systems, and more particularly to applications of same to social sciences such as linguistics, documentation or humanities. The present invention also relates to document processing, document understanding, optical character recognition, and image or document layout analysis and segmentation.

BACKGROUND OF THE INVENTION

Electronic storage of documents saves storage space and facilitates their retrieval and manipulation. One means of capturing documents electronically so that they can be so stored is the optical character reader (OCR). There is now (and undoubtedly will be in the future) a large body of paper documents which have never existed or are not readily available in electronic form. Capturing them electronically supports a myriad of uses such as editing/reformatting, reconstruction, routing, retrieval, summarizing and even simple preservation if paper copies are suffering degradation. The OCR process actually comprises two steps: (1) a scanning of the document page to create a bitmap image or array of pixels; and (2) the interpretation of any text contained in the bitmap into a stream of distinct alphanumeric characters, a form which is human readable as well as machine manipulable.

One standard format for representing alphanumeric characters, punctuation marks, etc. as a series of bits is the American Standard Code of Information Interchange (ASCII). The scan produces a digital, bit map version of the image which can then be stored in a digital memory such as a random access memory (RAM). However, a major problem with optical character readers is that they cannot always automatically determine the correct scanning pattern of complex document page layouts in order to retain the proper reading order of the document. Instead, the user must either indicate the reading order via a manual interface before a document page is scanned, or else must correct the ASCII output from the OCR at the conclusion of the OCR scan. It is preferred to determine the reading order of the components which comprise a document page before any OCR processing. According to S. Tsujimoto and H. Asada "Understanding Multi-Articled Documents" in 10*th International Conference on Pattern Recognition* (IEEE, Atlantic City, N.J.), 16–21 Jun., 1990, pp. 551–556, the reading order is a product of the logical structure which in turn is produced by a geometric to logical transformation. This article is hereby incorporated by reference herein. In the article, Tsujimoto and Asada define head blocks as those which serve in some way as labels or pointers, such as headlines and captions. Body blocks are defined as those which are referenced by head blocks and which have substantive content. The findings of the Tsujimoto and Asada article, however, are predicated on and constrained by two physical properties of a traditional (manually composed) newspaper layout:

(1) It has a single partitioning into (usually equal width) columns whose boundaries are consistent all the way down the page; and (2) Its printed entities are all column aligned. These, in turn, are predicated on the fact that the underlying organizing principle of western language document pages is a columnar orientation.

It is therefore necessary to automatically interpret the structure or layout of a document in a manner that can be electronically captured and stored. The present invention fulfills this need.

SUMMARY OF THE INVENTION

Accordingly, an object of present invention is to provide apparatus and method for interpretation of document structure.

Another object of the present invention is to provide apparatus and method for determining the geometric and logical structure of a document page from its image.

A further object of the present invention is to provide apparatus and method for automatically putting the text of a document into the correct reading order for a given document page, even for complex layouts, thereby removing the need for a manual operation.

Another object of the present invention is provide apparatus and method for automatically putting both text portions and non-text portions of a document into the correct reading order for a given document page, even for complex layouts, thereby removing the need for a manual operation.

A still further object of the present invention is to provide apparatus and method for determining column (sidewall) boundaries.

Still another object of the present invention is to provide apparatus and method for determining structure of document pages which have multiple sets of column bounds.

Yet another object of the present invention is to provide apparatus and method for structural interpretation of document pages which have inset blocks which do not adhere to column (sidewall) boundaries on at least one side.

Briefly, these and other objects of the present invention are accomplished by apparatus and method which determine the geometric and logical structure of a document page from its image. The document image is partitioned into regions (both text and non-text) which are then organized into related "article" groups in the correct reading order. The invention uses image-based features, text-based features, and assumptions based on knowledge of expected layout, to find the correct reading order of the text blocks on a document page. It can handle complex layouts which have multiple configurations of columns on a page and inset material (such as figures and inset text blocks). The apparatus comprises two main components, a geometric page segmentor and a logical page organizer. The geometric page segmentors partitions a binary image of a document page into fundamental units of text or non-text, and produces a list of rectangular blocks, their locations on the page in points (1/72 inch), and the locations of horizontal rule lines on the page. The logical page organizer receives a list of text region locations, rule line locations, associated ASCII text (as found from an OCR) for the text blocks, and a list of text attributes (such as face style and point size). The logical page organizer groups appropriately the components (both text and non-text) which comprise a document page, sequences them in the correct reading order and establishes the dominance pattern (e.g., find the lead article on a newspaper page).

Other objects, advantages and novel features of the invention will become apparent from the following detailed description of the invention when considered in conjunction with the accompanying drawings wherein:

BRIEF DESCRIPTION OF THE DRAWINGS

In the drawings,

FIG. 9 shows construction of a tree for the structure of FIG. 8 according to the present invention;

FIG. 10 illustrates another example of a segmentation;

FIG. 11 illustrates an alternative segmentation for the document of FIG. 10 utilizing an overlay plane to reduce fragmentation;

DESCRIPTION OF THE PREFERRED EMBODIMENT

Figure 1:
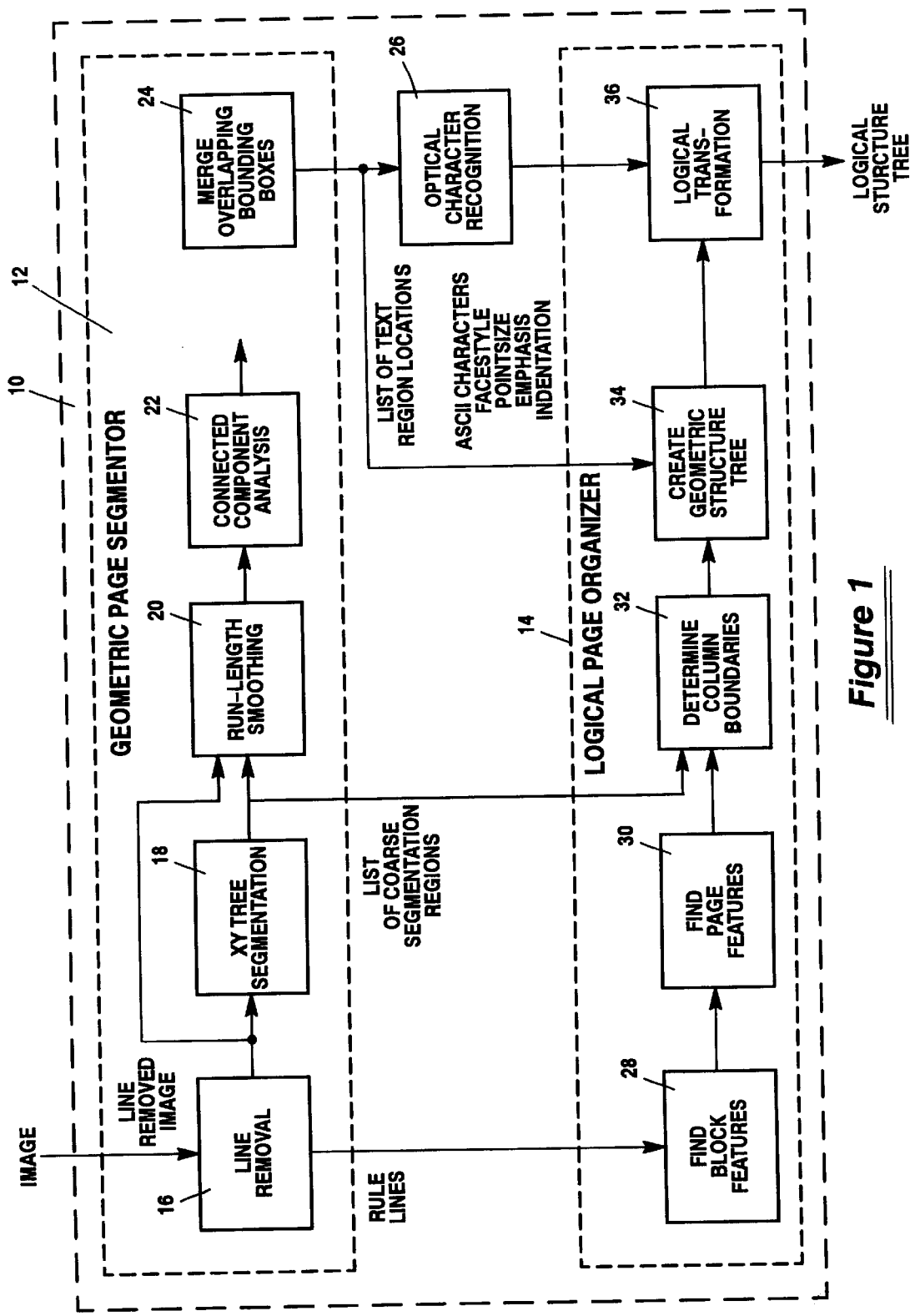
FIG. 1 is a system block diagram of a document page analyzer according to the present invention.

Referring now to the drawings, wherein like reference characters designate like or corresponding parts throughout the several views, there is shown in FIG. 1 a document page analyzer 10 according to the present invention including a geometric page segmentor 12 and a logical page organizer 14. Analysis is the process of breaking up an entity into its component parts and determining how those components relate to one another. Analyzer 10 performs a structural analysis of a document page by segmenting it into rectangular blocks (geometric page segmentor 12) and organizing those blocks logically (logical page organizer 14) to determine groupings, dominance and precedence—i.e., the aspects of reading order.

Figure 1A:
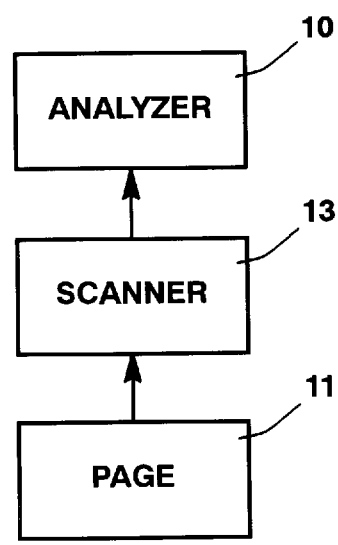
FIG. 1A illustrates a document capture system according to the present invention and including the analyzer of FIG. 1.
Figure 14:
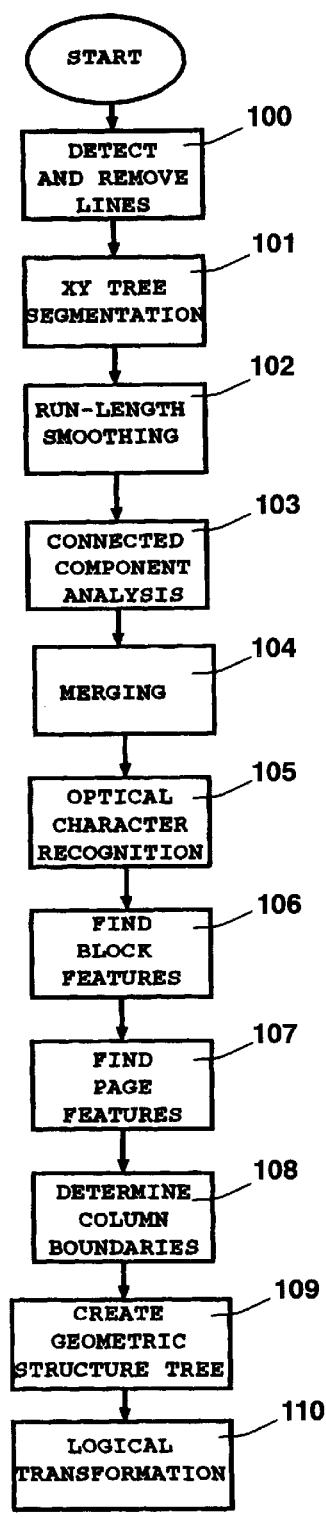
FIG. 14 is a flowchart showing sequence of operation of the analyzer of FIG. 1.

Analyzer 10 determines the geometric and logical structure of a document page from its image. FIG. 1A shows one example of how such a document image could be generated. In FIG. 1A, a document page 11 is optically scanned by scanner 13, which in response produces, and provides to analyzer 10, a signal representing a bitmap for document page 11. The document image is partitioned into text regions or blocks which are then organized into related "article" groups in the correct reading order. As further discussed below, analyzer 10 uses image-based features, text-based features, and assumptions based on knowledge of expected layout, to find the correct reading order of the text blocks on a document page. Sequence of operation of analyzer 10 is shown in FIG. 14.

Geometric page segmentor 12 includes line removal module 16, X-Y tree segmentor 18, run-length smoother 20, connected component module 22 and merger 24. Segmentor 12 is provided with a binary image (bit-map) of a document page. Segmentor 12 partitions this document image into fundamental units of text or non-text. Non-text units include figures, graphics, halftones, etc. Preferably, segmentor 12 forms text units by merging adjacent portions of text with similar physical attributes, such as font size and spacing, within the framework of the physical layout of the document. The final output of segmentor 12 is a list of rectangular blocks, their locations on the page in points (1/72 inch), and the locations of horizontal rule lines on the page.

Figure 15:
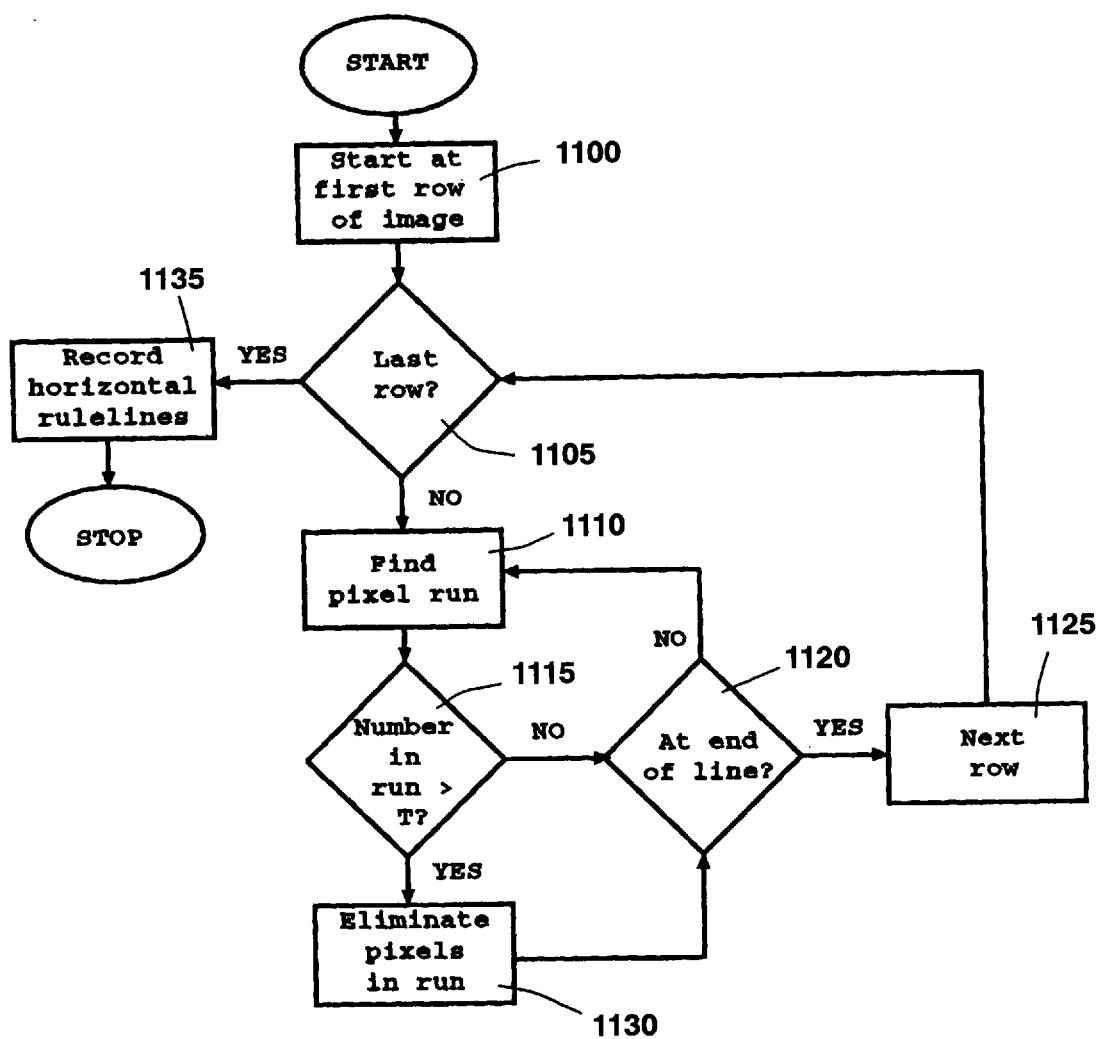
FIG. 15 is a flowchart showing, in greater detail, sequence of operation of step 100 of FIG. 14.

Line removal module 16 removes horizontal and vertical lines from a document image by detecting consecutive runs of at least a specified number (such as 40) ink pixels in the image. FIG. 15 shows sequence of operation of module 16. The locations of the horizontal rule lines (represented by a start coordinate and an end coordinate) are recorded for subsequent input to logical page organizer 14. Broken pieces of the same horizontal rule line are merged. The output of line removal module 16 is (1) an image with horizontal and vertical lines removed (which goes to the X-Y tree segmentation module 18 and run-length smoothing module 20) and (2) a list of end-points for horizontal rule lines (which goes to logical page organizer 14).

A global approach (X-Y tree segmentation) is then used to produce a coarse geometric segmentation of the image. Run-length smoothing with connected component analysis is performed on each of these coarse regions, guided by parameter values based on the output from the X-Y segmentation. Connected components are then merged into large regions based on their bounding boxes. Both the coarse segmentation produced by X-Y tree segmentor 18, and the finer grained connected-component-based segmentation produced by merger 24, are inputs for the geometric to logical transformation of logical page organizer 14. In addition, horizontal rule lines in the document images are located and used as extra cues for the logical transformation provided by organizer 14. Horizontal rule lines are represented as a special case of rectangle outputs which have a height of one pixel. A pixel is a picture element, or the smallest possible unit on a page or screen.

Figure 2:
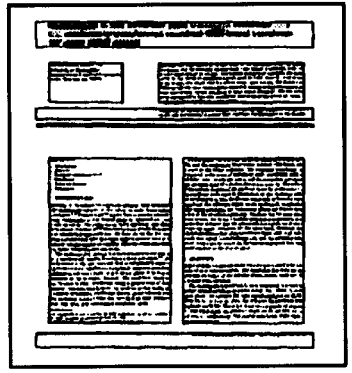
FIG. 2 illustrates an example of output from the X-Y tree segmentor which is a portion of the system of FIG. 1.
Figure 16:
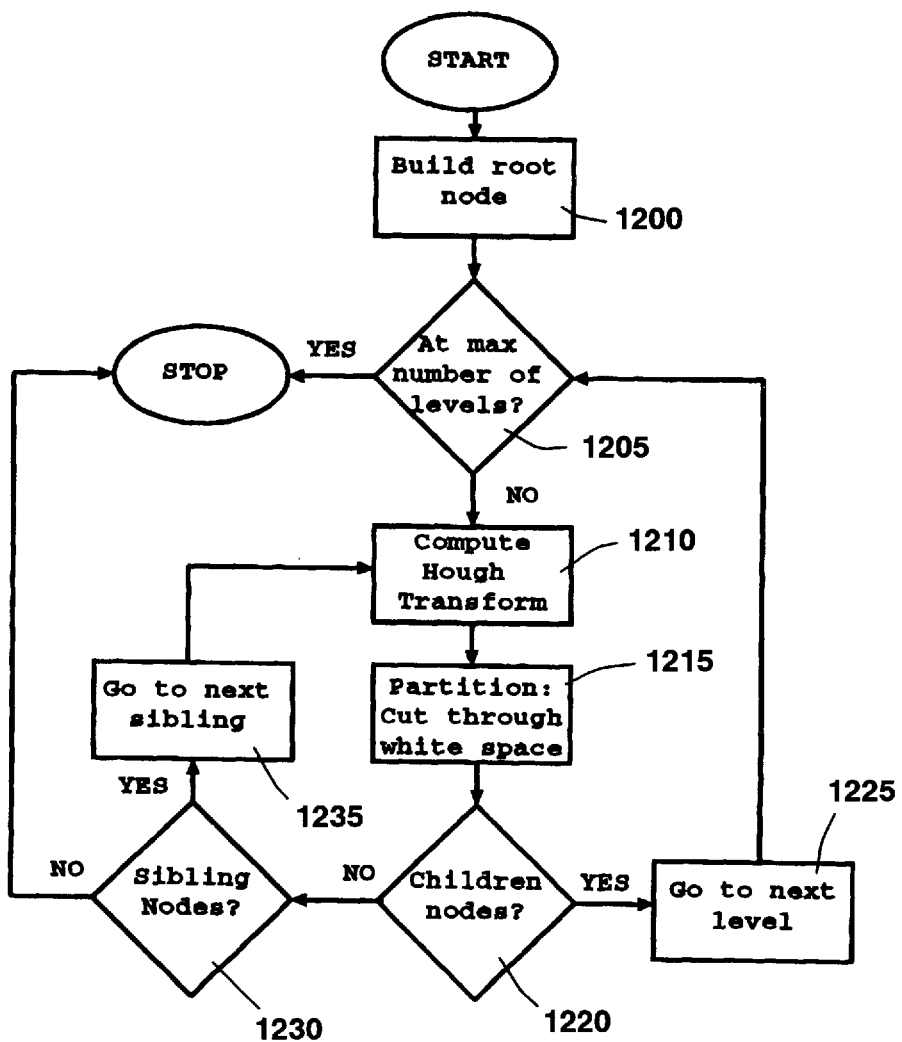
FIG. 16 is a flowchart showing, in greater detail, sequence of operation of step 101 of FIG. 14.

X-Y tree segmentor 18 produces a coarse segmentation of the image by slicing through the white space of the image (such as in the example illustrated in FIG. 2). FIG. 16 shows sequence of operation of module 18. Segmentation is obtained by successively detecting white gaps between text blocks using either a vertical or a horizontal projection of the data, as appropriate. The output of X-Y partitioning is represented as a set of nested rectangular blocks in tree form. Each node in the tree corresponds to a segmented block. The successors of each node correspond to a set of rectangles obtained by horizontal or vertical partitioning of the parent rectangle. The number of levels that the X-Y tree contains is controlled by a predetermined set of parameters which depends on how finely the document needs to be segmented. The final layer of the X-Y tree output, which contains the smallest rectangles segmented, and the line-removed image from module 16, are used as inputs to the run-length smoothing/connected components analysis of modules 20 and 22, specifically to adaptively determine the parameters needed for the run-length smoothing. The output of X-Y tree segmentor 18 is thus a list of rectangular regions found by this coarse segmentation.

Figure 4:
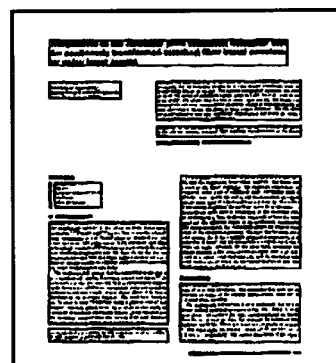
FIG. 4 illustrates a corresponding example of the output of the RSLA module of FIG. 1 to which X-Y tree segmentation has been previously applied as illustrated in FIG. 2.

X-Y tree segmentor 18 divides the document image into regions using the X-Y tree approach. One implementation of an X-Y tree approach that can be used in the practice of the present invention is described in W. Lam and D. Niyogi, *Block Segmentation of Document Images Using the X-Y Tree Approach Tech Report TR*88-14, Department of Computer Science, State University of New York at Buffalo, Buffalo, N.Y., June 1988, which is hereby incorporated by reference herein. The lowest level of the X-Y partitioning is intended to approximately correspond to a text column or a portion of a text column. It was found that X-Y tree analysis alone was inadequate as a segmentation technique because it was difficult to determine cutting parameters that would work over a large variety of document layouts, and by itself, X-Y tree analysis would not produce a fine enough segmentation. To overcome this difficulty, run-length smoothing and connected component analysis are performed on the results of X-Y tree segmentation. For example, in the segmentation of FIG. 2, the article's outline, which precedes the first paragraph of running text, was included in the same segmentation region as the first paragraph of running text. Since the outline and the running text are two different functional units, it is preferable for them to occur in separately defined regions. Using X-Y tree segmentation together with run-length smoothing and connected compound analysis, as shown in FIG. 4, achieved a finer separation of the functional units of the text. Also, in FIG. 4, section headers were partitioned as separate units. This simplifies the geometric to logical transformation of module 36. The geometric to logical transformation maps a geometric structure tree, produced by module 34, into a logical structure tree via rules based on page layout principles. Normally, run length smoothing accomplished by module 20 is based on global characteristics computed over a whole page. In complex layouts these characteristics, such as line and character spacing, may vary significantly enough to cause inaccurate segmentation. Accordingly, the coarse grained output of X-Y tree segmentor 18 is used to determine regions which likely have homogeneous characteristics, and to compute the parameters locally, thereby improving the accuracy, performance and ease of implementation of the run-length smoothing algorithm of module 20. The coarse segmentation output of the X-Y partitioning of X-Y module 18 is therefore used as input regions for determining the run-length smoothing parameters for RLSA module 20.

Figure 3:
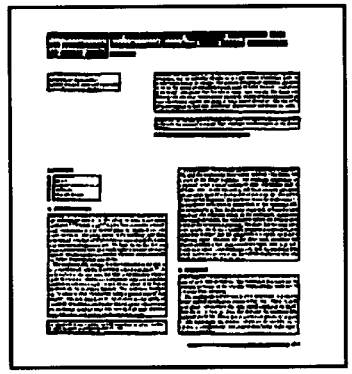
FIG. 3 illustrates connected components of the document page illustrated in FIG. 2 after application of RLSA but without X-Y tree segmentation.
Figure 17:
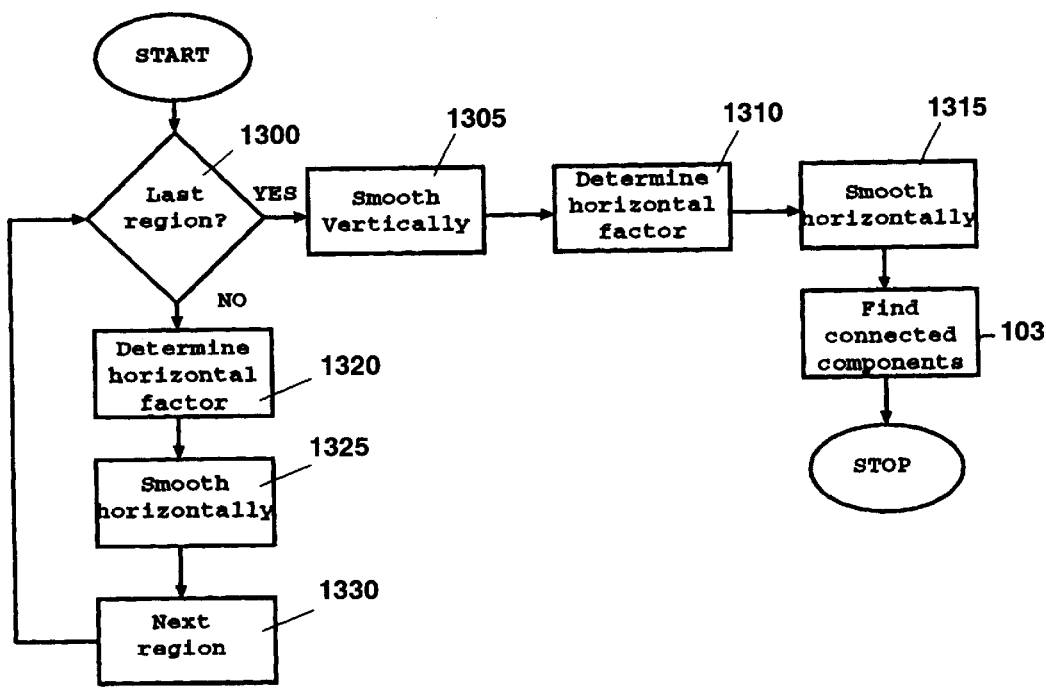
FIG. 17 is a flowchart showing, in greater detail, sequence of operation of step 102 of FIG. 14.

The list of rectangular regions, produced by X-Y tree segmentor 18, and the line-removed image produced by module 16, are inputs to run-length smoothing algorithm (RLSA) module 20. FIG. 17 shows sequence of operation of module 20. Run-length smoothing algorithms that can be utilized in the present invention are described in C. Ronse and P. A. Devijver, *Connected Components in Binary Images: the Detection Problem* (John Wiley and Sons, 1984) and in K. Wong, R. Casey, and F. Wahl, "Document analysis system", in *IBM Journal of Research and Development*, vol. 26, pp. 647–656, November 1982, which are each hereby incorporated by reference herein. Non-background (ink) pixels are merged together into words, paragraphs, columns, and continuous picture elements. Run-length smoothing is applied to "blur" non-background pixels in the image. This blurring process uses four processes: a vertical smoothing, a horizontal smoothing, a logical AND of the two smoothing results, and a final smoothing in the horizontal direction. An example of such a final smoothing is described in S. C. Hinds, J. L. Fisher and D. P. D'Amato, "A Document Skew Detection Method using Run-Length Encoding and the Hough Transform" in 10*th International Conference on Pattern Recognition* (IEEE, Atlantic City, N.J.) 16–21 Jun. 1990, pp. 464–468, which is hereby incorporated by reference herein. Horizontal smoothing connects adjacent black pixels along a scan line. If the number of consecutive white (non-ink) pixels between the two black (ink) pixels is less than a threshold value, then all of the white pixels between the two black pixels are changed to black. Similarly, vertical smoothing is obtained by connecting adjacent black pixels along a vertical line. The vertical threshold is based on the document's inter-line spacing while the horizontal threshold is based on average inter-character distance. Since the inter-character distance and the inter-line distance can change throughout a document, basing these thresholds on global characteristics of the document often results in spurious output, such as is shown in FIG. 3. FIG. 3 shows an example of a segmentation using only run-length smoothing/connected component analysis. In FIG. 3, the title text is broken up when run-length smoothing and connected components analysis are used alone. This problem is overcome by first using X-Y tree segmentation before run-length smoothing and connected component analysis, yielding the results shown in FIG. 4. In the present invention, the horizontal threshold distance is computed by populating a histogram of the distances between consecutive non-ink/ink transitions in the image. The distance with the largest number of transitions is used as the horizontal threshold. The vertical threshold distance is computed in a similar manner, but using vertical non-ink/ink transitions from the smoothed horizontal image. Each region found from the X-Y tree segmentation is smoothed separately, i.e. the horizontal and vertical smoothing parameters are computed separately for each region. The output of module 20 is a single smoothed image.

Figure 18:
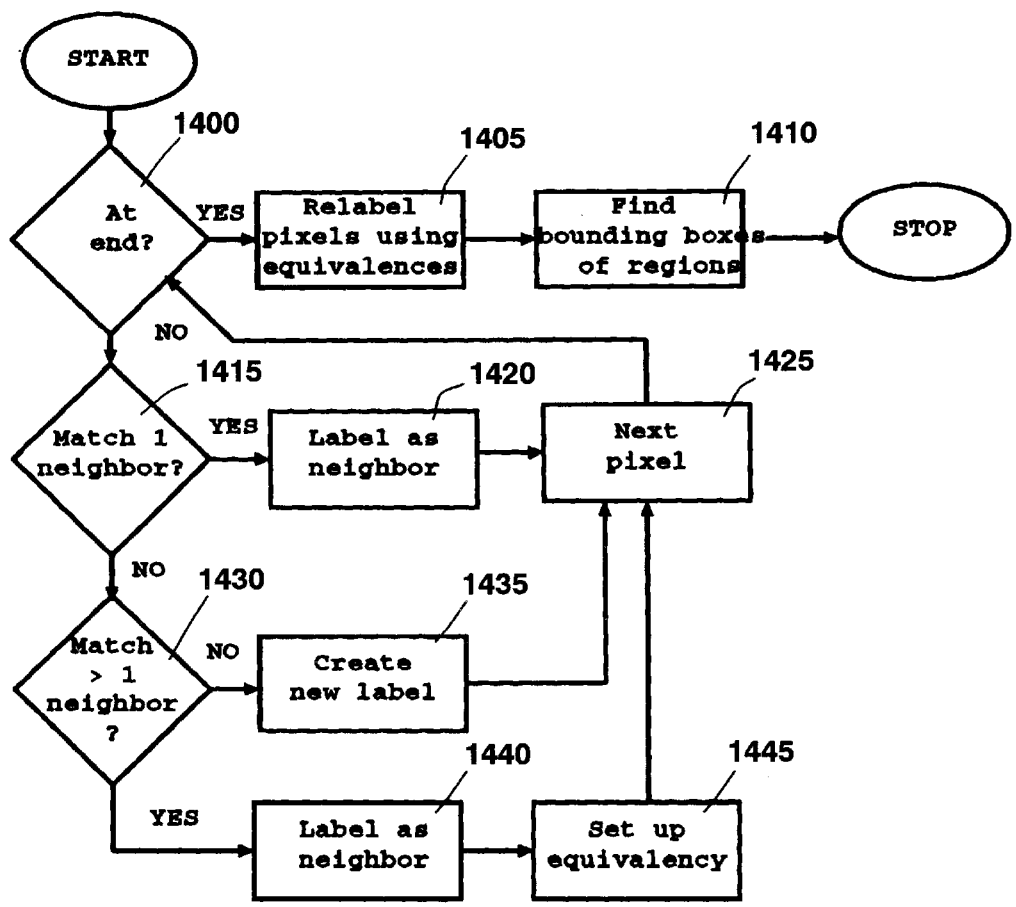
FIG. 18 is a flowchart showing, in greater detail, sequence of operation of step 103 of FIG. 14.

Regarding module 22, a connected component is a region in which all pixels have at least one other pixel in the region as one of its eight-connected neighbors, such as is further described in R. C. Gonzalez and P. Wintz, *Digital Image Processing* (Addison-Wesley, 1987) pp. 30–31, which is hereby incorporated by reference herein. FIG. 18 shows sequence of operation of module 22. Connected component module 22 uses the output from the RLSA algorithm and finds all of the connected components in the region then being considered. Each connected component is represented by a bounding box: four coordinates which represent an enclosing rectangle. The end product of the connected component analysis is a list of bounding boxes of the connected regions in the page image.

Figure 5:
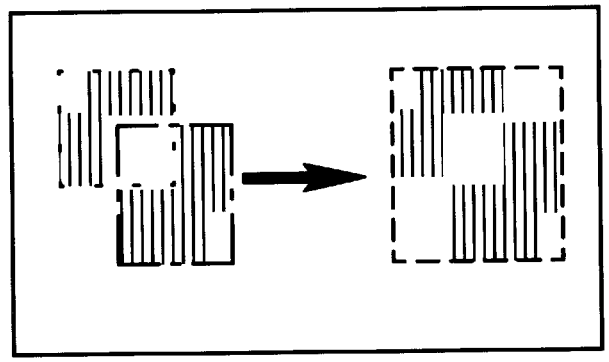
FIG. 5 illustrates how connected component bounding boxes are merged together by the present invention to form larger bounding boxes.
Figure 19:
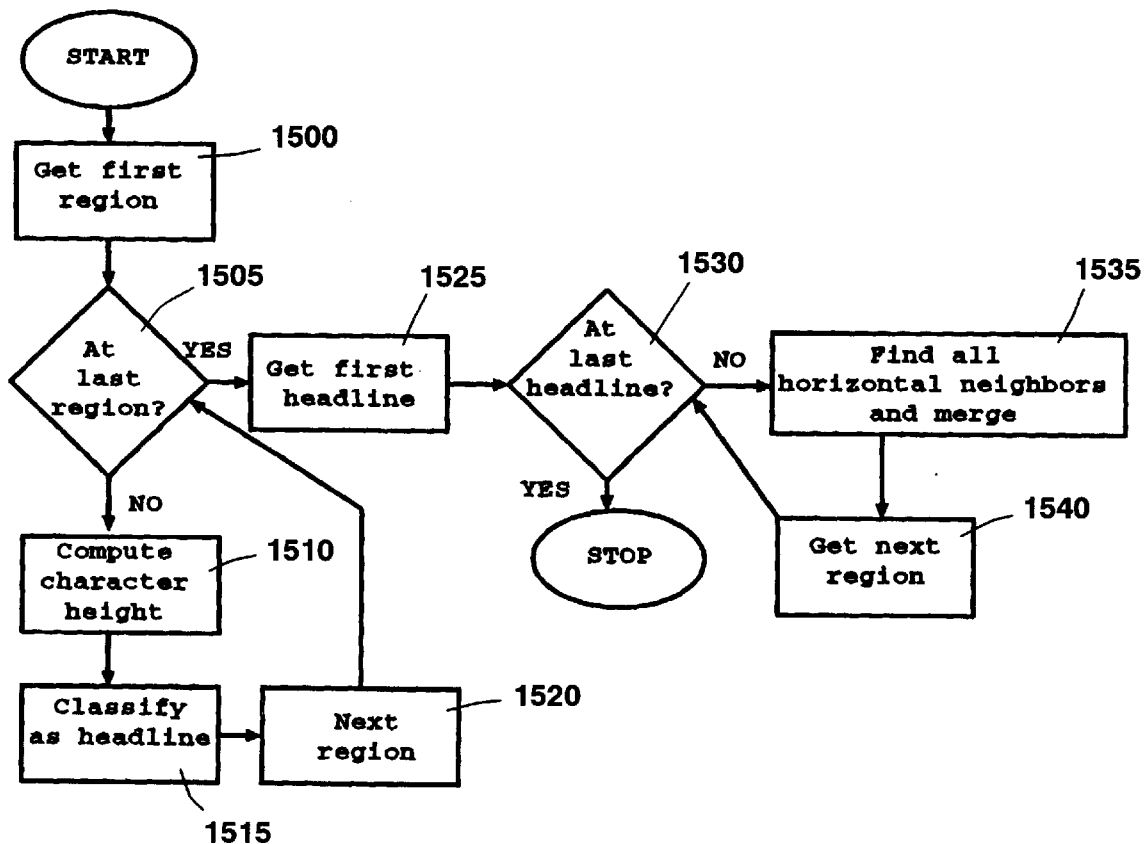
FIG. 19 is a flowchart showing, in greater detail, sequence of operation of step 104 of FIG. 14.

These coordinates are then used as input to a final merging module 24, which accomplishes a final step of merging connected component bounding boxes. FIG. 19 shows sequence of operation of module 24. All overlapping bounding boxes are merged into a single bounding box, such as is shown in FIG. 5. In FIG. 5, connected component bounding boxes are merged together to form larger bounding boxes. A recursive algorithm forms "bins" of overlapping bounding boxes. Each bounding box of a connected component A that has not been assigned to a bin is checked for the overlap with the effective bounding box of an entire bin. The effective bounding box is defined by the minimum and maximum x and y coordinates of all the bounding boxes of the individual connected components which are members of the bin. If an overlap exists with the effective bounding box of the bin, then each individual member of the bin is [then] checked by this algorithm for overlap with bounding box A. If an overlap occurs with one of the members of the bin, then connected component A is assigned to the bin and, if necessary, the effective bounding box of the bin is updated. The resulting effective bounding boxes of the bins are used as input to logical page organizer 14. Organizer 14 accomplishes geometric to logical transformation. Because of this representation, it is possible for the final region bounding boxes to overlap even though none of the individual components within the regions overlap. Reconciliation of this phenomenon is performed during the logical page organizing of organizer 14.

Figure 20:
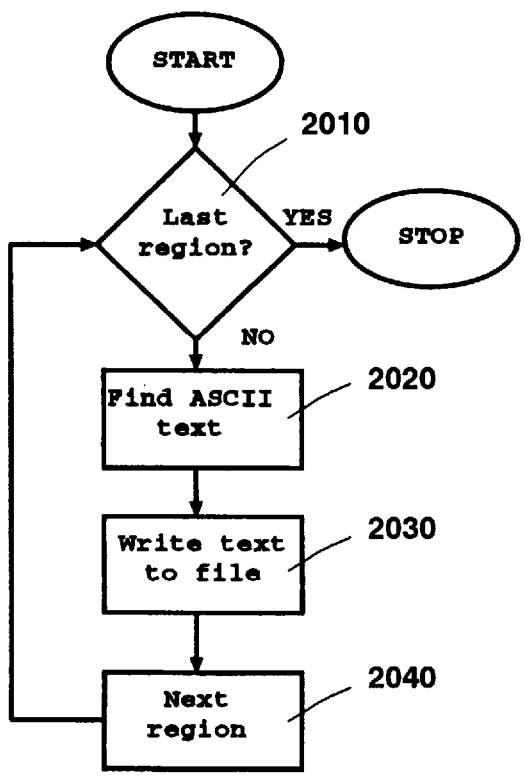
FIG. 20 is a flowchart showing, in greater detail, sequence of operation of step 105 of FIG. 14.

Each portion of the document image (that is, the output of geometric page segmentor 12) is fed to an optical character recognizer 26. FIG. 20 shows sequence of operation of module 26. As a result, the ASCII characters, as well as text attributes such as face style, point size, and indentation within each text region are determined. These attributes are used as input to the logical page organizer 14, together with the image-based feature output from geometric page segmentor 12.

Logical page organizer 14 groups appropriately (e.g., into articles in the case of a newspaper page) the text components which comprise a document page, sequences them in the correct reading order, and establishes the dominance pattern (e.g., finds the lead article). A list of text region locations, rule line locations, associated ASCII text (as found from an OCR 26) for the text blocks, and a list of text attributes (such as face style and point size) are input to logical page organizer 14. The list of text region locations and the rule line locations are produced by geometric page segmentor 12. The ASCII text and the list of text attributes are produced by optical character reader 26.

As mentioned above, analyzer 10 uses assumptions based on knowledge of expected layout. The assumptions, knowledge and layout are for Western-language document pages. Such pages are read from the top down, and from left to right; however, this rule could be adjusted if, for example, Hebrew language documents, that are read from the top down but from right to left, are expected instead. Also, a headline is assumed to be above its article and as wide (same span) as its article. A picture caption is assumed to be below the picture to which it refers. A body block is assumed to go with the immediately preceding head block. Topical entities start with head blocks. The children of a node of a tree are sets of blocks each of which sits beneath the node, is contiguous, has the same column span, has a column span which is a subspan of that for the node, has a lead child which is the highest block in the set, and is not dominated by any block more local than the node. Rule lines denote article or paragraph boundaries. Columns are a key organizing principle. A page may have multiple sets of column configurations. After reading down, the reading order will snake back up and to the right, if a head block or a block with a wider column span is encountered. If reading goes to the right, then the reading order moves up to the parent of the node from which the reading is continuing. Inset blocks are logically related to the surrounding material and are subordinate to it. Articles near the top of the page or which span a wide number of columns are considered more important than articles that do not.

Figure 6:
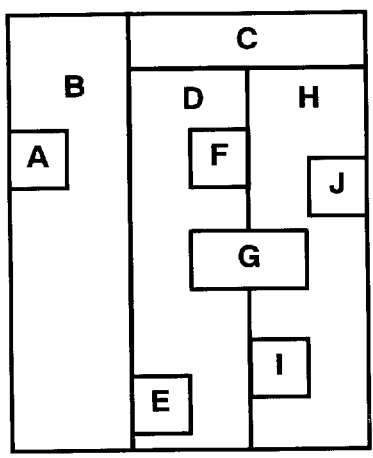
FIG. 6 illustrates a "chaining" procedure used to determine column boundaries in the present invention.
Figure 23:
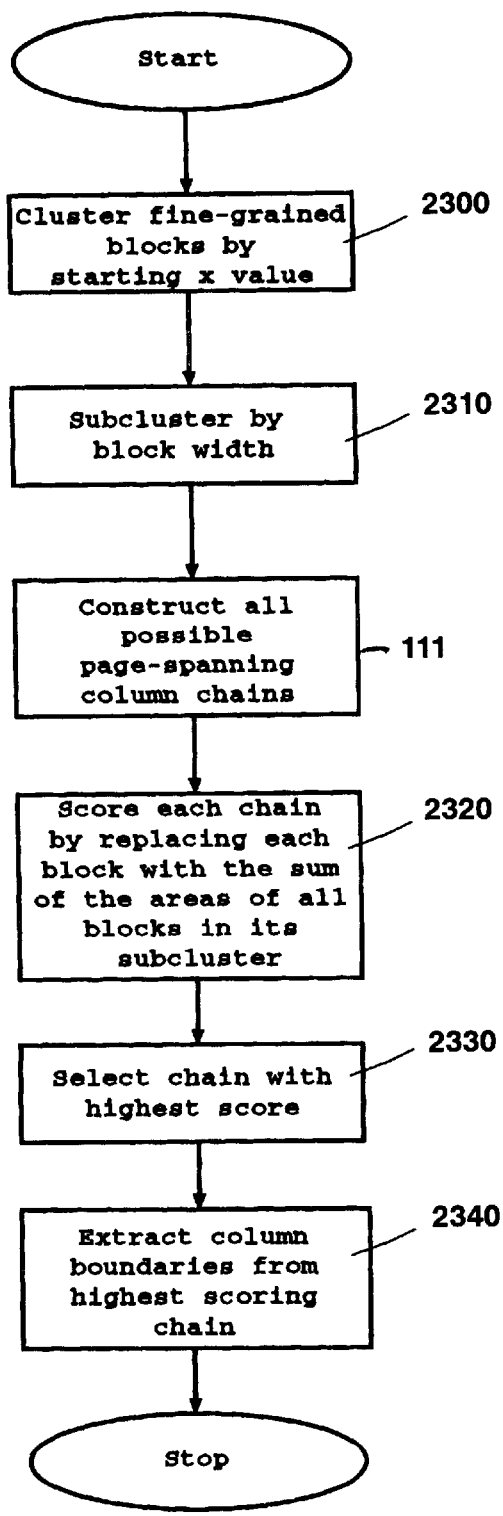
FIG. 23 is a flowchart showing, in greater detail, sequence of operation of step 108 of FIG. 14.

Columns are used as a key organizing principle for Western-language document pages. It is therefore highly desirable to determine column boundaries of a document page image. In a document page which is column-oriented, the column (sidewall) boundaries can be considered as forming a chain across the page. Preferably, the chain should be of "medium" length, i.e. neither long nor short as described below, where length denotes the number of links. A short chain would be indicative of disproportionately wide "columns", most likely due to headline regions which span multiple true columns. Similarly, a long chain would result when a group of inset blocks, whose widths span a true column only in aggregation, are represented as columns in their own right. Based on this, the present invention utilizes a straightforward quantitative method in which the best representative is chosen from an enumeration of all page-wide chains. This method is illustrated in FIGS. 6 and 23 and in Table 1, is accomplished by module 32, and is outlined below:

1. Partition the blocks into groups based on a common starting x value (within some tolerance). The arithmetic mean of the x values within a partition is taken as the candidate column start. Then, within each cluster, further partition into subclusters by block width (within some tolerance) and compute the arithmetic mean of each subcluster as the width of the potential column.

Figure 24:
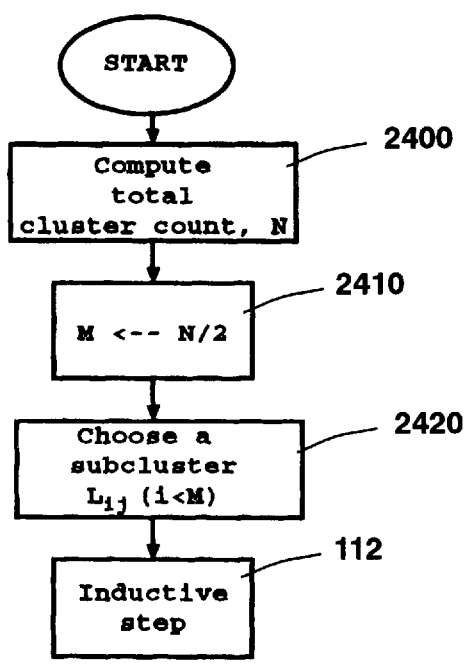
FIG. 24 is a flowchart showing, in greater detail, sequence of operation of step 111 of FIG. 23.
Figure 25:
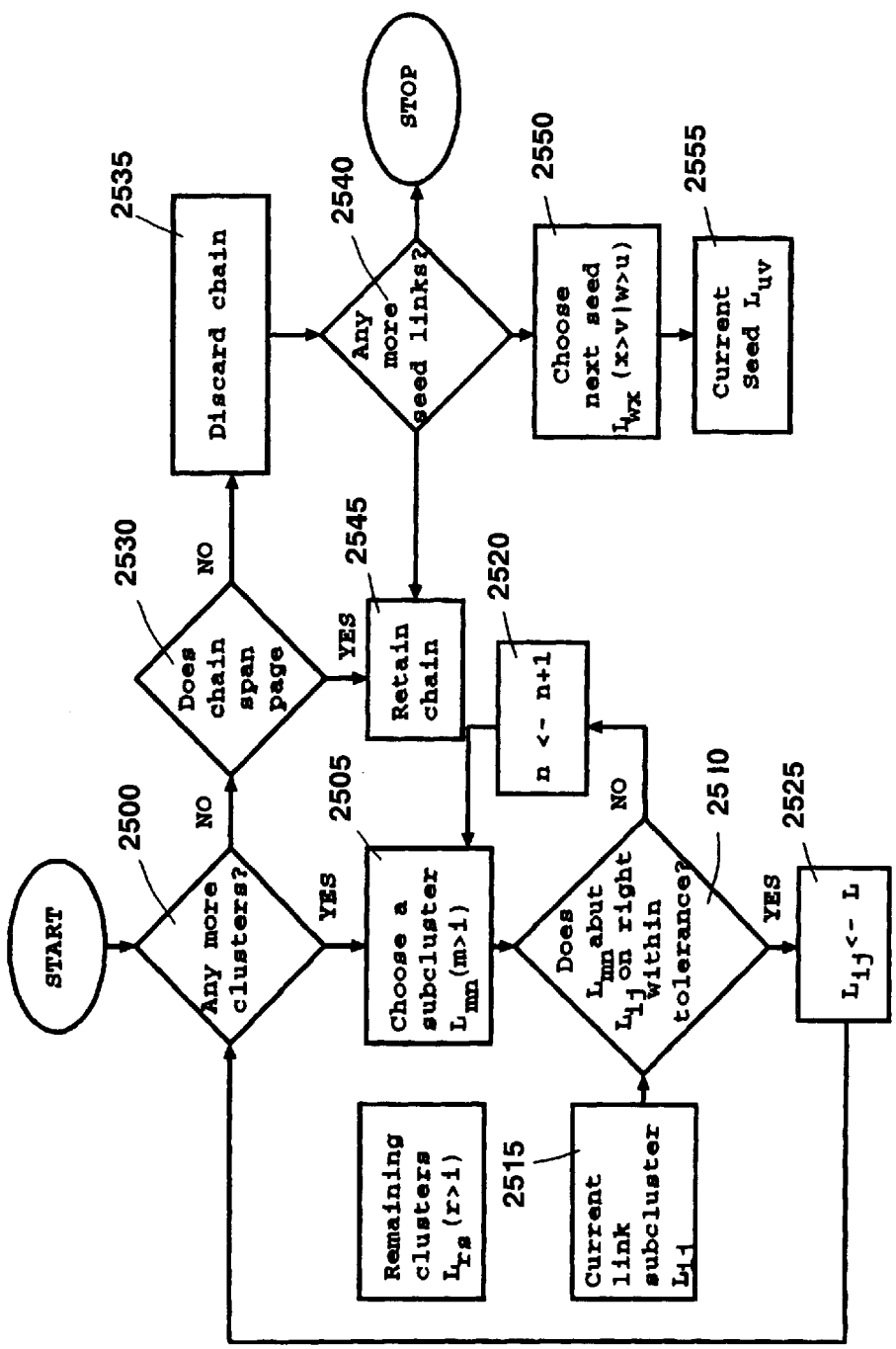
FIG. 25 is a flowchart showing, in greater detail, sequence of operation of step 112 of FIG. 24.

2. Construct all possible page-spanning chains of column boundaries, taking at most one link from each partition and testing for column abutment within some tolerance, such as shown in FIGS. 24 and 25.

3. Score each chain by replacing each of its blocks with the sum of the areas of all blocks in its subcluster, that is, all blocks with the same x value and the same width. Then add the block values to obtain the chain score.

4. Select the chain with the highest score.

The chain with the highest score is the one most likely to represent the true column boundaries because this weighting mechanism will favor column-aligned blocks, which generally comprise the bulk of a page, over inset blocks. The area criterion will also give less influence to headline blocks, even though they often span multiple columns. Moreover, we can impose a front-end constraint on the search space by limiting the input to those blocks designated as body, which will eliminate headline blocks from consideration.

TABLE 1

Cluster the blocks by starting x value:
[[A, B], [C, D, E], [F, G], [H, I], [J]]
Construct all possible column chains:

| B | E | F | H | |
| B | D | | H | |
| B | D | | I | J |
| B | C | | | |
| B | E | G | | J |
| B | F | F | I | J |

Choose the chain corresponding to the largest area:

| B | D | H |

The method is sufficiently general that it does not matter whether all of the columns are the same width.

Figure 7:
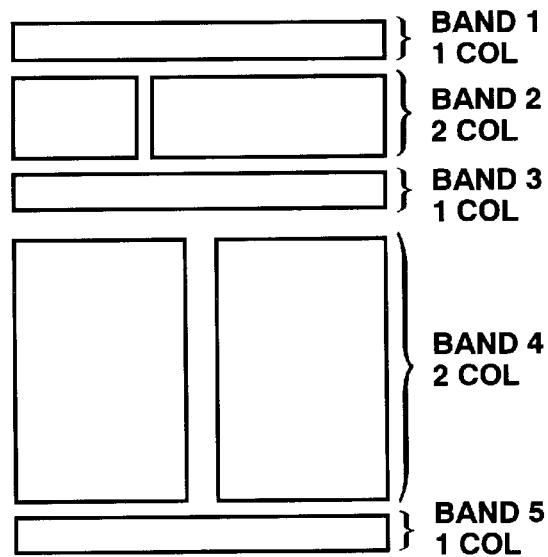
FIG. 7 illustrates a coarse segmentation defining the column bands of the example illustrated in FIG. 2.
Figure 8:
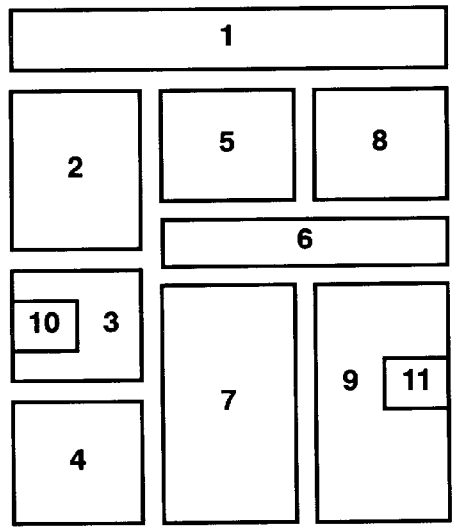
FIG. 8 illustrates a finer segmentation of the example of FIG. 2.
Figure 26:
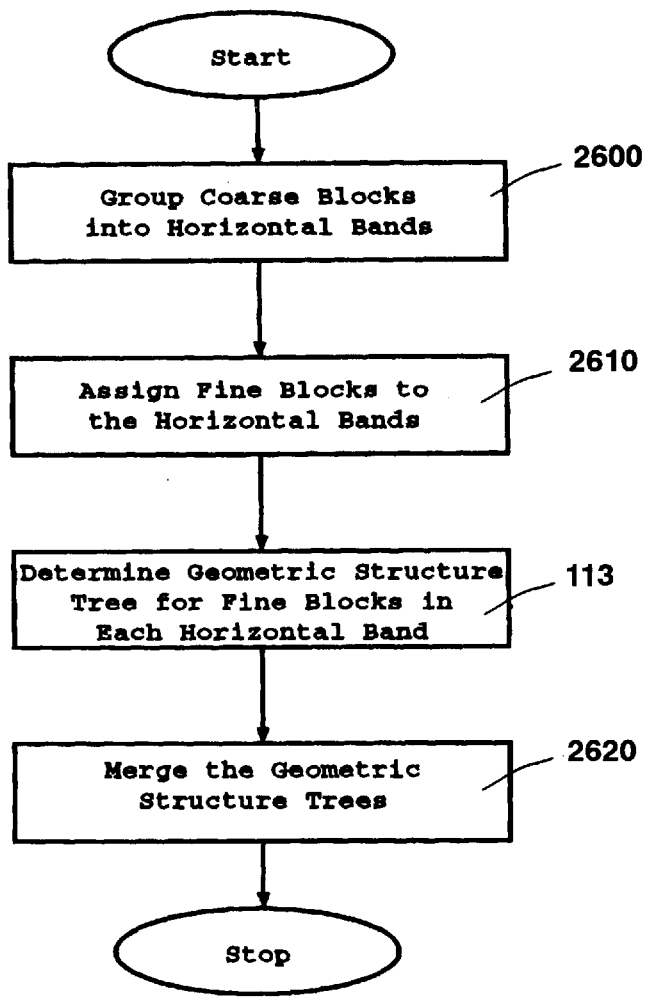
FIG. 26 is a flowchart showing, in greater detail, sequence of operation of step 109 of FIG. 14.
Figure 27:
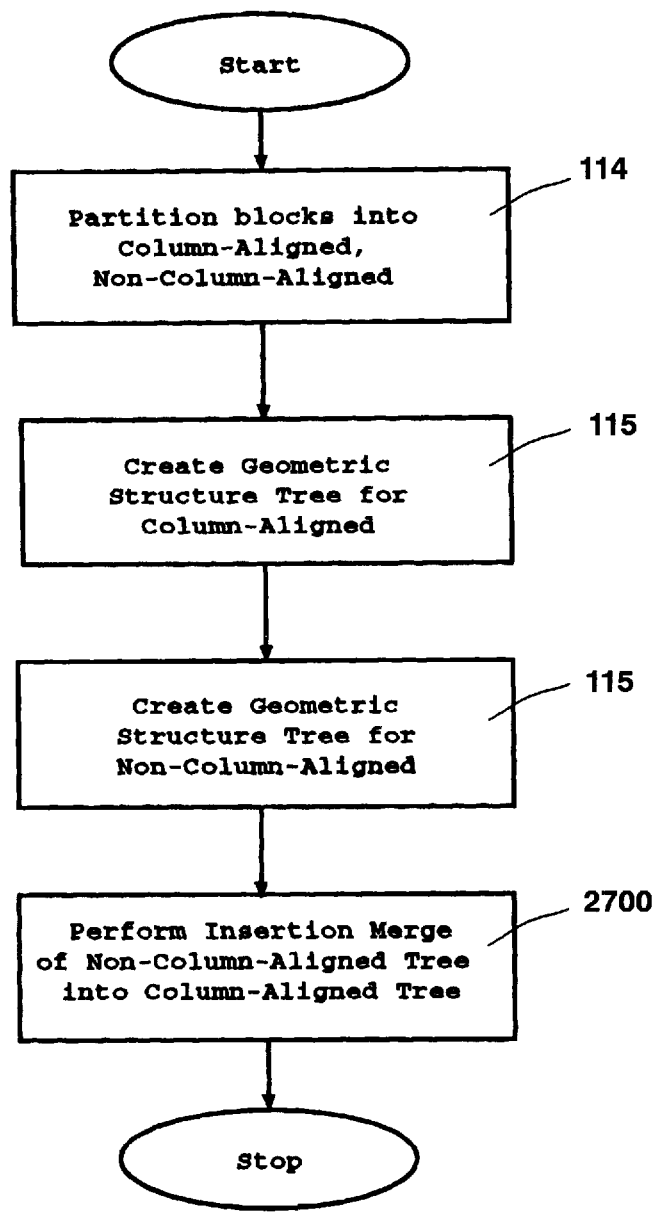
FIG. 27 is a flowchart showing in greater detail, sequence of operation of step 113 of FIG. 26.
Figure 28:
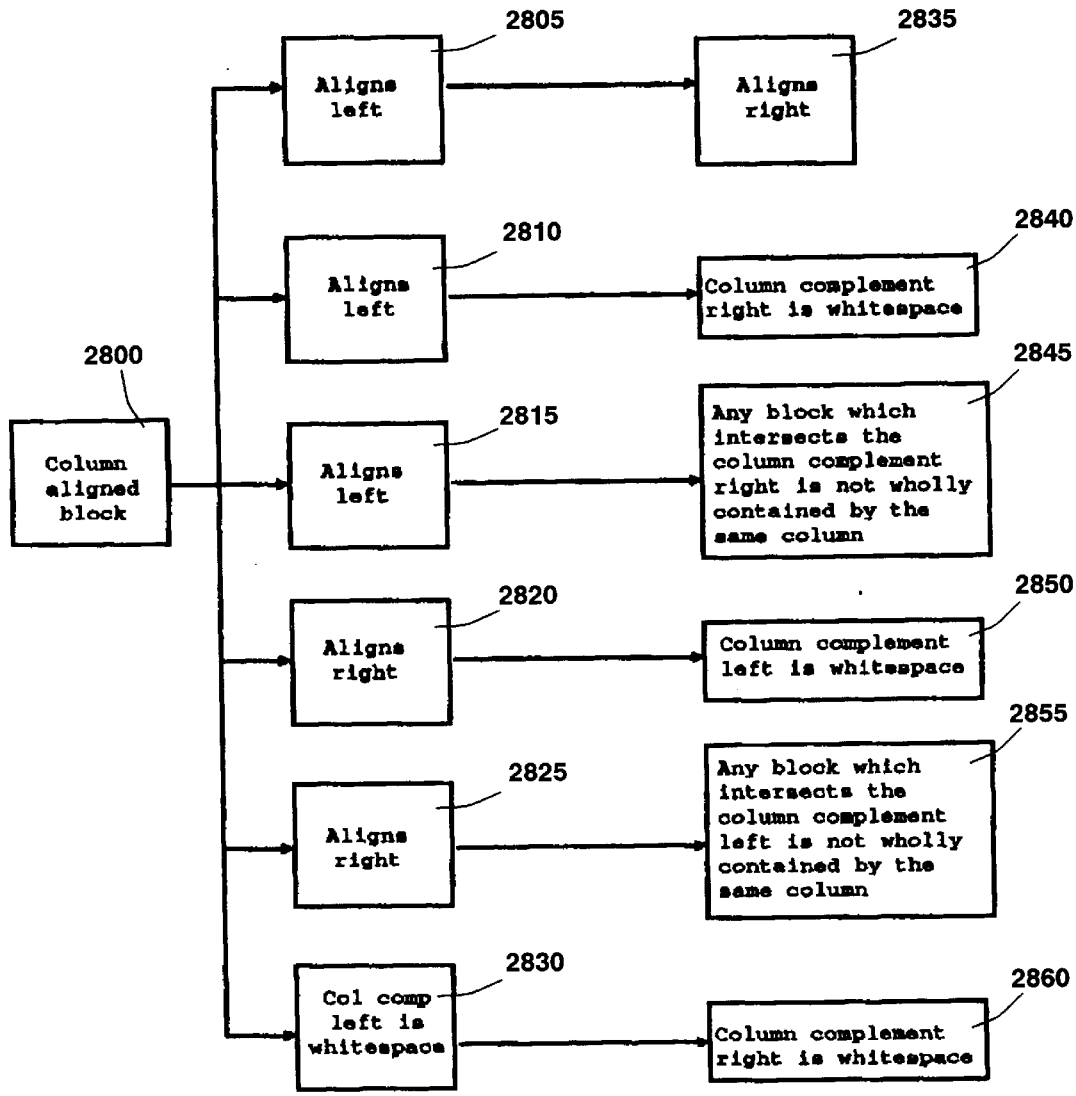
FIG. 28 is a flowchart showing, in greater detail, sequence of operation of step 114 of FIG. 27.

A basic method for creating the geometric structure tree of a document page is shown in FIGS. 29, 30, 31 and 32. The generalization and improvement of this process is shown in FIGS. 26, 27 and 28. With regard to operation of tree generating module 34, we will first discuss creation of the geometric structure tree where a page contains multiple sets of column bounds. FIG. 26 shows sequence of operation of module 34. For example, consider a page from a single-articled document such as the lead page of an article from a technical journal, such as that illustrated in FIG. 2. It is readily apparent from FIG. 2 that constraint (1) of the section of this application entitled "Background of the Invention" does not hold because the partitioning into columns in the region where the author block and abstract are located is not the same as that lower where the running text begins. Still, in each region there is some column-based layout. This means that the page can be viewed as a composition of horizontal bands, each of which has internal column consistency. Thus, a geometric structure tree can be constructed within each band, after which the individual trees can be merged, by treating each as a child of the same "root", to form a single tree for the page. The results of the X-Y tree partitioning are used to specify the column zones (those horizontal bands in which there is internal column consistency) of the page, as shown in FIG. 7. The problem is then reduced to determining these bands or zones. As discussed above, segmentor 12 utilizes X-Y partitioning followed by RLSA and connected components. X-Y partitioning is used initially to set local parameters in guiding RLSA and connected components. The outputs of these respective processes can be characterized as being a coarse-grained segmentation and a fine-grained segmentation, respectively. An additional benefit of this sequential method is realized here when, as shown in FIG. 7, the resulting coarse blocks fall into column zones.

Figure 13:
FIG. 13 illustrates how zoning is more difficult when inset boxes are present in a document.

Now, consider the case of pages with non-columnaligned inset blocks, wherein constraint (2) of the section of this application entitled "Background of the Invention" does not apply. Sequence of operation is shown in FIGS. 27 and 28. Modern layouts, particularly in popular periodicals, often use inset blocks which are not bilaterally column aligned, i.e., the inset block does not adhere to a column boundary on at least one side. Even *The Wall Street Journal*, whose front page format is otherwise regular, embeds on its front page portraits which span only partway across a column and which have text flowing around them. Several examples of inset blocks are illustrated in FIG. 13, which shows a typical magazine page layout in which several examples of inset blocks are shown; as illustrated, such blocks need not be constrained to a single column. An OCR has difficulty segmenting this sort of scenario, not just because block outlines overlap, but rather because they do so in a way which is somewhat arbitrary and not compatible with producing the kind of block list needed for tree construction.

Rather than try to coerce the existing tree building algorithm to deal with non-column-aligned objects, the present invention instead utilizes an overlay plane for blocks which are not column-aligned. Separate trees are formed for the base plane and the overlay plane. These trees are then merged. All blocks on the page are partitioned into those which are column aligned and those which are not. A geometric structure tree is then formed for each partition. The resulting trees are merged by taking each node from the overlay tree and inserting it into the base tree. In accomplishing this tree merger, it is assumed that an inset block belongs to the same topical entity (an article in the case of a newspaper) as its surrounding text. Further, an inset block is deemed to be of secondary importance relative to that text, so the present invention makes its node the youngest child of the text's parent node. This process of tree formation and merger is illustrated in FIG. 9.

Figure 12:
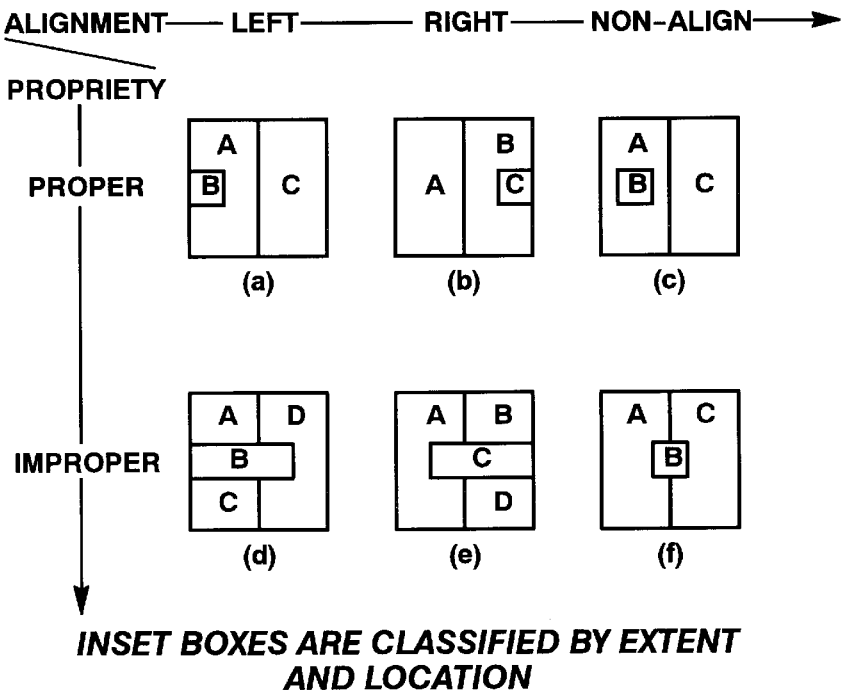
FIG. 12 illustrates how in the present invention inset boxes are classified by extent and location.

Employing the overlay concept in tandem with the bounding box method of determining block edges accomplished by merger 24 (described above) not only facilitates tree construction over this wider domain, but allows the user to do so with the minimal number of objects to be processed. One comparison example is illustrated in FIGS. 10 and 11. In FIG. 11, there are only 3 segments: A and C which are each half of the total area, and B, which is overlaid on A. Under the uniplanar paradigm illustrated in FIG. 10, in general the fragmentation occurring in each inset block would mean (for this example) two more blocks to handle. This is true regardless of the category of (non-column-aligned) inset block. An enumeration of categories based on the dimensions of propriety and degree of alignment is shown in FIG. 12. The classification of FIG. 12 relies on the following definitions. An inset block (or group) is proper if it is contained within a single column; it is improper if it spills over column boundaries. In most cases this corresponds to the arithmetic notion of proper and improper fractions; however, as shown in part (f) of FIG. 12, an inset block which encroaches on two host blocks, but whose width does not exceed that of either, is still considered improper.

Figure 33:
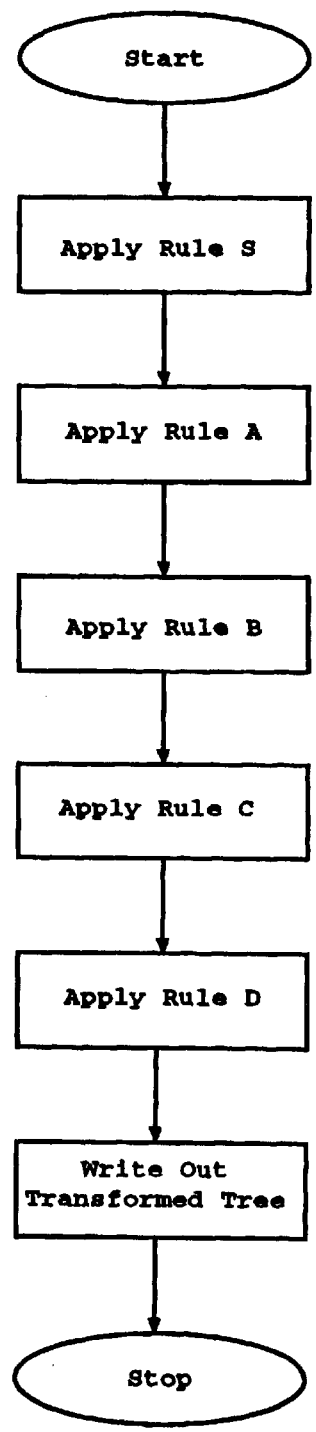
FIG. 33 is a flowchart showing, in greater detail, sequence of operation of step 110 of FIG. 14.

Module 36 performs logical transformation on the geometric structure tree produced by module 34. FIG. 33 shows sequence of operation of module 34.

For example, the present invention can be implemented as follows. Document images can be captured using a Xerox™ Imaging Systems' Model 1700 scanner. Optical character recognition can be performed with Xerox™ Imaging Systems' ScanWorX™ OCR software. Analyzer 10 can for example be implemented on a Sun™ SPARCstation™ with the Unix™ operating system. The scanning can be at for example 150 to 300 dpi (dots per inch). Gray level images can be binarized, and all binary images can be reduced to 75 dpi before geometric segmentation. The low-level, pixel-based operations required for geometric page segmentor 12 can be implemented in the C computer language, and the high-level manipulations required for logical page organizer 14 can be implemented in the Prolog computer language. Quintus™ Prolog has a C interface which allows Prolog to call C and vice-versa.

Analyzer 10 can be implemented in software. An example of software, in the respective languages described in the preceding paragraph, implementing the various modules of FIG. 1 is given in the following pages and set forth as source code in the attached software appendix. FIGS. 14–33 are the flowcharts for this software. The respective caption for each of FIGS. 14–33 identifies the respective software represented by each such flowchart. The operation of the software will be explained below with reference to FIGS. 14–33.

FIG. 14 is a flowchart of the main program for which the corresponding code can be found in the appendix as the process main.c. Step 100, as shown in FIG. 14, detects and removes horizontal rule lines. FIG. 15 is a flowchart for the Detect and Remove Lines step 100 shown in FIG. 14. Step 100 corresponds to source code which can be found in the appendix as the process lines.c.

At step 1100, shown in FIG. 15, the first row of the image is selected. It is then determined at step 1105 whether the last row has been processed. If all of the rows have been processed, the horizontal rule lines are record at step 1135. If all of the rows have not been processed, the pixel run length for the selected row is determined at step 1110. The number of pixels in the run length is compared, at step 1115, with a specified value T. If the number of pixels is greater than T, the pixels are eliminated, at step 1130, from the run and it is determined, at step 1120, if the end of the selected line has been reached. If the number of pixels is not greater than T, it is determined, at step 1120, if the end of the selected line has been reached. If the end of the line has not been reached, the find pixels step 1110 is repeated. If the end of the line has been reached, the next row is selected at step 1125 and it is determined again, at step 1105, if all of the rows have been processed.

Referring to FIG. 14, after the processing for step 100 is completed, the XY Tree Segmentation step 101 is performed. FIG. 16 is a flowchart for step 101 shown in FIG. 14. Step 101 corresponds to source code xytree.c in the appendix.

The flowchart shown in FIG. 16 illustrates how a tree representation of the document is produced by finding nested rectangles in the image. At each step of the recursive process of image decomposition, a rectangle is subdivided into smaller rectangles by making cuts along a predetermined direction. Each node in the tree corresponds to a rectangle, i.e. a segmented block at the current level. Successors of a node correspond either to a set of rectangles obtained by horizontal partitions of the parent rectangle, or to a set of rectangles obtained by vertical partitions. The location of the gap and the width of the gap are determined using a Hough transform. If a gap is present, a cut is made through the block at that position. This is first done for all horizontal gaps, then for all vertical gaps, forming a grid of rectangles as children of the parent nodes. The algorithm stops for blocks which have a width less than 400 pixels and a height less than 90 pixels.

At step 1200, shown in FIG. 16, a root node is first established. It is then determined, at step 1205, if the maximum number of segmentation levels has been reached. The number of levels that the X-Y tree contains is controlled by a predetermined set of parameters which depends on how finely the document needs to be segmented. Processing is completed when it is determined, at step 1205, that the maximum number of levels has been reached. The Hough transformation is computed, at step 1210, if the maximum number of levels has not been reached. Based on the computed Hough transform, the identified white space is cut through, at step 1215, to partition the rectangle. Then, at step 1220, it is determined if the segmentation produced any children nodes. If children nodes are produced, the segmentation processing is advanced to the next level at step 1225. Then, it is again determined if the maximum number of levels has been reached at step 1205. If no children nodes are produced, then it is determined, at step 1230, if there are any sibling nodes. If there are no sibling nodes step 101, shown in FIG. 14, is terminated. If sibling nodes are present, then, at step 1235, the next sibling node is selected and the Hough transform is computed for the selected sibling node at step 1210.

Next, at step 102 of FIG. 14, ink pixels in the image are smoothed. Each region, i.e. node, (as determined by the XY Tree Segmentation 101) is considered separately. FIG. 17 is a flowchart for the Run-Length Smoothing step 102 shown in FIG. 14. Step 102 corresponds to source code rlsa.c in the appendix. The process shown in FIG. 17 smooths ink pixels in the image.

At step 1300, shown in FIG. 17, it is first determined if the last region has been processed. If the last region has not been processed, the horizontal factor, i.e. the horizontal threshold, is determined at step 1320. The horizontal threshold is computed by populating a histogram of the distances between consecutive non-ink/ink transitions in the image. The distance with the largest number of transitions is used as the horizontal threshold. At step 1325, any ink pixels within a block which are separated by the horizontal threshold or fewer background pixels along a row of the image are smoothed by changing all the background pixels values to ink. At step 1330, the next region is selected. After the last region has been smoothed horizontally, the entire resultant image is smoothed vertically at step 1305.

Any ink pixels which are separated by the vertical threshold background pixels or fewer along a column of the image are smoothed by changing all the background pixels to ink pixels. The vertical threshold distance is computed in a similar manner to the horizontal threshold, but using vertical non-ink/ink transitions from the smoothed horizontal image. The resultant image is smoothed horizontally, at step 1315, after the horizontal factor, horizontal threshold, has been determined at step 1310. The smoothed image is then used as an input to the Connected Component Analysis step 103 shown in FIG. 14.

FIG. 18 is a flowchart for the Connected Component Analysis step 103 shown in FIG. 14. FIG. 18 corresponds to source code segment.c and conn_comp.c in the appendix. The flow chart in FIG. 18 finds all of the connected components in the region under consideration. A connected component is a region in which all pixels have at least one other pixel in the region as one of its eight-connected neighbors.

At step 1400, shown in FIG. 18, it is determined if the end of the image has been reached. If the end of the image has not been reached, it is determined, at step 1415, if the pixel has a neighbor. If the pixel does not have a neighbor, then it is determined, at step 1430, if the number of neighbors for the pixel is greater than 1. If the number of pixels is greater than 1, the pixel is labelled with the same label as one of the neighbors at step 1440. Then, at step 1445, an equivalency is setup between the neighbors. If the number of neighbors is less than 1, a new label is created for the pixel at step 1435. If, at step 1415, there is a match with a neighbor, the pixel is assigned the same label as the neighbor. After steps 1420, 1435, and 1445 a next pixel from the image is selected and it is determined, at step 1400, if the end of the image has been reached.

Once the end of the image has been reached, at step 1405, the pixels are relabelled, at step 1445, based on the equivalences. Then, at step 1410, each connected component is represented by a bounding box: four coordinates which represent an enclosing rectangle.

FIG. 19 is a flowchart for the Merging step 104 shown in FIG. 14. Step 104 corresponds to source code which can be found in the appendix as the process merge.c. Step 104 searches for overlapping bounding boxes determined by connected component analysis step 103 which are part of the same headline. A headline is a region with a few lines of text. All overlapping bounding boxes are merged into a single bounding box.

At step 1500, shown in FIG. 19, the first bounding box, i.e. region, is retrieved. It is then determined, at step 1505, if the last region has been processed. If not, then the character height, the number of text lines, is computed at step 1510. Based on the character height, the block is classified or not classified, at step 1515, as a headline. Counting the number of INK runs in the projected image estimates the number of text lines. If the number of text lines in a block is less than a specified value, it is considered a potential headline block. At step 1520, the next region is selected and step 1505 is repeated.

After all of the regions have been processed, the first headline is retrieved at step 1525. Then, at step 1530, it is determined if the last headline has been processed. If the last headline has not been processed, then, at step 1535, all of the horizontal neighbor headline blocks of the selected headline block are found and merged. A horizontal neighbor is found by testing for any vertical overlap of the horizontal projections of the bounding boxes of the two bounding boxes in question. If the two bounding boxes overlap horizontally, then the two bounding boxes are tested to determined if the vertical overlap is less than 50% of the smaller block width. If the two bounding boxes pass both these tests, they are merged into one block by computing the bounding box of the combined boxes. These bounding boxes are fine-grained blocks.

Next, characters in the regions are optically recognized at step 105. FIG. 20 is a flowchart for the Optical Character Recognition step 105 shown in FIG. 14. Step 105 corresponds to source code file ocr.c.

At step 2010, shown in FIG. 20, it is first determined if the last region has been processed. Processing is terminated when the last region has been processed. If all of the regions have not been processed, then, at step 2020, the ASCII text in the region is found and then written, at step 2030, to a file. Then, at step 2040, the next region is selected and step 2010 is repeated.

Figure 21:
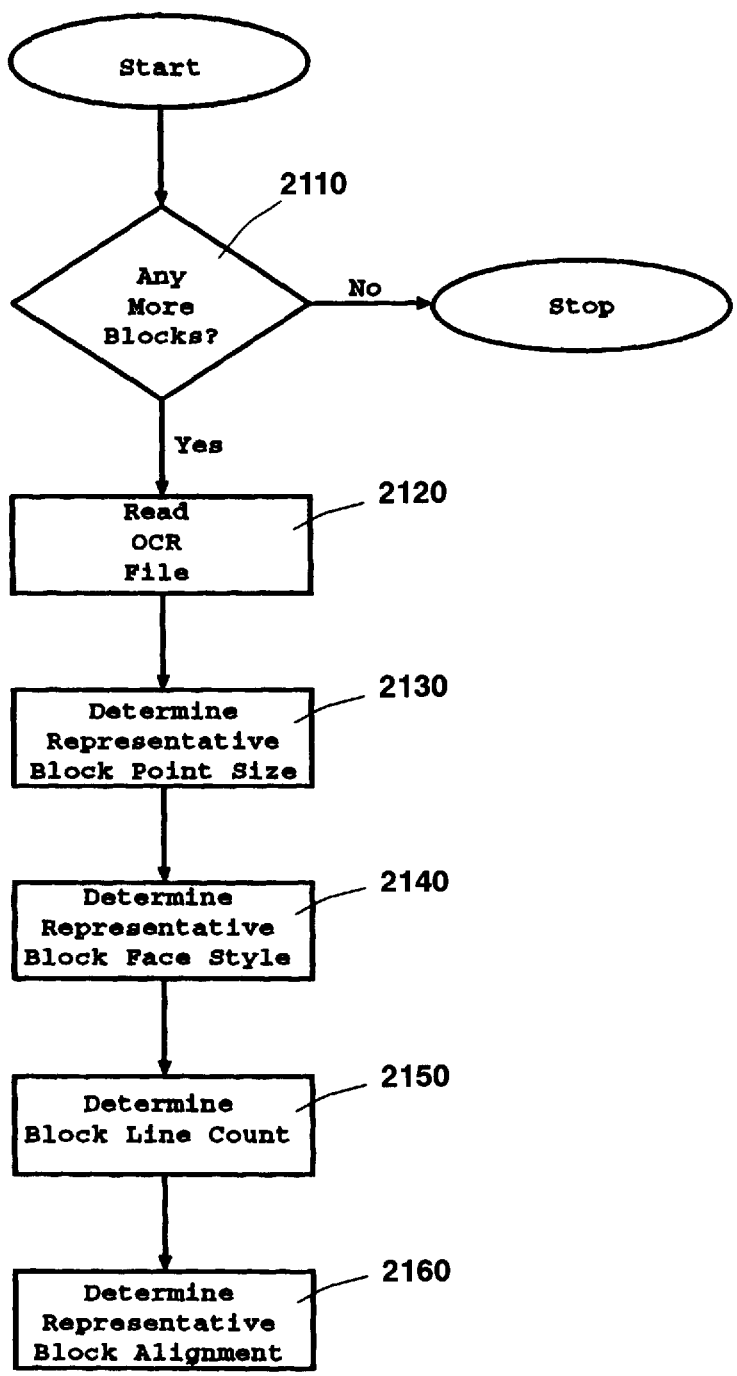
FIG. 21 is a flowchart showing, in greater detail, sequence of operation of step 106 of FIG. 14.

Once character recognition is completed, the block features of the ASCII text are determined at step 106. FIG. 21 is a flowchart for the Find Block Feature step 106 shown in FIG. 14. Step 106 corresponds to source code which can be found in the appendix as process feature.pl. Each block of the ASCII text is read from the file and processed.

First, as shown in FIG. 21, it is determined, at step 2110, if all of the blocks have been processed. This procedure is terminated once all of the blocks have been processed. Otherwise, the OCR file, the file containing the ASCII text, is read at step 2120. For each block of ASCII text read, the representative block point size is determined, at step 2130, by ascertaining from its contents the point size which applies to the largest number of characters in the block. Next, the representative block face style, for example, 'plain', 'italic', and 'bold'; is similarly determined at step 2140. Then, at step 2150, the block line count is computed by counting the number of line characters in the file. Finally, at step 2160, the representative block alignment (one of 'left', 'right', 'both', or 'neither') is determined. For those lines which have a left margin, the lines are deemed to be left-justified if the total count of lines in multi-line runs, as would occur for a paragraph, is at least 50% of the total count of lines whether in multi-line runs or in single-line runs. A similar computation is made for those lines which have a right margin. In each case, the margin must exceed a threshold. If the text is found to be both left-and right-justified, then the alignment is deemed 'both'. If the justification is exactly one of 'left' or 'right', then the alignment is 'left' or 'right', respectively. Otherwise, the alignment is 'neither'.

Figure 22:
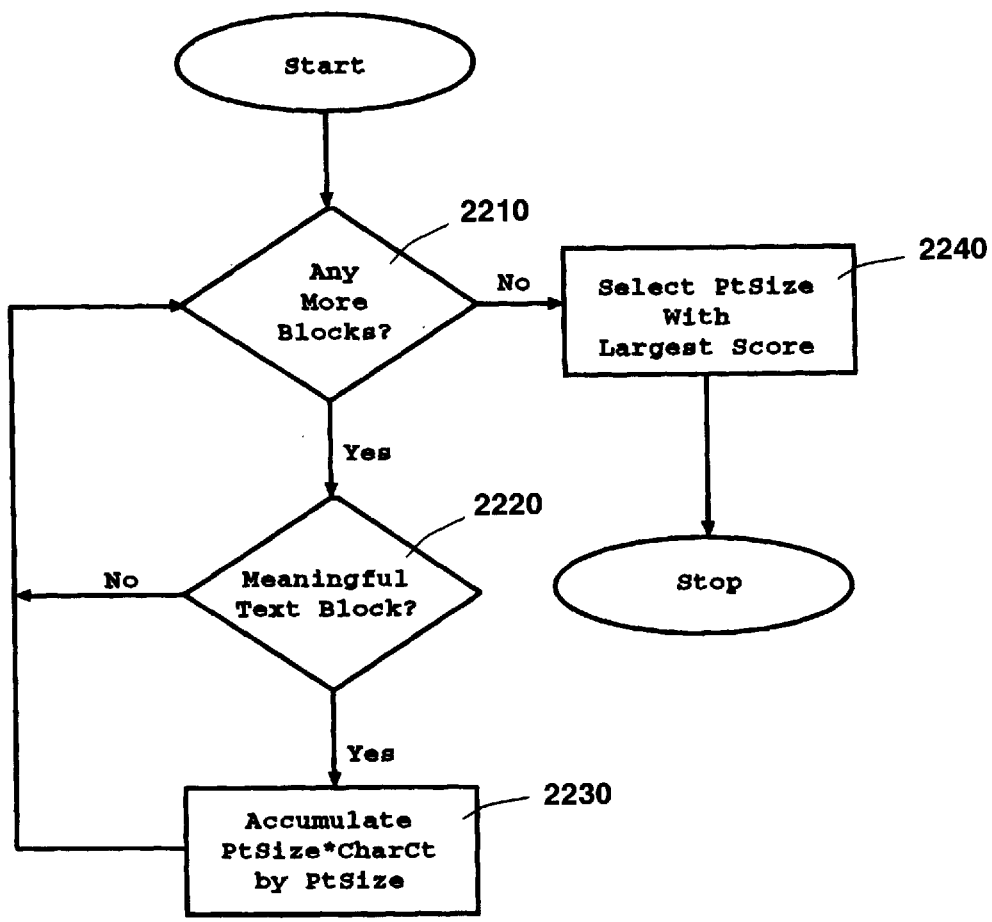
FIG. 22 is a flowchart showing, in greater detail, sequence of operation of step 107 of FIG. 14.

Once the block features have been established, the page features are determined at step 107. FIG. 22 is a flowchart for the Find Page Features step 107 shown in FIG. 14. Step 107 corresponds to source code found in the software appendix as process classify_blocks.pl. First, at step 2210, it is determined if all of the blocks have been processed. If all of the blocks have not been processed, then, at step 2220, it is determined if the current block is a meaningful text block. A block is a meaningful text block if its features will contribute to the page level computation. Blocks which have been classified as 'rule line', 'non text', or 'garbage' where at least $5/8$ of the characters are non-alphanumeric, are not considered meaningful text blocks.

For those blocks which are meaningful text blocks, the product of point size and character count is accumulated by point size for all point sizes found in these blocks. The point size with the largest sum of products is selected as the representative page point size. Once all of the blocks have been processed, the point size for the page having the largest score is selected at step 2240.

Next, at step 108, the column boundaries are determined for all fine-grained blocks. Blocks which are produced by Geometric Page Segmentor 12 which corresponds to the data produced from merge overlapping bounding boxes 24 are considered fine-grained blocks. FIG. 23 is a flowchart for the Determine Column Boundaries step 108 shown in FIG. 14. Step 108 corresponds to source code which can be found in the software appendix as the process chain.pl.

First, at step 2300, the fine-grained blocks are clustered using a value x, height value, within some tolerance. Then, at step 2310, the blocks are subclustered by block width. All possible page-spanning column chains are then constructed at step 111. A column chain is a set of blocks such that each block has as its left boundary the same x value as another block's right boundary and vice-versa, within some tolerance. The first block has only the same right boundary as another block and the last block has only the same left boundary as another block. A page-spanning column chain is one whose horizontal extent is the width of the printed material on the page. Each chain is then scored, at step 2320, by replacing each block with the sum of the areas of all blocks in its subcluster. The chain with highest score is selected at step 2330 and the column boundaries it defines are extracted at step 2340.

The page spanning chains generated at step 111 are produced in accordance with FIG. 24 which is a flowchart for the Construct All Possible Page-spanning column chains step 111 shown in FIG. 23. FIG. 24 corresponds to source code which can be found in the software appendix in the process chain.pl. In FIG. 24, N is the total cluster count, M is the maximum first link index, and L is a link or subcluster. The first subscript for L is a cluster index and the second subscript for L identifies a subcluster within that cluster.

First, at step 2400, the total number N of clusters generated at steps 2300 and 2310, shown in FIG. 23, is determined. The maximum first link index M is determined, at step 2410, by dividing N by 2. At step 2420, a link or subcluster Lij which is less than or equal to M is chosen. Lij becomes the seed or initial link for constructing the chain. The remainder of the chain is generated by inductive step 112.

FIG. 25 is a flowchart of the Inductive step 112 shown in FIG. 24. FIG. 25 corresponds to source code which can be found in the software appendix as the process chain.pl. In FIG. 25, a link L is a subcluster. The first subscript of L is a cluster index and the second subscript for L is for a subcluster within that cluster.

Let the current link subcluster be denoted by Lij and let the remaining clusters be denoted by Lrs where r>i. First, if there are clusters remaining, as determined at step 2500, the chain construction process proceeds to step 2505 to choose a subcluster Lmn where m is greater than i. Otherwise, construction of the current chain is completed and the current chain is tested to see whether it spans the page at step 2530. If the current chain does span the page, as determined at step 2530, it is retained at step 2545. Otherwise the current chain is discarded at step 2535. At step 2540, if more seed links exist, the next seed is chosen at step 2550 and designated the current seed at step 2555.

Returning to step 2505, chain construction is explained below. A subcluster Lmn is chosen, at step 2505, from the remaining clusters Lrs, where r>i and where the current subcluster is Lij. Then, at step 2510, it is determined whether Lmn abuts Lij on the right within some tolerance. If it does, then Lij becomes the new current link at step 2525 and the loop returns to step 2500 to determined whether there are any more subclusters. If, at step 2520, it is determined Lmn does not abut Lij, then the next subcluster is chosen at step 2520 and step 2505 is repeated.

After the processing at step 108 is completed, a geometric structure tree is created at step 109. FIG. 26 is a flowchart for the Create Geometric Structure Tree step 109 shown in FIG. 14. FIG. 26 corresponds to source code which can be found in the software appendix as processes col_bands.pl and build_geom_tree.pl.

At step 2600, shown in FIG. 26, the coarse blocks, from XY Tree Segmentation 12, are grouped, at step 2600, into horizontal bands. The fine-grained blocks are assigned, at step 2610, to the coarse blocks in which they lie. Next, for each horizontal band a geometric structure tree is determined for the fine blocks in the horizontal band at step 113. Then, the respective geometric structure trees are merged at step 2620.

FIG. 27 is a flowchart for the Determine Geometric Structure Tree For Fine Blocks In Each Horizontal Band shown in FIG. 26. FIG. 27 corresponds to source code which can be found in the software appendix as the processes inset_boxes.pl and build_geom_tree.pl.

First, the fine blocks are partitioned, at step 114, into fine blocks which are column-aligned and those which are not column-aligned. Partitioning is performed by testing each fine block with respect to column alignment in accordance with the flow chart shown in FIG. 28. Those blocks which are column-aligned are said to lie in the base plane and those blocks which are non-column-aligned are said to lie in an overlay plane. A geometric structure tree is then created, at steps 115, for the column-aligned blocks and the non-column-aligned blocks. The resulting trees are merged, at step 2700, by inserting the overlay tree into the base tree. In accomplishing this tree merger, it is assumed that an inset block (i.e., a non-column-aligned block) belongs to the same topical entity (an article in the case of a newspaper) as its surrounding text. Further, an inset block is deemed to be of secondary importance relative to that text, so the present invention makes its node the youngest child of the text's parent node. This process of tree formation and merger is also illustrated in FIG. 9.

FIG. 28 is a flowchart for the Partition Blocks Into Column-Aligned, Non-Column-Aligned step 114 shown in FIG. 27. FIG. 28 corresponds to source code which can be found in the software appendix as the process inset_boxes.pl. In FIG. 28, "Aligns left" is defined as the block's left edge aligns with the left edge of some column within some tolerance; "Aligns right" is defined as the block's right edge aligns with the right edge of some column boundary within some tolerance; "Column complement to right" is defined as the region between a block's right edge and the closest column boundary further right; "Column complement to left" is defined as the region between a block's left edge and the closest column boundary further left; and "Whitespace region" is defined as a region which does not intersect with any block.

A block to be examined at step 2800 is a column aligned block if:

(1) the block aligns left and aligns right as determined at steps 2805 and 2835, respectively;

(2) the block aligns left and the column complement right is whitespace as determined at steps 2810 and 2840, respectively;

(3) the block aligns left and any block which intersects the column complement right is not wholly contained in the same column as determined at steps 2815 and 2845, respectively;

(4) the block aligns right and the column complement left is whitespace as determined at steps 2820 and 2850, respectively;

(5) aligns right and any block which intersects the column complement left is not wholly contained by the same column as determined at steps 2825 and 2855, respectively; or (6) the column complement left is whitespace and the column complement right is whitespace for the block as determined at steps 2830 and 2860, respectively.

If the block does not meet one of the six criteria above, the block is non-column-aligned, an inset block.

Figure 29:
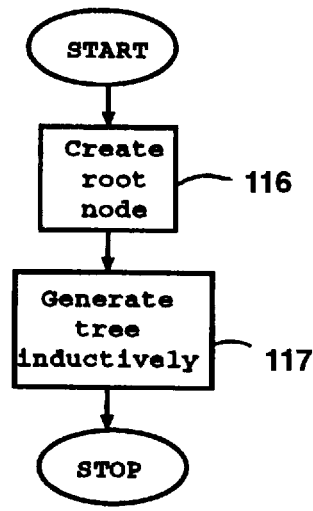
FIG. 29 is a flowchart showing, in greater detail, sequence of operation for each of steps 115 of FIG. 27.

FIG. 29 is a flowchart for the Create Geometric structure Tree For Column-Aligned and Create Geometric structure Tree For Non-Column-Aligned steps 115 shown in FIG. 27. The flow chart in FIG. 29 corresponds to source code in the software appendix in the process build_geom_tree.pl. As shown in FIG. 29, at step 116, a root node is created and the tree is then generated inductively at step 117.

Figure 30:
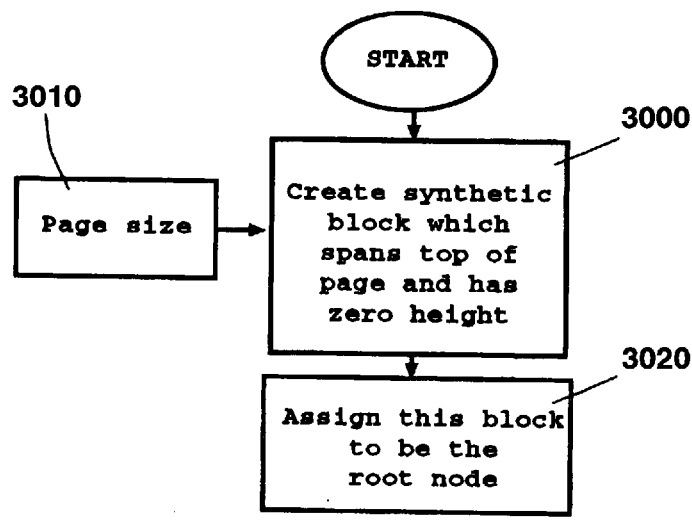
FIG. 30 is a flowchart showing, in greater detail, sequence of operation of step 116 of FIG. 29.

The root node is created in accordance with FIG. 30 which is a flowchart for the Create Root Node step shown in FIG. 29. FIG. 30 corresponds to source code which can be found in the software appendix in procedure build_geom_tree.pl. At step 3000, a synthetic block is created which spans the top of the page and has zero height. The synthetic block is generated using the page size provided at step 3010. The synthetic block is assigned to be the root node at step 3020.

Figure 31:
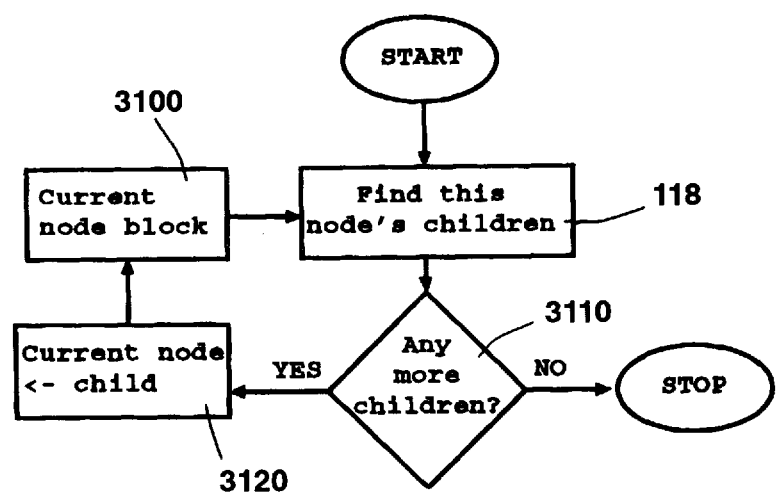
FIG. 31 is a flowchart showing, in greater detail, sequence of operation of step 117 of FIG. 29.

FIG. 31 is a flowchart for the Generate Tree Inductively step 117 shown in FIG. 29. FIG. 31 corresponds to source code which can be found in the software appendix in the procedure build_geom_tree.pl. As shown in FIG. 31, the children of the node are found at step 118. The current node, the root node, for which children are found is provided from step 3100. Then, if it is determined, at step 3110, that there are no more children, the process halts. Otherwise, each child in turn becomes the current node, at step 3120, and the process starts anew at step 118.

Figure 32:
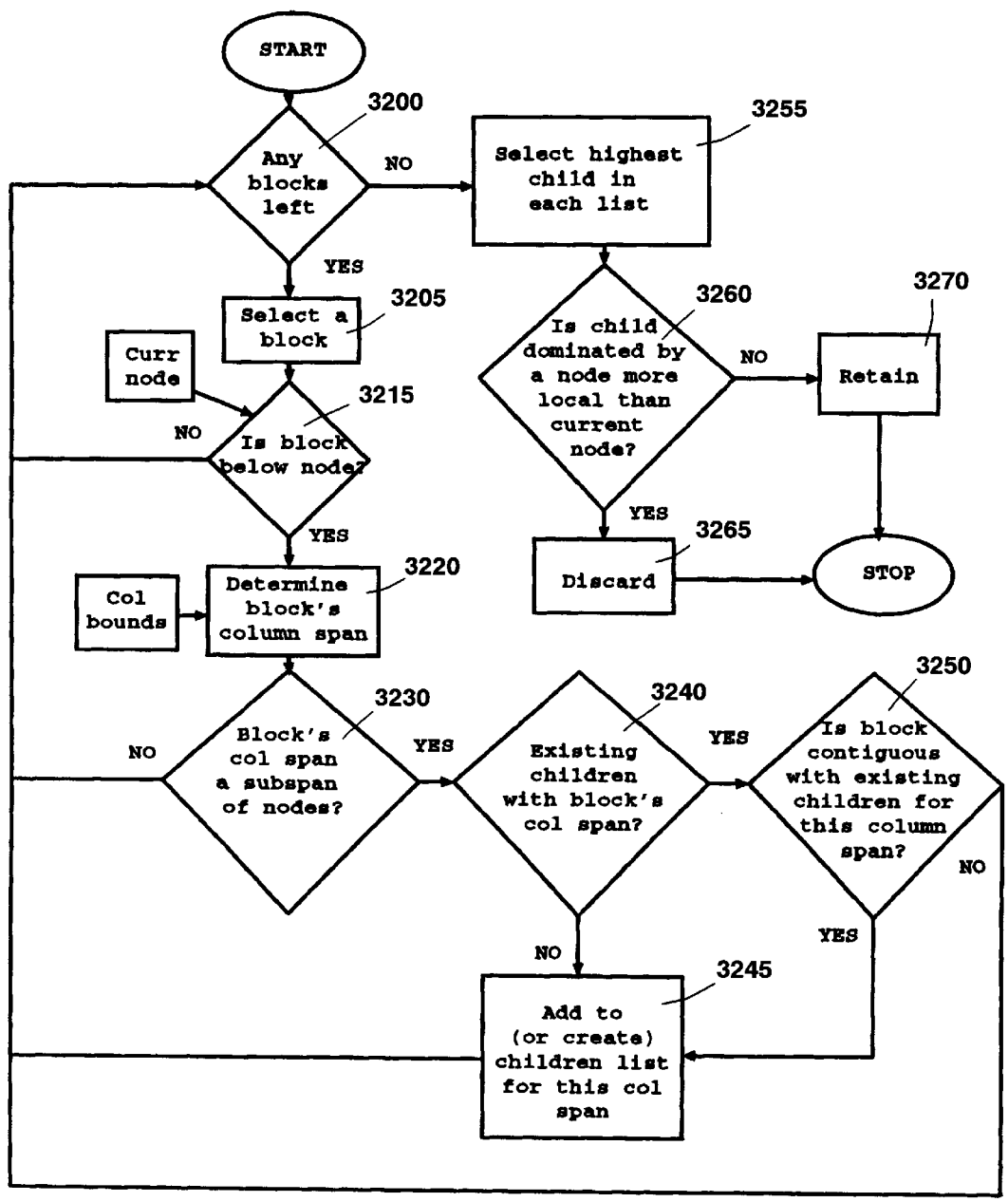
FIG. 32 is a flowchart showing, in greater detail, sequence of operation of step 118 of FIG. 31.

The children nodes at step 118, shown in FIG. 31, are generated in accordance with FIG. 32 which is a flowchart for the Find This Node's Children step shown in FIG. 31. FIG. 32 corresponds to source code which can be found in the software appendix in the process build_geom_tree.pl.

First, at step 3200, it is determined if there are any blocks remaining. If there are blocks remaining, a block is selected, at step 3205, as a candidate block and it is determined, at step 3215, if the candidate block is below the current node. If it is determined that the block is below the node, then at step 3220 the span of the block's column is determined. If the candidate block is not below the node, then step 3200 is repeated.

Next, it is determined, at step 3230, if the column span of the block is a subspan of the current node. If it is a subspan, then, at step 3240 it is determined if other children have the same column span as column span of the block. If there are no existing children with the same column span, then a new children list is started with the column span of the block at step 3245 and processing proceeds to step 3200. Otherwise, it is determined, at step 3250, if the candidates block is contiguous with existing children for this column span. If it is contiguous, then the candidate block is added to the list of children, at step 3445, and processing determines if there is another block at step 3200. If there are existing children of the same column span and the candidate block is not contiguous, then processing proceeds directly to step 3200.

When all blocks have been processed, the highest child in each list is selected at step 3255. If it is determined, at step 3260, that the a highest child is not dominated by a node more local to it than the current parent node, it and its siblings are retained, at step 3270, as a child node. Otherwise the node is discarded at step 3265. A node N2 is dominated by a node N1 if N1 is above N2 and N2's column span does not exceed that of N1.

FIG. 33 is a flowchart for the Logical Transformation step shown in FIG. 14. FIG. 33 corresponds to code in source code xform_geom_tree.pl and build_geom_tree.pl.

A logical transformation is accomplished by applying in turn, a set of transformation rules. The sequence of rule application is Rule S, Rule A, Rule B, Rule C, and Rule D. The transformed tree is then written out to a file.

The rule specifications are as follows:
Rule S
Reorder the children of a node so that child nodes which are groups delimited by separator lines become the "youngest" children of the node. This allows inset boxes of text or photos to be isolated so that the text which flows around them can be connected. This could be described as a "textist" philosophy because it allows text portions to dominate (be the elder children) non-text portions such as photos. This rule is to be applied before Rules A, B, C and D.
Rule A
If the first element of the second node in the pair is a body, then remove it from the second node and append it to the first node. Continue until a head is encountered or the list is exhausted. If the list is exhausted, remove the branch leading to it from the tree. When processing has been completed for a given pair, apply it to the pair comprised of the second node from the previous pair and the next (non-null) node. In other words, given two adjacent (in a depth-first ordering) nodes, if the second starts with a body block, remove it and append it to the first. Do this until a head block is reached. In practice this follows the flow of an article which "snakes" upward to the next column.
Rule B
If the last element of the first node in the pair is a head, then remove the first element from the second node in the pair and append it to the first node. Continue as long as the elements being appended are heads and then take one more node—or until the list is exhausted. If the list is exhausted, remove the branch leading to it from the tree. When processing has been completed for a given pair, apply it to the pair comprised of the second node from the previous pair and the next (non-null) node. In other words, given two adjacent (in a depth-first ordering) nodes whose parent is not root, if the first ends with a head, then remove the first element of the second node and append it to the first. Do this until a body block is moved. In practice this connects body blocks in the next column with a head which falls at the bottom of the current column.
Rule C
Given a node in which an element other than the first is a "head" block, partition the node into two nodes such that all the elements preceding the head block comprise the first node and the rest comprise the second. The two new nodes will be siblings which together will replace the node from which they sprang. Descendants of the original node will belong to the second partition. Apply the rule recursively to the second new node until the original node is completely partitioned into sublists each beginning with a "head", possibly excepting the first. In other words, if a node contains two (or more) sequences beginning with a head block, then they are likely to be individual articles or sections. Split them.
Rule D
Because the other rules (rule A, rule B, and rule C) will already have been applied, we should only encounter a "head" sequence at the front of the node. If we do find such a sequence, then partition the node into the "head" sequence and a child node of all the "body" blocks.

As mentioned above, analyzer 10 uses assumptions based on knowledge of expected layouts. These assumptions, knowledge and layout are for Western-language document pages. Such pages are read from the top down, and from left to right; however, this rule could be adjusted if, for example, Hebrew-language documents, that are read from the top down but from right to left are expected instead. Also, a headline is assumed to be above its article and as wide (same span) as its article. A picture caption is assumed to be below the picture to which it refers. A body block is assumed to go with the immediately preceding head blocks. The children of a node of a tree are sets of blocks each of which sits beneath the node, is contiguous, has the same column span, has a column span which is a subspan of that for the node, has a lead child which is the highest block in the set, and is not dominated by any block more local than the node. Rule lines denote article or paragraph boundaries. Columns are a key organizing principle. A page may have multiple sets of column configurations. After reading down, the reading order will snake back up and to the right, if a head block or a block with a wider column space is encountered. If reading goes to the right, then the reading order moves up to the parent of the node from which the reading is continuing. Inset blocks are logically related to the surrounding material and are subordinate to it. Articles near the top of the page or which span a wide number of columns are considered more important than articles that do not.

Some of the many advantages of the invention should now be readily apparent. For example, a novel document page analyzer has been provided which is capable of geometrically segmenting an image of the page and logically organizing the result of such segmentation. The present invention automates the process of assembling the text into the correct reading order for a given document page, even for complex layouts. The present invention uses image-based features, text-based features and assumptions based on layout knowledge to find the correct reading order of the blocks on a document page. The present invention can handle complex layouts which have multiple configurations of columns on a page and inset material (such as figures and inset text blocks). "Inset material" here refers to blocks which are not column-aligned on at least one side.

Obviously, many modifications and variations of the present invention are possible in light of the above teachings. It is therefore to be understood that the foregoing embodiments are presented by way of example only and that, within the scope of the appended claims and equivalents thereto, the invention may be practiced otherwise than as specifically described.

main.c — Page 1

```c
/*  SegmentCB:   invokes the image-based segmentation */ include "Idus.h"

/* External variables */ extern byte         *image;                         /* Image */
extern long         xsize,      ysize;              /* Image dimensions */
extern long         count;                          /* Number of regions */ extern long         gnodenum,   gblocknum,
                    lnodenum,   lblocknum,
                    mergenum;

extern NODE         **gnodes,   **lnodes;
extern BLOCK        **gblocks,  **lblocks;

extern XRectangle *region;                          /* Region coordinates */
extern XRectangle *ruleLines;                       /* Ruleline */
                                                    /* coordinates */

/*
 * SegmentCB:  Image-based segmentation
 *
 */
void
    SegmentCB()
{
    register int    i;
    byte            *timage, *nimage;
    long            n;

if (!image)
    {
        display_error(w,"No image to segment.");
        return;
    } if (!(timage = (byte *)malloc(sizeof(byte)*xsize*ysize)))
    {
        display_error(w,"Cannot malloc image\n");
        return;
    } for (i=0;i<xsize*ysize;i++)
        *(timage+i) = *(image +i);
    strcpy (directory, getenv("IDUS"));

/* Removes horizontal and vertical lines              */
    line_remove2(timage,xsize,ysize);
    nimage = transpose_image(timage,xsize,ysize);
    free(timage);
    line_remove2(nimage,ysize,xsize);
    timage = transpose_image(nimage,ysize,xsize);
    free(nimage);

/* Performs the XY-tree segmentation */
    XYtree(timage, xsize, ysize);
    read_blocks ("temp.xy");

/* Performs a the run-length smoothing algorithm */
    if (!(RLSA(timage, xsize, ysize, region, count, w)))
    {
        display_error(w,"Cannot perform RLSA.");
        return;
    } read_blocks ("temp.rlsa");

/* Performs the merging of isolated words into heads */
    mergeblock(image,xsize,ysize,region,count);
    read_blocks ("temp.blk");

/* Appends rule_lines to the block file */
``` main.c Page 2

```c
    if (fp = fopen ("temp.blk", "a"))
    {
        for (i=0; i<ruleNum; i++)
            fprintf(fp, "%3d %3d %3d %3d   0\n",
                    ruleLines[i].x, ruleLines[i].y,
                    ruleLines[i].width, ruleLines[i].height);
        fclose (fp);
    }
    free(timage);
    ocr();

/* Invokes the geometric-to-logical transformations */

/* Call to prolog program
        demotree +f +z <'Arg1'> <'Arg2'> <'Arg3'>
        The +f flag is for fast start. This means it does not look for a
        Prolog init file in the user's home directory.
        The +z flag indicates that all further arguments are user's
        arguments. It is safest to enclose each argument in single quotes.
        The three arguments are:
        Arg1 : The directory from which input files are to be read
        Arg2 : The directory into which output files are to be written
        Arg3 : The document page ID in the form of a file name root.
    */
    system ("demotree +f +z . . temp", "r");
    return;
}

/*
 * read_blocks: reads block file
 *
 */
short
    read_blocks(char *filename)
{
    FILE        *fp;
    char        line[50];
    long        i;
    long        r,c,stcol,strow,col,row;
    long        w_height, w_width;
    Arg         args[10];

if ((fp = fopen(filename,"r")) == NULL)
    {
        fprintf(stderr,"Cannot open file\n");
        return(0);
    } count = -1;
    while (fgets(line,50,fp))   count++;

if (count == 0) return(0);
    if (region != (XRectangle *) NULL)
        free(region);

if (!(region = (XRectangle *)malloc(sizeof(XRectangle)*count)))
    {
        fprintf(stderr, "Cannot malloc region\n");
        return(0);
    }
    rewind(fp);

fgets(line,50,fp);

/* Read data into region structure */
    i=0;
    while (fgets(line,50,fp))
    {
        sscanf(line,"%d %d %d %d",&stcol,&strow,&col,&row);
        region[i].x      = stcol;
        region[i].y      = strow;
        region[i].width  = col;
        region[i].height = row;
```

```
      i++;
   }
   fclose(fp);
   return(1);
}
``` lines.c Page 1

```c
/*
 * lines.c
 *
 * Routines:
 *      display_lines
 *      is_rule_line
 *      line_remove2
 *      rule_lines
 *
 */ include "Idus.h"

extern long            ruleNum;
extern XRectangle      *ruleLines;

/*
 * rule_lines: Finds horizontal rule lines
 *
 *              Detect lines of 40 pixels or more
 *              Connected Component analysis
 *              Bounding boxes and check aspect ratio
 *              Represent with a height of 1
 */
short
    rule_lines(byte *bimage, long bxsize, long bysize)
{
    register int    i,j,k;
    byte            *nimage, *timage;    /* Temporary images for */
                                         /* transposing image */
    byte            *line_image;
    short           **shortin, **label;  /* Arrays needed for */
                                         /* connected component */
                                         /* analysis */
    long            run_count  = 0;
    long            min_number = 20;
    long            num, x, y, width, height;
    long            component_area[MAX_UNCOMPACTED_COMPONENTS];
    long            threshold_level = 128;
    BOUNDING_RECT   *bounding_rects;
    FILE            *fp;

line_image =
        (byte *)malloc(bxsize*bysize*sizeof(byte));

if (!line_image)
    {
        fprintf(stderr, "Cannot calloc line_image.\n");
        return(-1);
    } for (i=0; i<bxsize*bysize; i++)
        line_image[i] = 0;

/* Remove vertical lines */
    /* Need to transpose image first since line removal works on */
    /* horizontal lines only */
    nimage = transpose_image (bimage, bxsize, bysize);
    line_remove2 (nimage, bxsize, bysize);
    timage = transpose_image (nimage, bysize, bxsize);
    free(nimage);

/* Scan each row of the image   */
    /* Look for "black" run lengths */
    /* Mark all members of a "black" run length as 255 */
    for (i=0; i<bysize; i++)
    {
        j = 0;
        while (j < bxsize)
        {
            if (!timage[i*bxsize+j])         /* start of a run length */
            {
                while ((j < bxsize) && (!timage[i*bxsize+j]))
``` lines.c — Page 2

```c
            {
                run_count++;
                j++;
            }
            /* Set pixels in run length to 255 */
            if (run_count > min_number)
                for (k = j-run_count; k <= j; k++)
                    line_image[i*bxsize+k] = 255;
        }
        j++;
        run_count = 0;
    }
} free (timage);

/* Find connected components */

AllocateShortImage(&shortin, bxsize, bysize);
AllocateShortImage(&label,   bxsize, bysize);

for (i=0; i<bysize; i++)
    for (j=0; j<bxsize; j++)
        shortin[i][j] = (short) line_image[i*bxsize+j];

threshold_level = 128;
ConnectedComponents (shortin, label, component_area,
                     bxsize, bysize, threshold_level);

FreeShortImage(shortin, bxsize, bysize);

/* Count the number of connected components */
num = 0;
for (i=0; i<bysize; i++)
    for (j=0; j<bxsize; j++)
        if  (label[i][j] > num) num = label[i][j];

if (num == 0)
{
    fprintf(stderr,"\n Number of connected components is %d.\n",
            num);
    return(-1);
} if (!(bounding_rects = find_bounding_rects(label, bxsize, bysize,
                                           num)))
{
    fprintf(stderr, "Cannot malloc bounding rects.\n");
    return (-1);
}

FreeShortImage(label,   bxsize, bysize);

ruleLines = (XRectangle *)malloc(sizeof(XRectangle) * num);
if (!ruleLines)
{
    fprintf(stderr, "Cannot malloc rule lines.\n");
    return (-1);
} ruleNum = 0;
for (i=0; i<num; i++)
{
    x      = bounding_rects[i].x_min;
    y      = bounding_rects[i].y_min +
             (bounding_rects[i].y_max - bounding_rects[i].y_min)/2;
    width  = bounding_rects[i].x_max - bounding_rects[i].x_min + 1;
    height = bounding_rects[i].y_max - bounding_rects[i].y_min + 1;

/* Put the lines into the XRectangle structure */ if (width > 0)
    {
        ruleLines[ruleNum].x = x;
``` lines.c — Page 3

```c
            ruleLines[ruleNum].y = y;
            ruleLines[ruleNum].width = width;
            ruleLines[ruleNum].height = 1;
            ruleNum++;
        }
    } free (line_image);
    free (bounding_rects);

/* Merge lines together */
    connect_rule_lines();
    return(1);
}

/*
 * line_remove2: Removes lines using run length encoding
 *               Records horizontal rule lines
 *
 */
void
    line_remove2(byte *nimage, long nxsize, long nysize)
{
    register int i,j,k;
    long run_count = 0;
    long min_number = 20;              /* Arbitrary number */
                                       /* was 40 */

/* Scan each row of the nimage */
    for (i=0; i<nysize; i--)
    {
        j = 0;
        while (j < nxsize)    /* make sure its not the end of line */
        {
            if (!nimage[i*nxsize+j])  /* start of a run length */
            {
                while ((j<nxsize) && (!nimage[i*nxsize+j])) /* count
                                                        consecutive
                                                        pixels */
                {
                    run_count++;
                    j++;
                }
                if (run_count > min_number)
                    for (k=j-run_count; k<=j; k++)
                        nimage[i*nxsize+k] = 255;
            }
            j++;
            run_count = 0;
        }
    }
    /* Record horizontal rule lines */
    rule_lines(image, xsize, ysize);
}

/*
 * is_rule_line: Test if connected component is a rule line
 *
 */
long
    is_rule_line (XRectangle sample)

{
    double aspect_ratio;
    long   x, y, width, height;

x      = sample.x;
    y      = sample.y;
    width  = sample.width;
    height = sample.height;

if (width < 0)         return (0);
``` lines.c — Page 4

```c
    aspect_ratio = (double)width/(double)height;
    if (aspect_ratio < 40 )   return(0);

return(1);
}

/*
 *
 * connect_rule_lines: connects broken pieces of lines
 *
 */ void
    connect_rule_lines()
{
    register int  i,j;
    long          rxmax, rxmin;    /* Calculate minimum x value and */
                                   /* extend of merged rule line    */
    XRectangle    *tempLines;      /* Temporary storage of rule */
                                   /* lines */
    XRectangle    *shortLines;     /* Keeps track of short line */
                                   /* segments */
    long          shortNum;        /* Number of short segments */
    long          tempNum;         /* Temporary storage for number */
                                   /* of rule lines */

/* First sort into short and long lines                        */
    /* Loop through all "long" lines and connect                   */
    /* Indicate if line is short or already merged by height = 0 */ shortLines = (XRectangle *)malloc (sizeof(XRectangle) * ruleNum);
    if (!shortLines)
    {
        fprintf(stderr, "Cannot malloc shortLines.\n");
        return;
    }

/* Form "short" line list */
    shortNum  = 0;
    for (i=0; i<ruleNum; i++)
        if (!is_rule_line(ruleLines[i]))
        {
            shortLines[shortNum].x      = ruleLines[i].x;
            shortLines[shortNum].y      = ruleLines[i].y;
            shortLines[shortNum].width  = ruleLines[i].width;
            shortLines[shortNum].height = ruleLines[i].height;

/* Indicate that rule line should not be considered as */
            /* "long" */
            ruleLines[i].height= 0;
            shortNum++;
        }

/* Loop through "long" line list and connect segments along same y */
    /* value */
    for (i=0; i<ruleNum-1; i++)
        for (j=i+1; j<ruleNum; j++)
            if ( (ruleLines[i].height) && (ruleLines[j].height) )
            {
                if (abs(ruleLines[i].y - ruleLines[j].y) < 4)
                {
                    rxmax = DMAX(ruleLines[i].x + ruleLines[i].width,
                                 ruleLines[j].x + ruleLines[j].width);
                    rxmin = DMIN(ruleLines[i].x, ruleLines[j].x);
                    ruleLines[i].x = rxmin;
                    ruleLines[i].width = rxmax - rxmin + 1;
                    ruleLines[j].height = 0;
                }
            }

/* Now compare new "long" list with "short" list and look for */
    /* segments along same y value */
    for (i=0; i<ruleNum; i++)
        if (ruleLines[i].height)            /* line exists */
```

```
                                                                              lines.c                                    Page 5

{
                for (j=0; j<shortNum; j++)
                    if (shortLines[j].height)   /* line exists */
                    {
                        if (abs(ruleLines[i].y - shortLines[j].y) < 4)
                        {
                            rxmax = DMAX(ruleLines[i].x + ruleLines[i].width,
                                         shortLines[j].x + shortLines[j].width);
                            rxmin = DMIN(ruleLines[i].x, shortLines[j].x);
                            ruleLines[i].x = rxmin;
                            ruleLines[i].width = rxmax - rxmin + 1;
                            shortLines[j].height = 0;
                        }
                    }
            }

/* Recalculate final number of rule lines and eliminate spaces */
    /* with 0 height */
    tempLines = (XRectangle *)malloc(sizeof(XRectangle)*ruleNum);

tempNum = 0;
    for (i=0; i<ruleNum; i++)
    {
        if (ruleLines[i].height)
        {
            tempLines[tempNum].x     = ruleLines[i].x;
            tempLines[tempNum].width = ruleLines[i].width;
            tempLines[tempNum].y     = ruleLines[i].y;
            tempLines[tempNum].height = 1;
            tempNum++;
        }
    }
    free(ruleLines);
    ruleNum = tempNum;
    ruleLines = tempLines;
}
``` xytree.c — Page 1

```c
/*================================================================*/
/*                                                                */
/* title       : Block Segmentation of a Document Image using the */
/*               X-Y tree method                                  */
/*                                                                */
/*                                                                */
/*                                                                */
/*                                                                */
/*                                                                */
/* Output        The file <tree> will contain the x-y tree produced */
/*               of the image with number of cuts equal to CUTLEVEL */
/*                                                                */
/*               Another file that will be produced is called    */
/*               "blocks" and contains the coordinates of those  */
/*               non-white segmented blocks.  This file is the input */
/*               file to the program "block.c" to produce segmented */
/*               block image */
/* Author:
 *      Suzanne Taylor
 *      Paramax Systems Corporation
 *
 * Routines:
 *      clear_space
 *      compute_hough_transform
 *      detect_white_space
 *      find_position
 *      makenode
 *      outputresult
 *      partition
 *      printblocks
 *      printree
 *      xysegment
 *      XYtree
 *      white_region
 */ include "Idus.h"
include "XYtree.h"

void
    XYtree(byte *newimage, long newxsize, long newysize)
{
    register    int i,j;
    long        dir = VERT;         /* Initial direction of */
                                    /* partition */
    long        white,
                dlevel = 10,        /* num. of level of tree */
                                    /* to be built.         */
                start_level=0;
    struct node *x_y_tree;
    char        command[100];

XYimage = newimage;
    XYxsize = newxsize;
    XYysize = newysize;

x_y_tree = makenode (0,0, newysize-1, newxsize-1, dir,
                    NOT_WHITE_REG);
                    /* build root node of tree */
    xysegment (x_y_tree, start_level, dlevel);
    /* Write output to file */
    outputresult (x_y_tree, "temp.xy");
    return;
}

/*================================================================*/
/*                                                                */
/* Segment: recursive function that partitions a block pointed at */
/*          by 'ptr' at tree level 'level' that should be smaller */
/*          than the level of partition 'dlevel'                  */
/*================================================================*/
``` xytree.c Page 2

```c
void
    xysegment (struct node *ptr, long level, long dlevel)
{
    long row, col, strow, stcol;
    long height, width;
    struct node *child_ptr;

height = ptr -> loright_row - ptr -> upleft_row;
    width  = ptr -> loright_col - ptr -> upleft_col;

if (white_region (ptr) > 0)
        ptr -> white = WHITE_REG;
    else
        if (level < dlevel)
        {
            {
                if ((height >= para_height) && (width >= col_width))
                {
                    find_position(ptr, &row, &col, &strow, &stcol);
                    clear_space();
                    compute_hough_transform
                        ( ~(ptr->dir), row, col, strow, stcol);
                    if ((child_ptr = partition(~(ptr->dir),ptr)) == NULL)
                    {
                        compute_hough_transform(ptr->dir, row, col, strow,
                            stcol);
                        if ((child_ptr = partition(ptr->dir, ptr)) ==
                            NULL) return;
                    }
                    while (child_ptr != NULL)
                    {
                        xysegment (child_ptr, level + 1, dlevel);
                        child_ptr = child_ptr -> sib;
                    }
                }
            }
        }
}

/*==================================================================*/
/*                                                                  */
/* partition: partition the block pointed at by 'bl_ptr' in vert.   */
/*            or hor. direction indicated by 'dir'. Making up the   */
/*            next level of the tree, returning the pointer to these*/
/*            nodes built.                                          */
/*                                                                  */
/*==================================================================*/ struct node *partition (long dir, struct node *bl_ptr)
{
    struct node *head, *aux, *ptr;

long    image_coord,
            next_loright_col,
            next_upleft_row,
            found,
            rho_cut,
            end_rho_coord;

found = -1;
    if (dir == HOR)
        end_rho_coord = MAX_RHO - (XYysize /2) + bl_ptr ->upleft_row;
    else
        end_rho_coord = MAX_RHO + (XYxsize /2) - bl_ptr ->loright_col;
    next_loright_col = bl_ptr -> loright_col;
    next_upleft_row  = bl_ptr -> upleft_row;
    head = makenode (0,0,0,0,0,0);
    aux = head;

while ((rho_cut = detect_white_space (dir, &end_rho_coord,
                                          bl_ptr))> 0)
    {
        found =1 ;
        if (dir == HOR)
``` xytree.c   Page 3

```c
        {
            image_coord = rho_cut - (MAX_RHO - (XYysize /2));
            ptr = makenode (next_upleft_row, bl_ptr-> upleft_col,
                            image_coord, bl_ptr -> loright_col, dir,
                            NOT_WHITE_REG);
            next_upleft_row = image_coord + 1;
        }
        else
        {
            image_coord = MAX_RHO + (XYxsize /2) - rho_cut;
            ptr = makenode(bl_ptr -> upleft_row, image_coord, bl_ptr->
                            loright_row, next_loright_col, dir,
                            NOT_WHITE_REG);
            next_loright_col = image_coord -1;
        }
        aux -> sib = ptr;
        aux = ptr;
    } if (found == -1)
    {
        bl_ptr->next = NULL;
        return(NULL);
    }
    else
    {
        if (dir==HOR)
            ptr = makenode (next_upleft_row, bl_ptr->upleft_col,
                            bl_ptr->loright_row, bl_ptr->loright_col,
                            dir,NOT_WHITE_REG);
        else
            ptr = makenode (bl_ptr->upleft_row, bl_ptr->upleft_col,
                            bl_ptr->loright_row, next_loright_col,
                            dir, NOT_WHITE_REG);
        aux -> sib = ptr;
        bl_ptr -> next = head -> sib;
        return(bl_ptr->next);
    }
}

/*================================================================*/
/*                                                                */
/* white_region: check if the entire block contains only white    */
/*               pixels                                           */
/*                                                                */
/*================================================================*/ int white_region (struct node *bl_ptr)
{
    long row, col, strow, stcol, i,j;
    find_position(bl_ptr, &row, &col, &strow, &stcol);
    for (i=strow; i < strow+row; i++)
        for (j=stcol; j < stcol+col; j++)
            if (XYimage[i*XYxsize+j] == BLACK)   return(-1);
    return(1);
}

/*================================================================*/
/*                                                                */
/* find_position: find out all the necessary information from     */
/*                a node for Hough transform of that block        */
/*                                                                */
/*================================================================*/ find_position(struct node *block_ptr, long *rows, long *cols, long
              *strow, long *stcol)
{
    *rows  = block_ptr -> loright_row - block_ptr -> upleft_row + 1;
    *cols  = block_ptr -> loright_col - block_ptr -> upleft_col + 1;
    *strow = block_ptr -> upleft_row;
    *stcol = block_ptr -> upleft_col;
}
``` xytree.c — Page 4

```c
/*================================================================*/
/*                                                                */
/* clear_space: set the rho_theta_space all to zero. Ready for    */
/*              another Hough transform computation.              */
/*                                                                */
/*================================================================*/
clear_space()
{
    long rho;

for(rho=0; rho <= RHO_VALUES; rho++)
    {
        rho_theta_space [rho][1] = 0;
        rho_theta_space [rho][0] = 0;
    }
}

/*================================================================*/
/*                                                                */
/* detect_white_space : detect any white gap within the block     */
/*                      pointed at by 'bl-ptr' starting at rho    */
/*                      value 'rho_coord' with direction 'dir'.   */
/*                                                                */
/*================================================================*/
int
    detect_white_space(long dir, long *rho_coord, struct node *bl_ptr)
{
    long start_rho, end_rho, pixel, plateau, dir_index,
        black_start, end_region, last_black, threshold, stop=0;

plateau = 0;
    end_region = -1;
    start_rho = *rho_coord;
    pixel = start_rho;
    if (dir == HOR)
    {
        end_rho = MAX_RHO - (XYysize/2) + bl_ptr -> loright_row;
        dir_index = 1;
        threshold = row_threshold;
    }
    else
    {
        end_rho = MAX_RHO + (XYxsize/2) - bl_ptr -> upleft_col;
        dir_index = 0;
        threshold = col_threshold;
    } if (rho_theta_space [start_rho][dir_index] <= threshold)
        black_start = -1;
    else
        black_start = 1;

while ((stop !=1) && (pixel <= end_rho))
    {
        if (rho_theta_space [pixel][dir_index] <= threshold)
        {
            if ((black_start == 1) && (end_region == -1))
            {
                last_black = pixel -1;
                end_region = 1;
            }
            pixel++;
            plateau++;
        }
        else
            if ( (plateau > orig_width) || (black_start == -1))
                stop =1;
            else
            {
                end_region = -1;
                pixel ++;
``` xytree.c Page 5

```
                plateau = 0;
            }
        } if ((stop ==1) && (pixel < end_rho))
        if (black_start == 1)
        {
            *rho_coord = last_black + 1;
            return (last_black);
        }
        else
        {
            *rho_coord = pixel;
            return(pixel-1);
        }
    /* New code added to detect end of row or column */
    /* Causing a seg fault on some images           */
/*      else if ((end_rho == MAX_RHO - XYysize/2) && (dir == HOR) &&
                (black_start == 1))
        {
            *rho_coord = last_black + 1;
            return(last_black);
        } else if ((end_rho == MAX_RHO + XYxsize/2) && (dir == VERT) &&
                (black_start == 1))
        {
            *rho_coord = last_black + 1;
            return(last_black);
        }
*/
        else
            return(-1);
}

/*===============================================================*/
/*                                                               */
/* makenode : build up node, store the required information in it */
/*                                                               */
/*===============================================================*/ struct node *makenode (long row1, long col1, long row2, long col2, long
                        dir, long white)
{
    struct node *p;

p = (struct node *) calloc (1, sizeof (*p));

p -> upleft_row = row1;
    p -> upleft_col = col1;

p -> loright_row = row2;
    p -> loright_col = col2;
    p -> dir    = dir;
    p -> white  = white;
    p -> next   = NULL;
    p -> sib    = NULL;
    return(p);
}

/*===============================================================
 * compute_hough_transform: computes the Hough transform of the input image,
 *                          and stores the resulting transform in the
 *                          array "image". The Hough space is
 *                          parameterized by RHO and THETA.
 *
 *                          The equation used in computing RHO is
 *                              RHO = x * cos(THETA) + y * sin(THETA)
 *
 *                          Let L be a line. RHO is the length of the
 *                          line, P, that starts from the orign (x,y) =
 *                          (0,0), and cuts L perpendicularly.
 *                          THETA is the inclination P makes with the x
 *                          (horizontal) axis.
```

| xytree.c | Page 6 |

```
*
*   Aliasing Problem:
*
*           In order to avoid the aliasing problem, the RHO values are
*   quantized differently for different THETA.  For an array column that
*   corresponds to a particular angle THETA(i), each cell in that column
*   corresponds to a contribution window of width = d(THETA(i)), where
*   d(THETA(i)) is defined as follows:
*
*                        /cos(THETA(i)) if  0 < THETA(i) <= 45
*        d(THETA(i))  =  sin(THETA(i))  if 45 < THETA(i) <=135
*                        -cos(THETA(i)) if 135 < THETA(i) < 180
*
*           Thus in determining which accumulator cell to increment,
*   the following equaiton is used:
*
*    scaled_rho = x*cos(THETA/d(THETA+y*sin(THETA)/d(THETA)
*
*    After scaled_rho is computed, rho_theta_space(scaled_rho, THETA)
*    will  be incremented.
*
*    Parameters :    rows- the number of rows the picture has
*                    cols- the number of columns the picture has.
*    Global:         image[][].
*                    -It is assumed that the image is stored in the
*                    upper left hand corner of the array "image".
*    Implementation issue:
*
*        The center of the image is treated as the origin in the
*    Cartesian space; not the center of the array for storing the
*    image.
*
*    The coordinate of the origin is choosen to be (x0,y0),
*            x0 = lower(xsize/2)
*            y0 = upper(ysize/2)
*
*    X-Y coordinates of Image:
*    Dimension is odd:                Dimension is even:
*      +---+---+---+                   +---+---+---+---+
*   1  |   |   |   |                 2 |   |   |   |   |         y axis
*      +---+---+---+                   +---+---+---+---+             ^
*   0  |   |   |   |                 1 |   |   |   |   |             |
*      +---+---+---+                   +---+---+---+---+             |
*  -1  |   |   |   |                 0 |   |   |   |   |             |-------->
*      +---+---+---+                   +---+---+---+---+
*      -1   0   1                    -1 |   |   |   |   |
*                                       +---+---+---+---+
*                                       -2  -1   0   1
*
*      Coordinates of RHO-THETA space:
*
*      max_rho ^
*              |
*              |
*              +--------------> theta
*              |
*              |
*              \/
=============================================================================*/
compute_hough_transform (long dir, long rows, long cols, long strow, long
                         stcol)
{
    long i,j;
    long rho,theta;
    long itheta;
    long xmax, ymax;
    long num_black=0;
    long temp;
    double x,y;

double rho_double;
    double fx[THETA_DIVISIONS], fy[THETA_DIVISIONS];
```

|  | xytree.c | Page 7 |
|---|---|---|

```
    fx[0] = (double)1.0;
    fy[0] = (double)0.0;
    fx[1] = (double)0.0;
    fy[1] = (double)1.0;

xmax = (long)(XYxsize/2);
    ymax = (long)(XYysize/2);

#if VERBOSE
    fprintf(stderr, "Hough transform at strow %d stcol %d row %d col %d\n",
            strow, stcol, rows, cols);
#endif
    if (dir == HOR)
        itheta = 1;
    else
        itheta = 0;

for (i=strow; i<rows+strow; i++)
    {
        for (j=stcol; j< cols + stcol;j++)
        {
            if (XYimage[i*XYxsize+j] == BLACK)
            {
                num_black++;

x = (double)(j-xmax);
                y = (double)(ymax-i);

rho_double = x*fx[itheta] + y*fy[itheta];

if (rho_double > 0.0)
                    rho = ROUND(rho_double);
                else
                    rho = ROUND(rho_double);

if (abs(rho) > MAX_RHO)
                    fprintf(stderr, "rho = %d, x:%lfy:%lf\n\n",rho,x,y);

rho_theta_space[MAX_RHO - rho][itheta]++;
            }
        }
    } row_threshold = (float)num_black/(float)rows * TH_FACTOR;
    col_threshold = (float)num_black/(float)cols * TH_FACTOR;
}

/*====================================================================*/
/*                                                                    */
/* output result: print the entire tree with block information,       */
/*                and print coordinates of blocks that are non-       */
/*                white to file 'blocks'.                             */
/*====================================================================*/ outputresult(struct node *ptr,char *filename)
{
    FILE *fp, *fopen();
    long level = 1;

if (filename == NULL) fp = stdout;
    else    fp = fopen(filename,"w");
    printree (ptr, level);
    fprintf(fp, "%d %d \n",XYxsize, XYysize);
    printblocks(fp,ptr);
    fclose(fp);
}

/*====================================================================*/
/*                                                                    */
/* printree: output the entire tree built with all node infor.        */
/*                                                                    */
``` xytree.c Page 8

```c
/*===================================================================*/
printree(struct node *ptr, long level)
{
    struct node *p;
    long row, col, strow, stcol;

p = ptr;
    if (p != NULL)
    {
#if VERBOSE
        fprintf(stderr,"%3d",level);
        fprintf(stderr,"    (%4d, %4d)   (%4d,%4d)",\
            p->upleft_row,p->upleft_col,p->loright_row,p->loright_col);
        if ((p->dir) == -1)
            fprintf(stderr,"  horizontal");
        else
            fprintf(stderr,"  vertical");
        if ((p->white) == 1)
            fprintf(stderr,"  YES\n");
        else
            fprintf(stderr,"  NO\n");
#endif
        find_position(p, &row, &col, &strow, & stcol);
        printree (p->next, level + 1);
        printree (p->sib, level);
    }
}

/*===================================================================*/
/*                                                                   */
/* printblocks: output all coordinates of non-white blocks to the    */
/*              file 'blocks'                                        */
/*===================================================================*/
printblocks (FILE *fp, struct node *ptr)
{
    struct node *p;
    long row, col, strow, stcol;

p = ptr;
    if (p->next != NULL)
    {
        printblocks (fp, p->next);
        if (p->sib != NULL)
            printblocks (fp, p->sib);
    }
    else
    {
        if (p->white == NOT_WHITE_REG)
        {
            find_position (p, &row, & col, & strow, & stcol);
            fprintf(fp, "%d %d %d %d\n",stcol,strow, col, row);
        }
        if (p->sib != NULL)
            printblocks (fp, p->sib);
    }
}
``` rlsa.c  Page 1

```c
/*
 * rlsa.c
 *
 * Routines:
 *      det_horiz_smooth_factor1
 *      RLSA
 *      rlsa1_h
 *      rlsa1_v
 *      rlsa1
 *
 */ include "Idus.h"
define MAX_UNCOMPACTED_COMPONENTS      10000
long v_threshold=8;

/*
 *
 * RLSA: main run length smoothing routine
 */
short
    RLSA (byte *timage, long xsize, long ysize, XRectangle *region,
          long count)
{
  char          line[50];
  short         *shortin, *label;
  long          i,j,k;
  long          dpi = 75;                       /* scanning resolution */
  long          *h;                             /* hough transform */
  long          tempx, tempy, tempxsize, tempysize;
  long          run_smooth = TRUE;
  long          num, component_area[MAX_UNCOMPACTED_COMPONENTS];
  long          value,width;
  XRectangle    tempregion[1];

if (!region)
  {
      count = 1;
      tempregion[0].x       = 0;
      tempregion[0].y       = 0;
      tempregion[0].width   = xsize;
      tempregion[0].height  = ysize;
      region = tempregion;
  }
  if (!( rlsa1(timage, xsize, ysize, region, count)))
  {
      fprintf(stderr,"Error in rlsa1.\n");
      return(0);
  } if (count = 1)
  {
      count = 0;
      region = NULL;
  }
  det_conn_comp(timage,xsize,ysize);
  return(1);
}

/*
 *
 * det_horiz_smooth_factor1: finds horizontal smoothing factor for RLSA
 */
long
    det_horiz_smooth_factor1(byte *nimage, long nxsize, long nysize)

/* Populate a histogram of the horizontal distances   */
/* between consecutive white/black transitions.       */
{
    long i, j, k;
    long this_trans_col, distance, max, maxindex;
    long hist[nxsize];

/* Initialize the histogram array */
``` rlsa.c — Page 2

```c
        *hist = 0;
        k = 1;
        while (k < nxsize)
        {
            *(hist + k) = 0;
            k++;
        }
        /* Find the transition distances */
        for (i = 0; i < nysize; i++)
        {
            j = 1;
            while (j < nxsize)
            {
                /* if white/black transition */
                if ( ( *(nimage + i*nxsize + j - 1) == 255 ) &&
                     ( *(nimage + i*nxsize + j) == 0       ) )
                {
                    this_trans_col = j;
                    /* Count pixels to next transition. */
                    j++;
                    /* While not a white/black transition */
                    while    ( ( j < nxsize                              ) &&
                             ! ( ( *(nimage + i*nxsize + j - 1) == 255 ) &&
                                 ( *(nimage + i*nxsize + j) ==        0) ))
                        j++;
                    /* Eliminate cases where a white/black transition ends the */
                    /* line or where a transition is followed by all black or  */
                    /* all white which would mean that j would eventually      */
                    /* exceed xsize.                                           */
                    if (j < nxsize)
                    {
                        distance = j - this_trans_col;
                        hist[distance]++;
                    }
                }
                j++;
            }
        }
        /* Find the index of the maximum entry in the distance histogram */
        max = *hist;
        maxindex = 0;
        for (k = 1; k < nxsize; k++)
            if ( *(hist + k)  >= max )
            {
                max = *(hist + k);
                maxindex = k;
            }
        return maxindex;
}

/*
 * rlsa1_h: smooths in the horizontal direction
 *
 */
short
    rlsa1_h(byte *nimage, long nxsize, long nysize, long threshold)
{
    long i, j, k;
    long initwhite, whitecount;
    long offset;

/* go row by row */
    for (i = 0; i < nysize; i++)
    {
        /* If the distance between two adjacent black pixels < threshold */
        /* then change all the intervening white pixels to black */
        /* A single row contains xsize bytes */
        j = 0;
        while (j < nxsize)
        {
            offset = i*nxsize + j;
            /* If this is the first pixel in the row */
            if (j == 0)
            {
                /* If it is white */
                if (*(nimage + offset) == 255)
```

| rlsa.c | Page 3 |

```c
                    /* This is a de facto black -> white transition */
                    /* so note it.                                   */
                    {
                    initwhite = j;
                    whitecount = 1;
                    j++;
                    /* While the pixels are white */
                    while ( j < nxsize && *(nimage + i*nxsize + j) == 255)
                        {
                        whitecount++;
                        j++;
                        }
                    if (whitecount < threshold)
                    /* Fill in the intervening pixels */
                        for (k = i*nxsize + initwhite; k<i*nxsize + j; k++)
                            *(nimage+k) = 0;
                    }
                }
            else /* we are "mid-row"; j is at least 1 */
                if ( *(nimage + offset - 1) == 0  &&
                     *(nimage + offset) == 255 )
                    /* This is a bona fide black -> white transition */
                    /* so note it.                                   */
                    {
                    initwhite = j;
                    whitecount = 1;
                    j++;
                    /* While the pixels are white */
                    while ( j < nxsize && *(nimage + i*nxsize + j) == 255)
                        {
                        whitecount++;
                        j++;
                        }
                    if (whitecount < threshold)
                    /* Fill in the intervening pixels */
                        for (k = i*nxsize + initwhite; k<i*nxsize + j; k++)
                            *(nimage+k) = 0;
                    }
            j++;
            }
        }
    return(1);
}

/*
 *
 * rlsa1_v: smooths in the vertical direction
 */
byte *
    rlsa1_v(byte *nimage, long nxsize, long nysize, long threshold)
{
    byte *aimage;
    byte *bimage;

if (!(aimage = transpose_image(nimage, nxsize, nysize)))
        return((byte *)NULL);
    rlsa1_h(aimage, nysize, nxsize, threshold);
    if (!(bimage = transpose_image(aimage, nysize, nxsize)))
        return((byte *)NULL);
    free(aimage);
    return(bimage);
}

/*
 * rlsa1: smooths image
 *
 */
short
    rlsa1(byte *image, long xsize, long ysize, XRectangle *region, long count)
{
    long h_threshold;
    long xoffset, yoffset, newxs, newys;
``` rlsa.c — Page 4

```c
    byte *tempimage;
    byte *vimage;
    register int i,j,k, ii;

/* Prepare for vertical smoothing */ if (!(vimage = (byte *)malloc(sizeof(byte)*xsize*ysize)))
    {
        fprintf(stderr,"Cannot malloc vimage.\n");
        return(0);
    } for (i=0; i<ysize; i++)
        for (j=0; j<xsize; j++)
            vimage[i*xsize+j] = image[i*xsize+j];

/* Loop through each region and determine horizontal smooth factor */
    /* separately */ for (ii=0; ii<count; ii++)
    {
        xoffset = region[ii].x;
        yoffset = region[ii].y;
        newxs   = region[ii].width;
        newys   = region[ii].height;

if (!(tempimage = (byte *)malloc(newxs * newys)))
        {
            fprintf(stderr,"Cannot malloc tempimage\n");
            return(0);
        } for (k=0,i=yoffset; i<yoffset+newys; i++)
            for (j=xoffset; j<xoffset+newxs; j++,k++)
                tempimage[k] = image[i*xsize+j];
        h_threshold = det_horiz_smooth_factor1(tempimage, newxs,
                                                newys);
        /* prevents large stripes from noise in image          */
        /* Doesn't do the smearing if h_threshold > newxs/3    */
        if (h_threshold < newxs/3)
            h_threshold = h_threshold*2;

rlsa1_h(tempimage, newxs, newys, h_threshold);

for (k=0, i=yoffset; i<yoffset+newys; i++)
            for (j=xoffset; j<xoffset+newxs; j++, k++)
                image[i*xsize+j] = tempimage[k];
        free(tempimage);
    }

/* Perform vertical smoothing */
    /* New here to free vimage space */
    tempimage = vimage;
    if (!(vimage = rlsa1_v(vimage, xsize, ysize, v_threshold)))
    {
        fprintf(stderr,"Error in rlsa1_v.\n");
        return(0);
    }
    free(tempimage);

for (i=0; i<ysize; i++)
        for (j=0; j<xsize; j++)
            image[i*xsize+j] &= vimage[i*xsize+j];
    free(vimage);

/* Last time do horizontal smoothing on entire image */
    h_threshold = det_horiz_smooth_factor1(image, xsize, ysize);
    rlsa1_h(image, xsize, ysize, h_threshold);
    return(1);
}
```

| segment.c | Page 1 |
|---|---|

```
/*
 * segment.c: Determines and displays the connected components in an image.
 *
 * Routines:
 *      det_conn_comp
 *      find_bounding_rects
 *      prune_rects
 *      write_rects
 */ include "Idus.h"

void
    det_conn_comp(byte *image, long xsize, long ysize)
{
    register int       i,j;
    long               num;
    long               threshold_level = 128;
    short              **shortin, **label;
    long               component_area[MAX_UNCOMPACTED_COMPONENTS];
    BOUNDING_RECT      *bounding_rects;
    SBLOCK             *merged_blocks;

AllocateShortImage(&shortin, xsize, ysize);
    AllocateShortImage(&label,   xsize, ysize);
    for (i=0; i<ysize; i++)
        for (j=0; j<xsize; j++)
        { if (image[i*xsize+j] > threshold_level) shortin[i][j] = 0;
          else                                   shortin[i][j] = 255;
        }

ConnectedComponents(shortin, label, component_area,
                        xsize, ysize, threshold_level);
    num = 0;
    for (i=0; i<ysize; i++)
        for (j=0; j<xsize; j++)
            if   (label[i][j] > num) num = label[i][j];

FreeShortImage(shortin, xsize, ysize);
    if (!(bounding_rects = find_bounding_rects(label, xsize, ysize,
                                               num)))
        FatalError("Cannot malloc bounding_rects\n");

FreeShortImage(label, xsize, ysize);

/* Eliminate small enclosed  bounding rects */
    prune_rects(bounding_rects,num);
    write_rects(bounding_rects,num);
    free(bounding_rects);
}
/*----------------------------------------------------------------*/
/* Eliminate small inset boxes */
/* Sorts from largest to smallest */
/*----------------------------------------------------------------*/
void
    prune_rects (BOUNDING_RECT *bounding_rects, long num)
{
    register long      i,j;
    long               xsize1, xsize2, ysize1, ysize2;
    BOUNDING_RECT      temprect;

for (i=0; i<num-1; i++)
        for (j=i+1; j<num; j++)
        {
            xsize1 = bounding_rects[i].x_max - bounding_rects[i].x_min
                     +1;
            xsize2 = bounding_rects[j].x_max - bounding_rects[j].x_min
                     +1;
            ysize1 = bounding_rects[i].y_max - bounding_rects[i].y_min
                     +1;
            ysize2 = bounding_rects[j].y_max - bounding_rects[j].y_min
                     +1;
    /* Eliminates all boxes contained  */
``` segment.c Page 2

```c
/* within another                    */
        if (   (bounding_rects[i].x_min <= bounding_rects[j].x_min)
            && (bounding_rects[i].x_max >= bounding_rects[j].x_max)
            && (bounding_rects[i].y_min <= bounding_rects[j].y_min)
            && (bounding_rects[i].y_max >= bounding_rects[j].y_max))
        {
            bounding_rects[j].x_max = 0;
            bounding_rects[j].x_min = 0;
            bounding_rects[j].y_max = 0;
            bounding_rects[j].y_min = 0;
        }
        if (   (bounding_rects[i].x_min >= bounding_rects[j].x_min)
            && (bounding_rects[i].x_max <= bounding_rects[j].x_max)
            && (bounding_rects[i].y_min >= bounding_rects[j].y_min)
            && (bounding_rects[i].y_max <= bounding_rects[j].y_max))
        {
            bounding_rects[i].x_max = 0;
            bounding_rects[i].x_min = 0;
            bounding_rects[i].y_max = 0;
            bounding_rects[i].y_min = 0;
        }

/* Eliminates small overlapping regions              */
        if ( (xsize1 * ysize1) < 150)
        {
            if (   (bounding_rects[i].x_min >= bounding_rects[j].x_min)
                && (bounding_rects[i].x_max <= bounding_rects[j].x_max)
                && (bounding_rects[i].y_min >= bounding_rects[j].y_min)
                && (bounding_rects[i].y_max <= bounding_rects[j].y_max))
            {
                bounding_rects[i].x_max = 0;
                bounding_rects[i].x_min = 0;
                bounding_rects[i].y_max = 0;
                bounding_rects[i].y_min = 0;
            }
        }
        else if ( (xsize2 * ysize2) < 150)
        {
            if (   (bounding_rects[j].x_min >= bounding_rects[i].x_min)
                && (bounding_rects[j].x_max <= bounding_rects[i].x_max)
                && (bounding_rects[j].y_min >= bounding_rects[i].y_min)
                && (bounding_rects[j].y_max <= bounding_rects[i].y_max))
            {
                bounding_rects[j].x_max = 0;
                bounding_rects[j].x_min = 0;
                bounding_rects[j].y_max = 0;
                bounding_rects[j].y_min = 0;
            }
        }
    }
}
/*--------------------------------------------------------------------*/
/* Find bounding boxes                                                */
/* Adjust for fact that label goes from 1 to num and array goes from 0 */
/* to (num - 1)                                                        */
/*--------------------------------------------------------------------*/
BOUNDING_RECT *
    find_bounding_rects(short **label, long xsize, long ysize, long num)
{
    BOUNDING_RECT *bounding_rects;
    register long  i,j,k;
    long           height, width;

if (!(bounding_rects =
          (struct bounding_rect *)malloc(num*sizeof(BOUNDING_RECT))))
        return(NULL);

/* initialize bounding_rects */
    for (i=0; i<num; i++)
    {
        bounding_rects[i].x_min = xsize;
        bounding_rects[i].y_min = ysize;
        bounding_rects[i].x_max = 0;
        bounding_rects[i].y_max = 0;
``` segment.c — Page 3

```c
    for (i=0; i<ysize; i++)
        for (j=0; j<xsize; j++)
            if (label[i][j] > 0)
            {
                /* Subtract 1 since array goes from 0 to (num-1) */
                k = (label[i][j] - 1);
                if (i < bounding_rects[k].y_min)
                    bounding_rects[k].y_min = i;
                else if (i > bounding_rects[k].y_max)
                    bounding_rects[k].y_max = i;
                if (j < bounding_rects[k].x_min)
                    bounding_rects[k].x_min = j;
                else if (j > bounding_rects[k].x_max)
                    bounding_rects[k].x_max = j;
            }
    return(bounding_rects);
}
``` conn_comp.c Page 1

```c
/* Connected components image labeling (8-connected)
 *
 *   Routines:
 *       EditsConnectedComponents
 *       AddEq
 *       Resolve
 *       AllocateShortImage
 *       FreeShortImage
 *       malloc_failed()
 */ include "Idus.h"

short   **eqtab;              /* Equivalence table */
short   **dual_eqtab;         /* For reflexive transitive closure */
short   *eqtab_index;         /* Index of entries into table */
int     last_eqtab_element;   /* max(x, y) */
int     num_eqs = 0;          /* Number of equivalences for this line */

/* Delete all connected components with fewer than
 * "min_area" white pixels. A pixel is said to be white if its
 * value is greater than or equal to "threshold."
 */

EditConnectedComponents(short **input_image, short **output_image,
                        long x, long y,
                        long threshold, long min_area, long *num)
{
        register int    i, j;
        long            component_area[MAX_UNCOMPACTED_COMPONENTS];
        short           **label;

AllocateShortImage(&label, x, y);
        ConnectedComponents(input_image, label, component_area,
                        x, y, threshold);
        for (i = 1; i < y - 1; i++)
                for (j = 1; j < x - 1; j++) {
                        if (label[i][j] != 0 &&
                            label[i][j] < MAX_UNCOMPACTED_COMPONENTS &&
                            component_area[label[i][j]] < min_area)
                                output_image[i][j] = 0;
                        else if (input_image[i][j] >= threshold)
                                output_image[i][j] = input_image[i][j];
                        else
                                output_image[i][j] = 0;
                }
        FreeShortImage(label, x, y);
} long
    ConnectedComponents(short image, short label, long *component_area,
                long x, long y, long threshold)
{
        register int    i, j;
        long            k, l,
                        next_a = 0,
                        m,              /* Max(x, y) */
                        save_m,
                        next_label = 1; /* Next available label: 1, 2,... */
        struct coordinate {
                        short   i;
                        short   j;
        } A[4];

if (x < y)
                m = y;
        else
                m = x;
        last_eqtab_element = m - 1;
        save_m = m;

/* Pad image with 0's on the edges, to simplify and speed up
``` conn_comp.c　　　　　　　　　　　　　　　　　　　　　　Page 2

```c
 * the neighbor determinations below. Actually overwrite the
 * edges (quicker than creating a new image)
 */
for (i = 0; i < y; i++) {
        image[i][0] = 0;
        image[i][x - 1] = 0;
}
for (j = 1; j < x; j++) {
        image[0][j] = 0;
        image[y - 1][j] = 0;
}
/* Make an a priori assumption that the equivalence table need
 * be no larger than m by m; must be able to hold the max
 * number of equivalences seen on any line of the image
 */
AllocateShortImage(&eqtab, m, m);
AllocateShortImage(&dual_eqtab, m, m);
if ((eqtab_index = (short *) malloc(m * sizeof(short))) == NULL)
        malloc_failed();
/* Traverse image from top to bottom
 */
for (i = 1; i < y - 1; i++) {
        /* Clear equivalence table
         */
        for (j = 0; j < num_eqs; j++)
                for (k = 0; k < num_eqs; k++)
                        eqtab[j][k] = 0;
        num_eqs = 0;
        for (j = 1; j < x - 1; j++) {
                /* Skip "black" pixels
                 */
                if (image[i][j] < threshold) {
                        label[i][j] = 0;
                        continue;
                }
                /* Neighbors in previous row
                 */
                for (k = j - 1; k <= j + 1; k++)
                        if ((image[i - 1][k] >= threshold) &&
                            (label[i - 1][k] != 0)) {
                                A[next_a].i = i - 1;
                                A[next_a].j = k;
                                ++next_a;
                        }
                /* Left-hand neighbor
                 */
                if ((image[i][j - 1] >= threshold) &&
                    (label[i][j - 1] != 0)) {
                        A[next_a].i = i;
                        A[next_a].j = j - 1;
                        ++next_a;
                }
                /* Was it labeled? If not, assign it the next
                 * available label
                 */
                if (next_a == 0)
                        label[i][j] = next_label++;
                else {
                        m = BIG_INT;
                        for (k = 0; k < next_a; k++)
                                if (label[A[k].i][A[k].j] < m)
                                        m = label[A[k].i][A[k].j];
                        label[i][j] = m;
                }
                /* Store new equivalences
                 */
                for (k = 0; k < next_a; k++)
                        if (label[A[k].i][A[k].j] !=
                            label[i][j])
                                AddEq(label[A[k].i][A[k].j],
                                      label[i][j]);
                next_a = 0;
        }
        /* Resolve equivalences
         */
``` conn_comp.c — Page 3

```c
                Resolve();
                /* Relabel image line using equivalences
                 */
                for (j = 1; j < x - 1; j++)
                        if (image[i][j] >= threshold) {
                                /* Find minimum equivalent label
                                 */
                                m = BIG_INT;
                                for (k = 0; k < num_eqs; k++)
                                        if (eqtab_index[k] == label[i][j])
                                                break;
                                for (l = 0; l < num_eqs; l++)
                                        if (eqtab[k][l] != 0 &&
                                            eqtab_index[l] < m)
                                                m = eqtab_index[l];
                                if (m < label[i][j])
                                        label[i][j] = m;
                        }
        }

/* Now, traverse image in reverse order. Count the number of
         * pixels in each component
         */
        /* Initialize component area array
         */
        for (i = 0; i < MAX_UNCOMPACTED_COMPONENTS; i++)
                component_area[i] = 0;
        for (i = y - 2; i > 0; i--) {
                /* Clear equivalence table
                 */
                for (j = 0; j < num_eqs; j++)
                        for (k = 0; k < num_eqs; k++)
                                eqtab[j][k] = 0;
                num_eqs = 0;
                for (j = 1; j < x + 1; j++) {
                        /* Skip unlabeled pixels
                         */
                        if (label[i][j] == 0)
                                continue;
                        /* Neighbors in previous row
                         */
                        for (k = j - 1; k <= j + 1; k++)
                                if (label[i + 1][k] != 0) {
                                        A[next_a].i = i + 1;
                                        A[next_a].j = k;
                                        ++next_a;
                                }
                        /* Left-hand neighbor
                         */
                        if (label[i][j - 1] != 0) {
                                A[next_a].i = i;
                                A[next_a].j = j - 1;
                                ++next_a;
                        }
                        /* Store new equivalences
                         */
                        for (k = 0; k < next_a; k++)
                                if (label[A[k].i][A[k].j] !=
                                    label[i][j])
                                        AddEq(label[A[k].i][A[k].j],
                                              label[i][j]);
                        next_a = 0;
                }
                /* Resolve equivalences
                 */
                Resolve();
                /* Relabel image line using equivalences
                 */
                for (j = 1; j < x + 1; j++)
                        if (label[i][j] != 0) {
                                /* Find minimum equivalent label
                                 */
                                m = BIG_INT;
                                for (k = 0; k < num_eqs; k++)
                                        if (eqtab_index[k] == label[i][j])
```

| conn_comp.c | Page 4 |
|---|---|

```
                                break;
                        for (l = 0; l < num_eqs; l++)
                                if (eqtab[k][l] != 0 &&
                                    eqtab_index[l] < m)
                                        m = eqtab_index[l];
                        if (m < label[i][j])
                                label[i][j] = m;
                        if (label[i][j] < MAX_UNCOMPACTED_COMPONENTS)
                                ++component_area[label[i][j]];
                }
        FreeShortImage(eqtab, save_m, save_m);
        FreeShortImage(dual_eqtab, save_m, save_m);
        free(eqtab_index);
        return(next_label);
}

/* Add equivalence to table
 */

AddEq(long p, long q)
{
        register int    i, j,
                        old_num_eqs;
        for (i = 0; i < num_eqs; i++)
                if (eqtab_index[i] == p)
                        break;
        for (j = 0; j < num_eqs; j++)
                if (eqtab_index[j] == q)
                        break;
        old_num_eqs = num_eqs;
        /* If p not found, create an entry
         */
        if (i == num_eqs) {
                if (num_eqs > last_eqtab_element)
                        return;
                eqtab_index[num_eqs++] = p;
        }
        /* If q not found, create an entry
         */
        if (j == old_num_eqs) {
                if (num_eqs > last_eqtab_element)
                        return;
                j = num_eqs;
                eqtab_index[num_eqs++] = q;
        }
        /* Record equivalence (symmetric)
         */
        eqtab[i][j] = 1;
        eqtab[j][i] = 1;
}

/* Simply use the multiplication method to compute the reflexive
 * transitive closure eqtab* -- O(n^3) time
 */

Resolve()
{
        register int    i, j, k,
                        tmp,
                        flip = 0,
                        flop = 1;
        short           **C[2];
        C[flip] = eqtab;
        C[flop] = dual_eqtab;
        /* Set diagonal
         */
        for (i = 0; i < num_eqs; i++)
                C[0][i][i] = 1;
        for (k = 0; k < num_eqs; k++) {
                for (i = 0; i < num_eqs; i++)
                        for (j = 0; j < num_eqs; j++)
                                C[flop][i][j] = C[flip][i][j] |
                                    (C[flip][i][k] & C[flip][k][j]);
                tmp = flip;
``` conn_comp.c — Page 5

```c
                flip = flop;
                flop = tmp;
        }
        /* If num_eqs is even, A* is found in the original eqtab;
         * otherwise, copy it over
         */
        if (k & 0x1)
                for (i = 0; i < num_eqs; i++)
                        for (j = 0; j < num_eqs; j++)
                                C[0][i][j] = C[1][i][j];
}

/* Allocate space for x by y image (shorts)
 */

AllocateShortImage(short ***p, long x, long y)
{
        int     i, j;

if ((*p = (short **) malloc(y * sizeof(short *))) == NULL)
                malloc_failed();
        for (i = 0; i < y; i++)
                if (((*p)[i] = (short *) malloc(x * sizeof(short))) == NULL)
                        malloc_failed();
        for (i = 0; i < y; i++)
                for (j = 0; j < x; j++)
                        (*p)[i][j] = 0;
}

FreeShortImage(short **p, long x, long y)
{
        int     i;
        /* Commented these lines out because they were causing bus */
        /* error */
        /* Should go back and figure out why */
        for (i = 0; i < y; i++)
            free((p)[i]);

if (!(free(p)))
            fprintf(stderr, "Cannot free p.\n");
        return(0);
} malloc_failed()
{
        FatalError("malloc() failed...out of memory\n");
        exit(-1);
}
``` merge.c Page 1

```c
/*
 * merge.c
 *
 * Routines:
 *      mergeblock
 *      project_block
 *      get_spacing
 *      merge
 *      update
 *      horizontal_neighbors
 *
 */ include "Idus.h"

short
    mergeblock(byte *image, long xsize, long ysize, XRectangle *region,
        long block_count)
{
    register int i,j;
    char        command[100];
    char        directory[70];
    FILE        *fp2;
    SBLOCK      *merged_blocks;

if (!(merged_blocks = merge (image, xsize, region, block_count)))
    {
        fprintf(stderr,"Error in merged block.\n");
        return(0);
    }
    strcpy (directory, getenv("IDUS"));

/* Open file for writing */
    if (!(fp2 = fopen("temp.blk","w")))
    {
        fprintf(stderr,"Cannot open %s.\n",command);
        return(0);
    }

/* Write xsize and ysize of image on first line */
    fprintf(fp2, "%d %d\n", xsize, ysize);

for (i=0; i<block_count; i++)
        if (merged_blocks[i].status >= 0)
        {
            fprintf(fp2,"%3d %3d %3d %3d %3d\n",merged_blocks[i].x,
                merged_blocks[i].y, merged_blocks[i].xsize,
                merged_blocks[i].ysize, merged_blocks[i].line);
        } fclose(fp2);
    return(1);
}

/*-------------------------------------------------*/
/* Calculates projection of block along each row   */
/* Input parameters: image       image array       */
/*                   xsize       image xsize       */
/*                   xoffset     block x coord.    */
/*                   yoffset     block y coord.    */
/*                   bxsize      block xsize       */
/*                   bysize      block ysize       */
/*                   threshold   nonbackground     */
/* Output parameters: returns projection array     */
/*-------------------------------------------------*/
long
    *project_block(byte *image, long xsize, long xoffset,
                long yoffset, long bxsize,
                long bysize, long threshold)
{
    register int   i,j;
    long           *projection = (long *)NULL, *tmptr;

if (!(projection = (long *)calloc(bysize,sizeof(long))))
``` merge.c Page 2

```c
        return(NULL);
    tmptr = projection;

for (i=yoffset; i<yoffset+bysize; i++)
        for (j=xoffset; j<xoffset+bxsize; j++)
            if (image[i*xsize +j] < threshold)
                projection[i-yoffset]++;

return(projection);
}
/*--------------------------------------------------*/
/* Compute the character height based on avg. run*/
/*      length                                    */
/* Input parameters: projection   proj. array    */
/*                   size         array size     */
/*                   threshold    #of elements   */
/*                                that have to   */
/*                                be present for*/
/*                                a text row     */
/*                   text         0: white space*/
/*                                1: black       */
/*                   number       returns number*/
/*                                of lines       */
/* Output parameter: returns avg. black run-lenth*/
/*--------------------------------------------------*/
long
    get_spacing(long *projection, long size, long threshold, byte
                text, long *number)
{
    register int i;
    byte    flag      = 0;
    long    count     = 0;
    long    runLength = 0;
    long    average   = 0;

for (i=0; i<size; i++)
    {
        switch (text)
        {
/* Looking for white runlengths */
            case 0:
            if (projection[i] < threshold)
            {
                if (!flag)   /* Start of run */
                {
                    runLength =1;
                    flag = 1;
                    count++;
                }
                if (flag) runLength++;
            }

/* End of run */
            if ((projection[i] >= threshold) && (flag))
            {
                flag = 0;
                average += runLength;
            }
            break;

/* Looking for black runlengths */
            case 1:
            if (projection[i] >= threshold)
            {
                if (!flag)
                {
                    runLength =1;
                    flag = 1;
                    count++;
                }
                if (flag) runLength++;
            } if ((projection[i] < threshold) && (flag))
            {
``` merge.c — Page 3

```c
                flag = 0;
                average += runLength;
            }
            break;
        }
    }

/* Check for last pixel as part of a run */
    if (flag = 1) average += runLength;

if (count)
        average = ROUND((float)average/count);
    *number = count;
    return(average);
}

/*------------------------------------------------*/
/* Merge words into headlines                     */
/* Input parameters: image      original image    */
/*                   xsize      xsize of image    */
/*                   blocks     list of blocks    */
/*                   blockcont  number of blocks  */
/* Output parameter: list of merged blocks        */
/*------------------------------------------------*/
SBLOCK
    *merge(byte *image, long xsize, XRectangle *region, long block_count)
{
    register int i,j;
    long        lcount;
    long        *projection;
    long        x,y,xs,ys;
    SBLOCK      *merged_blocks;

if (!(merged_blocks = (SBLOCK
                            *)malloc(sizeof(SBLOCK)*block_count)))
        return((SBLOCK *)NULL);

for (i=0;i<block_count;i++)
    {
        x = region[i].x;
        y = region[i].y;
        xs = (long) region[i].width;
        ys = (long) region[i].height;

projection = project_block(image, xsize, x,y,xs,ys,128);

if (projection == NULL)
        {
            fprintf(stderr,"Cannot compute projection\n");
            return(NULL);
        } get_spacing(projection, ys, 5, 1, &lcount);
        free(projection);

merged_blocks[i].x      = x;
        merged_blocks[i].y      = y;
        merged_blocks[i].xsize  = xs;
        merged_blocks[i].ysize  = ys;
        merged_blocks[i].line   = lcount;

if ((lcount <=2) && (lcount > 0))
            merged_blocks[i].status = 0;
        else
            merged_blocks[i].status = 2;
    }

/* Select the first 'available' (status = 0) block in */
    /* merged_blocks as a seed */
    /* .status:  0     potential isolated block */
    /* .status:  1     merged block             */
    /* .status:  2     non-isolated block       */
    /* .status: -1     ignore                   */
``` merge.c Page 4

```c
    for (i=0; i<block_count; i++)
        if (merged_blocks[i].status == 0)
        {
            j=0;
            while (j < block_count)
            {
                if ( (merged_blocks[j].status >= 0) &&
                     (merged_blocks[j].status < 2) && (i!=j) )
                {
                    if  (horizontal_neighbors(merged_blocks[i],
                                              merged_blocks[j]))
                    {
                        update(&merged_blocks[i],&merged_blocks[j]);
                        j = (-1);
                    }
                } j++;
            }
        }
    return(merged_blocks);

}
/*--------------------------------------------------*/
/* Updates values of blocks when they are merged */
/*--------------------------------------------------*/
void
    update(SBLOCK *block1, SBLOCK *block2)
{
    long    xmin,ymin,xmax,ymax;

/* Calculate xsize dimension */
    xmax = DMAX(block1->x + block1->xsize, block2->x + block2->xsize);
    xmin = DMIN(block1->x,   block2->x);
    ymax = DMAX(block1->y + block1->ysize, block2->y + block2->ysize);
    ymin = DMIN(block1->y,   block2->y);

block1->x     = xmin;
    block1->y     = ymin;
    block1->xsize = xmax - xmin + 1;
    block1->ysize = ymax - ymin + 1;
    block1->line  = DMAX(block1->line, block2->line);

block1->status =  1;
    block2->status = -1;
}

/* ---------------------------------------- */
/* Checks if blocks are horizontal neighbors */
/* ---------------------------------------- */
byte
    horizontal_neighbors(SBLOCK block1, SBLOCK block2)
{
    SBLOCK extended_block;
    byte evidence = 0;
    byte hsep, vertical_overlap;
    byte horiz_sep_threshold = 40;

/* Testing for any vertical overlap of the horizontal projections */
    /* of the two blocks                                              */ if ( !(
            ((block1.y >= block2.y) &&
             (block1.y <= block2.y+block2.ysize)) ||
            ((block2.y >= block1.y) &&
             (block2.y <= block1.y+block1.ysize))))
        return(0);

/* If it passes the first test                                    */
    /* Test for vertical range overlap.                               */
    /* Return if vertical lap is less than 50% of smaller block ysize */ if (block1.y + block1.ysize > block2.y + block2.ysize)
        vertical_overlap = block2.y + block2.ysize - block1.y;
```

```
                                                                      merge.c                                    Page 5
Mar 10 1993 16:40:10
    else
        vertical_overlap = block1.y + block1.ysize - block2.y;
    if ( (float)vertical_overlap/(DMIN(block1.ysize,block2.ysize)) < 0.50 )
        return(0);

/* Test for horizontal separation.                                 */
    /* Blocks must be "close" together to merge                        */
    /* To do this rigorously, we should also test if any other blocks  */
    /* are between the two blocks in question */ if (block1.x + block1.xsize < block2.x)
        hsep = block2.x - (block1.x + block1.xsize);
    else if (block2.x + block2.xsize < block1.x)
        hsep =   block1.x - (block2.x + block2.xsize);
    /* Overlapping cases */
    else if (block2.x < block1.x + block1.xsize)
        hsep = block1.x + block1.xsize - block2.x;
    else if (block1.x < block2.x + block2.xsize)
        hsep = block2.x + block2.xsize - block1.x;

if ( (abs(hsep) > horiz_sep_threshold))
        return(0);

return (1);
```

```
/*
 * ocr.c: routine to ocr each block of text
 */
void ocr()
{
    register int k;
    /* Use any OCR system here to find the ASCII text for each region */
    /* in the image */
    for (k=0; k<count; k++)
    {
        /* OCR region and write ASCII to file temp*.txt */
        /* where *=k (region number) */
    }
}
```

```
/*
 * ldus.h
 *
 */ include <stdio.h>
include <ctype.h>
#include <math.h>
#include <errno.h>
#include <sys/time.h>
include <string.h> define TRUE    1
define FALSE   0
#define NULL    0
define ERROR   1 typedef unsigned char   byte;

typedef struct Region
{
        long x;
        long y;
        long xs;
        long ys;
        struct Region *next_reg;
} REGION;

typedef struct XRectangle{
        long x;
        long y;
        long width;
        long height;
} typedef struct bounding_rect
{
        long x_min;
        long y_min;
        long x_max;
        long y_max;
} BOUNDING_RECT;

typedef struct sblock
        {
        long x;
        long y;
        long xsize;
        long ysize;
        short status;
        long line;
} SBLOCK;

typedef struct parameter
{
    char  *label;
    char  *value;
    char  *comment;
} PARAMETER;

typedef struct Node
{
    long tree_type;
    long num_blocks;
    long *block_list;
    long num_child;
    long *child_list;
    long parent;
} NODE;

typedef struct Block
{
    long tree_type;
    long block_type;
```

| Mar 10 1993 16:40:13 | ldus.h | Page 2 |

```
    long x;
    long y;
    long xsize;
    long ysize;
    long node;
} BLOCK;

typedef struct Mergers
{
    long number;
    long mergeCount;
    long *members;
} MERGER;

enum tree_type
{
    geometric, logical, IGNORE
};
enum block_type
{
    head, body, root
};

int             xerrcode;              /* errorcode of last X */
                                       /* error */
```

| Mar 10 1993 16:40:13 | XYtree.h | Page 1 |

```c
/*
 *  XYtree.h
 *
 */ define VERBOSE         0
define ORIG_WIDTH      3               /* number of white        */
                                        /* pixels between blocks  */
#define TH_FACTOR       0               /* threshold factor = 0,  */
                                        /* i.e. zero counts in    */
                                        /* Hough transform's      */
                                        /* projection profile     */
                                        /* will be considered as  */
                                        /* white pixels           */ define VERT            0               /* vertical partition     */
define HOR            -1               /* horizontal partition   */ define WHITE_REG       1               /* whole block is white   */
                                        /* pixels                 */
#define NOT_WHITE_REG   0               /* whole is not white     */
                                        /* pixels                 */ define PARA_HEIGHT     90              /* vertical partition     */
                                        /* ending condition;      */
                                        /* block height <= 90     */ define COLUMN_WIDTH    400             /* horizontal partition   */
                                        /* ending condition;      */
                                        /* block width <= 400     */ define SIZE            2000            /* dimension of the array */
                                        /* for storing the input  */
                                        /* image.                 */
#define RHO_VALUES      2048            /* Range of possible      */
                                        /* values for RHO, RHO =  */
                                        /* 1+ (512*sqrt(2))       */ define MAX_RHO         1024            /* Largest positive       */
                                        /* values for RHO.        */
                                        /* 216 * sqrt (2) = 362   */
#define MAX_THETA       180             /* Number of divisions    */
                                        /* MAX-THETA is divided   */
                                        /* into */
#undef  BLACK
#undef  WHITE
#define BLACK           0               /* Gray level for black   */
define WHITE           255             /* Gray level for white   */ define THETA_DIVISIONS 2               /* Number of divisions    */
                                        /* MAX-THETA is divided into*/ static long        rho_theta_space[RHO_VALUES][THETA_DIVISIONS];
                                        /* An array for storing the */
                                        /* Hough transform of the   */
                                        /* image processed */ static long        col_threshold,       /* threshold in horizontal dir.*/
                   row_threshold,       /* threshold in vertical dir.*/
                   XYysize,             /* num. of rows in image     */
                   XYxsize;             /* num. of cols. in image    */ static long        thresh = 0;
static long        col_width   = COLUMN_WIDTH, /* these parameters */
                   para_height = PARA_HEIGHT,  /* can now be       */
                   orig_width  = ORIG_WIDTH;   /* controlled by user. */ static byte        *XYimage;            /* Image pointer */ struct node
{
    long     upleft_row;                /* upper left corner: row     */
    long     upleft_col;                /* lower left corner: column  */
    long     loright_row;               /* lower right corner: row    */
    long     loright_col;               /* lower right corner: column */
```

| Mar 10 1993 16:40:13 | XYtree.h | Page 2 |

```
        long    dir;             /* direction of partition   */
        long    white;           /* Is it a white region     */
        struct node *next;       /* Pointer to next children */
        struct node *sib;        /* Pointer to siblings      */
};

struct node
    *makenode(long, long, long, long, long, long);
struct node
    *partition(long, struct node *);
int
    detect_white_space(long, long*, struct node*);
void
    xysegment (struct node *ptr, long level, long dlevel);
```

| Mar 11 1993 19:04:25 | build_geom_tree.pl | Page 1 |

```
/********************************************************************/
/********************************************************************/
/***************   DETERMINE GEOMETRIC STRUCTURE,  *******************/
/***************  GIVEN BLOCK SPECS AND PAGE SIZE  *******************/
/********************************************************************/
/********************************************************************/

% The 1 indicates that this is a page with a single configuration
% of columns. In this version the fine blocks will be collected
% within the procedure.
geom_tree_sup(1,page,tree(Root,ColAlignedSepLineDesc),tree(Root,NonColAlignedSepLineDesc)) :-
    collect_blocks(fine,AllBlocks), % Eliminate "noise" blocks before even determining column alignment.
    data_blocks(AllBlocks,DataBlocks), % Determine Column Boundaries
    column_bounds(DataBlocks,15,ColumnBounds),
    asserta(column_bounds(ColumnBounds)),
    % Create block_features clause for 'page' to seed tree building process.
    root([[page,'<hb>',Xpage,Ypage,Xsizepage,Ysizepage]]),
    ColumnBounds = [[FirstColStart,FirstColWidth]|_],
    reverse(ColumnBounds,[[LastColStart,LastColWidth]|_]),
    asserta(block_features(page,'<hb>',Xpage,Ypage,Xsizepage,Ysizepage,[_,_,_,_,[FirstColSt
art,FirstColWidth],_,[LastColStart,LastColWidth],_])),
    LastColEnd is LastColStart + LastColWidth, % Eliminate blocks which fall completely outside the column boundaries.
    column_bounded_blocks(DataBlocks,FirstColStart,LastColEnd,ColumnBoundedBlocks),
    % Eliminate blocks which fall entirely between a pair of adjacent columns.
    non_gutter_blocks_envelope(ColumnBoundedBlocks,ColumnBounds,NonGutterBlocks), col_noncol_partition(NonGutterBlocks,15,ColumnBounds,FirstColStart,LastColEnd,ColumnAli
gnedBlocks1,NonColumnAlignedBlocks1), % If any blocks were stretched by column alignment determination,
    % we will pick that up here.
    refresh_data_blocks_list(NonGutterBlocks,NewDataBlocks), % Once column boundaries and column alignment are known, we can apply them
    % to refine and correct the segmentation results in two cases described below.

% Some blocks which have been classified as non-column-aligned are really the
    % product of imperfect segmentation where a non-column-aligned non-text block
    % has been attached to and influenced the boundaries of a text block.
    % Rather than suffer the degradation which will result from processing such
    % a block, we constrain it to a column when certain conditions are met.
    % As a result we truncate a portion of the non-text and overstate the
    % height of the text, but gain a "well-behaved" block.
    reclassify_non_column_aligned(NonColumnAlignedBlocks1,NewDataBlocks,ColumnAlignedBlocks
1,NewlyAlignedBlocks,StillUnAlignedBlocks),
    append(ColumnAlignedBlocks1,NewlyAlignedBlocks,ColumnAlignedBlocks2),
    NonColumnAlignedBlocks2 = StillUnAlignedBlocks, % Of those blocks which remain non-column-aligned, some may still be misclassified
    % if their merger is column-aligned and certain other conditions are met.
    merge_non_column_aligned(NonColumnAlignedBlocks2,ColumnBounds,NewDataBlocks,MergedBlock
s,NonColumnAlignedBlocks), append(ColumnAlignedBlocks2,MergedBlocks,ColumnAlignedBlocks),
    assertz(column_aligned_blocks(ColumnAlignedBlocks)), % Define the page node to be the top border of
    % the page so that node_children will initially
    % find all blocks.
    root(Root),
    % Regather all blocks as NewAllBlocks to reflect any stretching
    % which may have occurred as part of column alignment determination.
    collect_blocks(fine,NewAllBlocks),
    % Create the tree for the ColumnAlignedBlocks
    abolish(block,6),
    assert_block_list(ColumnAlignedBlocks),
    % Need to hide all clauses of block_features other than the
    % column aligned blocks while building this tree
```

```
Mar 11 1993 19:04:25         build_geom_tree.pl                    Page 2 delete_list(ColumnAlignedBlocks,NewAllBlocks,OtherBlocks1),
        hide_block_feature_clauses(OtherBlocks1), geom_tree(Root,tree(Root,ColAlignedDesc)),
        unhide_block_feature_clauses(OtherBlocks1), % Reorganize nodes according to separator lines found.
        rule_sep_line_desc(ColAlignedDesc,ColAlignedSepLineDesc),
        % Create the tree for the NonColumnAlignedBlocks
        abolish(block,6),
        assert_block_list(NonColumnAlignedBlocks), % Need to hide all clauses of block_features other than the
        % non-column aligned blocks while building this tree
        delete_list(NonColumnAlignedBlocks,NewAllBlocks,OtherBlocks2),
        hide_block_feature_clauses(OtherBlocks2),
        geom_tree(Root,tree(Root,NonColAlignedDesc)),
        unhide_block_feature_clauses(OtherBlocks2), % Reorganize nodes according to separator lines found.
        rule_sep_line_desc(NonColAlignedDesc,NonColAlignedSepLineDesc), % Restore the database to the full set of blocks
        abolish(block,6),
        append(ColumnAlignedBlocks,NonColumnAlignedBlocks,MeaningfulBlocks),
        assert_block_list(MeaningfulBlocks).

/**********************************************************************/
% The 2 indicates that this is a page with multiple configurations
% of columns. Each call will correspond to one configuration of columns.
% In this version the fine blocks for that configuration will be passed in.
geom_tree_sup(2,page,FineBlocks,tree(Root,ColAlignedSepLineDesc),tree(Root,NonColAlignedSepLine
Desc)) :-
        % Eliminate "noise" blocks before even determining column alignment.
        data_blocks(FineBlocks,DataBlocks), % Determine Column Boundaries
        column_bounds(DataBlocks,15,ColumnBounds),
        asserta(column_bounds(ColumnBounds)),
        % Create block_features clause for 'page' to seed tree building process.
        root([[page,'<hb>',Xpage,Ypage,Xsizepage,Ysizepage]]),
        ColumnBounds = [[FirstColStart,FirstColWidth]|_],
        reverse(ColumnBounds,[[LastColStart,LastColWidth]|_]),
        asserta(block_features(page,'<hb>',Xpage,Ypage,Xsizepage,Ysizepage,[_,_,_,_,[FirstColSt
art,FirstColWidth],_,[LastColStart,LastColWidth],_])),
        LastColEnd is LastColStart + LastColWidth, % Eliminate blocks which fall completely outside the column boundaries.
        column_bounded_blocks(DataBlocks,FirstColStart,LastColEnd,ColumnBoundedBlocks),
        % Eliminate blocks which fall entirely between a pair of adjacent columns.
        non_gutter_blocks_envelope(ColumnBoundedBlocks,ColumnBounds,NonGutterBlocks), col_noncol_partition(NonGutterBlocks,15,ColumnBounds,FirstColStart,LastColEnd,ColumnAli
gnedBlocks1,NonColumnAlignedBlocks1), % If any blocks were stretched by column alignment determination,
        % we will pick that up here.
        refresh_data_blocks_list(NonGutterBlocks,NewDataBlocks), % Once column boundaries and column alignment are known, we can apply them
        % to refine and correct the segmentation results in two cases described below.

% Some blocks which have been classified as non-column-aligned are really the
        % product of imperfect segmentation where a non-column-aligned non-text block
        % has been attached to and influenced the boundaries of a text block.
        % Rather than suffer the degradation which will result from processing such
        % a block, we constrain it to a column when certain conditions are met.
        % As a result we truncate a portion of the non-text and overstate the
        % height of the text, but gain a "well-behaved" block.
        reclassify_non_column_aligned(NonColumnAlignedBlocks1,NewDataBlocks,ColumnAlignedBlocks
1,NewlyAlignedBlocks,StillUnAlignedBlocks),
        append(ColumnAlignedBlocks1,NewlyAlignedBlocks,ColumnAlignedBlocks2),
```

| Mar 11 1993 19:04:25 | build_geom_tree.pl | Page 3 |

```
    NonColumnAlignedBlocks2 = StillUnAlignedBlocks,

% Of those blocks which remain non-column-aligned, some may still be misclassified
    % if their merger is column-aligned and certain other conditions are met.
    merge_non_column_aligned(NonColumnAlignedBlocks2,ColumnBounds,NewDataBlocks,MergedBlock
s,NonColumnAlignedBlocks), append(ColumnAlignedBlocks2,MergedBlocks,ColumnAlignedBlocks),
    assertz(column_aligned_blocks(ColumnAlignedBlocks)), % Define the page node to be the top border of
    % the page so that node_children will initially
    % find all blocks.
    root(Root),
    % Regather all blocks as NewFineBlocks to reflect any stretching
    % which may have occurred as part of column alignment determination.
    collect_blocks(fine,NewFineBlocks),
    % Create the tree for the ColumnAlignedBlocks
    abolish(block,6),
    assert_block_list(ColumnAlignedBlocks),
    % Need to hide all clauses of block_features other than the
    % column aligned blocks while building this tree
    delete_list(ColumnAlignedBlocks,NewFineBlocks,OtherBlocks1),
    hide_block_feature_clauses(OtherBlocks1), geom_tree(Root,tree(Root,ColAlignedDesc)),
    unhide_block_feature_clauses(OtherBlocks1), % Reorganize nodes according to separator lines found.
    rule_sep_line_desc(ColAlignedDesc,ColAlignedSepLineDesc),
    % Create the tree for the NonColumnAlignedBlocks
    abolish(block,6),
    assert_block_list(NonColumnAlignedBlocks), % Need to hide all clauses of block_features other than the
    % non-column aligned blocks while building this tree
    delete_list(NonColumnAlignedBlocks,NewFineBlocks,OtherBlocks2),
    hide_block_feature_clauses(OtherBlocks2),
    geom_tree(Root,tree(Root,NonColAlignedDesc)),
    unhide_block_feature_clauses(OtherBlocks2), % Reorganize nodes according to separator lines found.
    rule_sep_line_desc(NonColAlignedDesc,NonColAlignedSepLineDesc), % Restore the database to the full set of blocks
    abolish(block,6),
    append(ColumnAlignedBlocks,NonColumnAlignedBlocks,MeaningfulBlocks),
    assert_block_list(MeaningfulBlocks).

/******************************************************************/
geom_tree(Node, tree(Node, Tree)) :-
        node_children(Node, Children),
        geom_tree_aux(Children, Tree).

geom_tree_aux([], []).

geom_tree_aux([HKid | TKid], [HTree | TTree]) :-
        geom_tree(HKid, HTree),
        geom_tree_aux(TKid, TTree).

/******************************************************************/
% Could embed a guard such that once a block is used in the tree
% it is removed from further consideration.
%
% The children of Node are sets of blocks each of which
% - sits beneath the node
% - is contiguous
% - has the same column span
% - has a column span which is a subspan of that for Node
% - has a lead child which is
```

| Mar 11 1993 19:04:25 | build_geom_tree.pl | Page 4 |

```prolog
%       - the highest block in the set
%       - is not dominated by any block more local than Node.

node_children(Node,Children) :-
        % Find the lowest block in Node
        lowest_block(Node,LowestBlock),
        LowestBlock = [LBID,LBHB,LBX,LBY,LBXsize,LBYsize],
        % Determine its column span
        block_features(LBID,LBHB,LBX,LBY,LBXsize,LBYsize,[_,_,_,_,LBStartColBounds,_,LBEndColBo
unds,_]),
        column_span(LBStartColBounds,LBEndColBounds,LBColumnSpan),
        % Find all the blocks below Node and within its column span
        mysetof([ColumnSpan,ID,HB,X,Y,Xsize,Ysize],TypogFeat^Alignment^CharCount^LineCount^Star
tColBounds^LeftComp^EndColBounds^RtComp^
                (
                block_features(ID,HB,X,Y,Xsize,Ysize,[TypogFeat,Alignment,CharCount,LineCount,
                                                StartColBounds,LeftComp,EndColBounds,Rt
Comp]),
                % Ensure candidate block is lower on the page than lowest block in Node.
                Y >= LBY - LBYsize,
                % Ensure column span of candidate block is a subspan of the column span for
                % lowest block in Node.
                column_span(StartColBounds,EndColBounds,ColumnSpan),
                % If the node whose children we are gathering is 'page', allow child block to
have same_span.
                % Othewise, allow only sub_span.
                node_children_span_check(LBID,ID,ColumnSpan,LBColumnSpan)
                ),
                SpannedLowerBlocks),
        % Sort the SpannedLowerBlocks by column span
        samsort(SpannedLowerBlocks,SortedSpannedLowerBlocks),
        % Group the SpannedLowerBlocks by column span
        bins8(SortedSpannedLowerBlocks,LabelledColumnSpanBins),
        % Remove the prepended column spans from each block in each bin.
        behead_all_bins(LabelledColumnSpanBins,ColumnSpanBins),
        % Sort each bin by y value, putting the highest block (lowest y value) first
        y_sort_all_bins(ColumnSpanBins,YSortedColumnSpanBins),
        % In each sorted bin find the highest block which is not dominated by any block
        % more local to it than (the lowest block in) Node. These blocks are the lead children.
        % Starting with the lead child in each bin, select those succeeding (i.e., lower on the
page)
        % blocks which are contiguous to the lead block.
        node_children_aux(LowestBlock,YSortedColumnSpanBins,Children).

% In each y sorted bin find the highest block which is not dominated by any block
% more local to it than (the lowest block in ) Node. These blocks are the lead children.
% Starting with the lead child in each bin, select those succeeding (i.e., lower on the page)
% blocks which are contiguous to the lead block.
%
% In each y sorted bin the first block is the highest. If it is not
% dominated by any block more local to it than (the lowest block in) Node, keep the bin.
% Of the bins retained, retain the blocks which are contigous
% to the head block.

node_children_aux(LowestNodeBlock,YSortedColumnBins,Children) :-
        contiguous_block_sequences_all_bins(YSortedColumnBins,ContiguousSubBins),
        eligible_children_bins(LowestNodeBlock,ContiguousSubBins,Children).

/******************************************************************/
% In each bin (of blocks with the same column span), partition them further
% into sub-bins of vertically contiguous sequences.

% contiguous_block_sequences_all_bins(YSortedColumnBins,ContiguousSubBins).

contiguous_block_sequences_all_bins([],[]).

contiguous_block_sequences_all_bins([HBinIn|TBinIn],ContiguousSubBins) :-
        contiguous_block_sequences_one_bin(HBinIn,RevHBinOut),
        reverse_each_sublist(RevHBinOut,HBinOut),
```

```
Mar 11 1993 19:04:25          build_geom_tree.pl                        Page 5 contiguous_block_sequences_all_bins(TBinIn,TBinOut),
          append(HBinOut,TBinOut,ContiguousSubBins).

contiguous_block_sequences_one_bin(BinIn,BinOut) :-
          bins9(BinIn,BinOut).

/***********************************************************************/
% Given a list of blocks known to have the same column span,
% partition them into vertically contiguous sequences.
% Since the given blocks all have the same column span, the
% only blocks which could interrupt the contiguous sequence
% must have a sub-column span or a super-columnspan.
% So find all blocks which have a sub- or super-column span
% relative to the Blocks and see whether any fit inbetween
% Block1 and Block2. When such an interloper is found,
% start a new bin.
% bins9(ListOfBlocks,ListOfContiguousBlockSequences)
bins9([],[]).

bins9([Hscore|Tscores],Bins) :-
          bins9_aux([Hscore|Tscores],[Hscore],Bins).

bins9_aux([_Score],List,[List]).

bins9_aux([Score1,Score2|Tin],CurrBin,[Bin|Tout]) :-
          same_bin9(Score1,Score2),
          bins9_aux([Score2|Tin],[Score2|CurrBin],[Bin|Tout]).

bins9_aux([_Score1,Score2|Tin],Bin,[Bin|Tout]) :-
          bins9_aux([Score2|Tin],[Score2],Tout).

/***********************************************************************/
same_bin9(Block1,Block2) :-
          \+ interloper_exists(Block1,Block2),
          vertical_separation(Block1,Block2,VerticalSeparation),
          VerticalSeparation =< 25.

/***********************************************************************/
% Block1 is higher (has lower Y values) than Block2.
vertical_separation(Block1,Block2,VerticalSeparation) :-
          higher_block(Block1,Block2),
          !,
          Block1 = [_ID1,_HB1,_X1,Y1,_Xsize1,Ysize1],
          Block2 = [_ID2,_HB2,_X2,Y2,_Xsize2,_Ysize2],
          VerticalSeparation is Y2 - (Y1 + Ysize1).

% Block2 is higher (has lower Y values) than Block1.
vertical_separation(Block1,Block2,VerticalSeparation) :-
          !,
          Block1 = [_ID1,_HB1,_X1,Y1,_Xsize1,_Ysize1],
          Block2 = [_ID2,_HB2,_X2,Y2,_Xsize2,Ysize2],
          VerticalSeparation is Y1 - (Y2 + Ysize2).

/***********************************************************************/
eligible_children_bins(_Node,[],[]).

% In each y sorted bin the first block is the highest. If it is not
% dominated by any block more local to it than (lower than) Node, keep the bin.
eligible_children_bins(LowestNodeBlock,[Hbin|RestIn],[Hbin|RestOut]) :-
          Hbin = [[IDH,HBH,XH,YH,XsizeH,YsizeH]|_RestBlocks],
          \+((
             block_features(IDD,HBD,XD,YD,XsizeD,YsizeD,_),
             dominates([IDD,HBD,XD,YD,XsizeD,YsizeD],[IDH,HBH,XH,YH,XsizeH,YsizeH]),
             lower_block( [IDD,HBD,XD,YD,XsizeD,YsizeD],LowestNodeBlock)
             )),
          eligible_children_bins(LowestNodeBlock,RestIn,RestOut).

% Otherwise, go on to the next bin.
eligible_children_bins(LowestNodeBlock,[_Hbin|RestIn],RestOut) :-
          eligible_children_bins(LowestNodeBlock,RestIn,RestOut).
```

| Mar 11 1993 19:04:25 | build_geom_tree.pl | Page 6 |

```prolog
/****************************************************************/
% Block1 dominates Block2 if
% - Block1 is higher on the page than Block2
%   Since Y values increase as we go down the page, this means
%   the the bottom of Block1, (Y1 + Ysize1) must be less
%   than the top of Block2 (Y2).
% - Block1's column span is a superspan of that of Block2
% If Block1 is 'page', then we will allow Block1 to dominate Block2
% under same_span conditions as well as super_span conditions.
%
% dominates(Block1,Block2)

% Block1 is 'page'.
dominates([ID1,page,X1,Y1,Xsize1,Ysize1],[ID2,HB2,X2,Y2,Xsize2,Ysize2]) :-
        !,
        higher_block([ID1,page,X1,Y1,Xsize1,Ysize1],[ID2,HB2,X2,Y2,Xsize2,Ysize2]),
        block_features(ID1,page,X1,Y1,Xsize1,Ysize1,[_,_,_,_,StartColBounds1,_,EndColBounds1,_]
),
        column_span(StartColBounds1,EndColBounds1,ColumnSpan1),
        block_features(ID2,HB2,X2,Y2,Xsize2,Ysize2,[_,_,_,_,StartColBounds2,_,EndColBounds2,_])
,
        column_span(StartColBounds2,EndColBounds2,ColumnSpan2),
        ( super_span(ColumnSpan1,ColumnSpan2) | same_span(ColumnSpan1,ColumnSpan2) ).

% Block1 is some block other than 'page'.
dominates([ID1,HB1,X1,Y1,Xsize1,Ysize1],[ID2,HB2,X2,Y2,Xsize2,Ysize2]) :-
        !,
        higher_block([ID1,HB1,X1,Y1,Xsize1,Ysize1],[ID2,HB2,X2,Y2,Xsize2,Ysize2]),
        block_features(ID1,HB1,X1,Y1,Xsize1,Ysize1,[_,_,_,_,StartColBounds1,_,EndColBounds1,_])
,
        column_span(StartColBounds1,EndColBounds1,ColumnSpan1),
        block_features(ID2,HB2,X2,Y2,Xsize2,Ysize2,[_,_,_,_,StartColBounds2,_,EndColBounds2,_])
,
        column_span(StartColBounds2,EndColBounds2,ColumnSpan2),
        super_span(ColumnSpan1,ColumnSpan2).
/****************************************************************/
% Of the blocks which comprise Node, find the one which is the lowest
% on the page. Given that those blocks are already sorted by y value,
% (and that y values increase as we go down the page) the lowest
% block will be the last block in the list.
lowest_block(Node,LowestBlock) :-
        reverse(Node,[LowestBlock|_]).
/****************************************************************/
% highest_block(Node,HighestBlock)
highest_block([HighestBlock|_],HighestBlock).

/****************************************************************/
% Given the StartColBounds and EndColBounds for a block
% determine the index of each relative to all column bounds
% column_span(StartColBounds,EndColBounds,ColumnSpan)
column_span(StartColBounds,EndColBounds,[StartColIndex,EndColIndex]) :-
        column_bounds(AllBounds),
        nth1(StartColIndex,AllBounds,StartColBounds),
        nth1(EndColIndex,AllBounds,EndColBounds).

/****************************************************************/
% node_children_span_check(NodeLowestBlockID,BlockID,Span1,Span2)
% If the NodeLowestBlockID is 'page', then we will BlockID to have
% a sub_span or same_span relative to 'page', unless BlockID is
% page itself.
% Otherwise, we allow only sub_span.
node_children_span_check(page,page,_Span1,_Span2) :-
        !,
        fail.

node_children_span_check(page,_BlkID,Span1,Span2) :-
        sub_span(Span1,Span2).

node_children_span_check(page,_BlkID,Span1,Span2) :-
        same_span(Span1,Span2).

node_children_span_check(_BlkID1,_BlkID2,Span1,Span2) :-
```

```
        sub_span(Span1,Span2).

/****************************************************************************/
% At present this is a proper subspan.
% The range of columns indicated by Span1 is a subspan
% of the range of columns indicated by Span2, e.g.,
% sub_span(Span1,Span2)
% sub_span([2,3],[1,3]
sub_span([Start1,End1],[Start2,End2]) :-
        Start1 > Start2,
        End2 >= End1.

sub_span([Start1,End1],[Start2,End2]) :-
        Start1 >= Start2,
        End2 > End1.

/****************************************************************************/
super_span(Span1,Span2) :-
        sub_span(Span2,Span1).

/****************************************************************************/
same_span(Span,Span).

/****************************************************************************/
% Given a list of blocks, each of which has a column span prepended
% as in [[StartCol,EndCol],ID,HB,X,Y,Xsize,Ysize], sort them into
% bins based on their column span.
% bins8(SpannedLowerBlocks,ColumnSpanBins)

bins8([],[]).

bins8([Hscore|Tscores],Bins) :-
        bins8_aux([Hscore|Tscores],[Hscore],Bins).

bins8_aux([_Score],List,[List]).

bins8_aux([Score1,Score2|Tin],CurrBin,[Bin|Tout]) :-
        same_bin8(Score1,Score2),
        bins8_aux([Score2|Tin],[Score2|CurrBin],[Bin|Tout]).

bins8_aux([_Score1,Score2|Tin],Bin,[Bin|Tout]) :-
        bins8_aux([Score2|Tin],[Score2],Tout).
/****************************************************************************/
same_bin8([[StartCol,EndCol],_ID1,_HB1,_X1,_Y1,_Xsize1,_Ysize1],[[StartCol,EndCol],_ID2,_HB2,_X
2,_Y2,_Xsize2,_Ysize2]).
/****************************************************************************/
behead_all_bins([],[]).

behead_all_bins([HbinIn|TbinIn],[HbinOut|TbinOut]) :-
        behead_one_bin(HbinIn,HbinOut),
        behead_all_bins(TbinIn,TbinOut).

behead_one_bin([],[]).

behead_one_bin([Hin|Tin],[Hout|Tout]) :-
        behead_one_element(Hin,Hout),
        behead_one_bin(Tin,Tout).

behead_one_element([_H|T],T).

/****************************************************************************/
% - Within each column span bin, sort by y value so that the highest block
%   is first. Recall that because y values increase as you go downward, the
%   highest block will have the lowest y value.
y_sort_all_bins([],[]).
```

```
Mar 11 1993 19:04:25          build_geom_tree.pl                    Page 8 y_sort_all_bins([HbinIn|TbinIn],[HbinOut|TbinOut]) :-
        y_sort_one_bin(HbinIn,HbinOut),
        y_sort_all_bins(TbinIn,TbinOut).

y_sort_one_bin(Bin,YSortedBin) :-
        clc_all(Bin,3,YFirstBin),
        samsort(YFirstBin,SortedYFirstBin),
        crc_all(SortedYFirstBin,3,YSortedBin).

/****************************************************************************/
% Block1 and Block2 are known to have the same column span and
% Block1 is higher on the page than Block2.
% If an interloper exists it must have a sub- or super-column span
% relative to the blocks and fit vertically between them.
interloper_exists(Block1,Block2) :-
        Block1 = [ID1,HB1,X1,Y1,Xsize1,Ysize1],
        block_features(ID1,HB1,X1,Y1,Xsize1,Ysize1,[_,_,_,_,StartColBounds1,_,EndColBounds1,_]),
        column_span(StartColBounds1,EndColBounds1,ColumnSpan),
        interloper_exists_aux(Block1,Block2,ColumnSpan).

interloper_exists_aux(Block1,Block2,ColumnSpan) :-
        block_features(ID,HB,X,Y,Xsize,Ysize,[_,_,_,_,StartColBounds,_,EndColBounds,_]),
        column_span(StartColBounds,EndColBounds,InterloperColumnSpan),
        ( super_span(InterloperColumnSpan,ColumnSpan) | sub_span(InterloperColumnSpan,ColumnSpan) ),
        lower_block([ID,HB,X,Y,Xsize,Ysize],Block1),
        higher_block([ID,HB,X,Y,Xsize,Ysize],Block2).

/****************************************************************************/
lower_block([ID1,_HB1,_X1,Y1,_Xsize1,_Ysize1],[ID2,_HB2,_X2,Y2,_Xsize2,Ysize2]) :-
        ID1 \== ID2,
        Y1 >= Y2 + Ysize2.

higher_block(Block1,Block2) :-
        lower_block(Block2,Block1).

/****************************************************************************/
/****************************************************************************/
/************** BLOCK GROUPS WITH SEPARATOR LINES ***********************/
/****************************************************************************/
/****************************************************************************/

% See comments for rule_c_desc
rule_sep_line_node(tree(Node,Descendants),NewNodeEnvironment) :-
        reorg_node_contents(Node,PartitionedNode),
        rule_sep_line_desc(Descendants,NewDesc),
        reorg_node(PartitionedNode,NewDesc,NewNodeEnvironment).

rule_sep_line_desc([],[]).

rule_sep_line_desc([Hin|Tin],NewDesc) :-
        rule_sep_line_node(Hin,Hout),
        rule_sep_line_desc(Tin,Tout),
        (Tout = []
            -> NewDesc = Hout
        ; append(Hout,Tout,NewDesc)).

/****************************************************************************/
reorg_node_contents(Node,NewNode) :-
        % Map list of blocks comprising Node into a form that will be
        % easy to create a grammar for.
        sep_line_class(Node,ClassifiedNode),
        phrase(node(BlockGroups,BlockGroupsIndex),ClassifiedNode),
        % Restore parse result to original block names
        restore_block_names(BlockGroups,Node,RenamedBlockGroups),
        % Take special block groups and separate them from ordinary block groups.
        reorg_node_contents_aux(BlockGroupsIndex,RenamedBlockGroups,OrdBlockGroups,SpecialBlockGroups),
        append(OrdBlockGroups,NodeCore),
        append([NodeCore],SpecialBlockGroups,NewNode).
```

```
/************************************************************/
% Identifiers in BlockGroups are not those found in the block tuples,
% but rather a classification for the block applied to make grammar
% construction easier. Having parsed the list to create the structure
% of BlockGroups, we must now restore the original names found in Node
% while maintaining the structure of BlockGroups.

% restore_block_names(BlockGroups,Node,OrigBlockNameGroups)
restore_block_names([],_,[]).

restore_block_names([Hin|Tin],Node,[Hout|Tout]) :-
        restore_one_block_group_names(Hin,Node,Hout,RemainingNode),
        restore_block_names(Tin,RemainingNode,Tout).

restore_one_block_group_names(BlockGroup,Node,RenamedBlockGroup,RemainingNode) :-
        length(BlockGroup,BlockGroupLength),
        first_n(BlockGroupLength,Node,RenamedBlockGroup,RemainingNode).

/************************************************************/
% reorg_node_contents_aux(BlockGroupsIndex,BlockGroups,OrdinaryBlockGroups,SpecialBlockGroups % Partitions the BlockGroups into OrdinaryBlockGroups and SpecialBlockGroups
% according to the entry in BlockGroupIndex.

reorg_node_contents_aux([],[],[],[]).

% Index entry tells us we have an ordinary block group,
% but it is empty, so ignore it.
reorg_node_contents_aux([ordblkgrp|RestBlockGroupsIndex],[[]|RestBlockGroups],OrdBlkGroups,SpecialBlkGroups) :-
        reorg_node_contents_aux(RestBlockGroupsIndex,RestBlockGroups,OrdBlkGroups,SpecialBlkGroups).

% Index entry tells us we have an ordinary block group,
% so place it in that list.
reorg_node_contents_aux([ordblkgrp|RestBlockGroupsIndex],[BlkGroup|RestBlockGroups],[BlkGroup|RestOrdBlkGroups],SpecialBlkGroups) :-
        reorg_node_contents_aux(RestBlockGroupsIndex,RestBlockGroups,RestOrdBlkGroups,SpecialBlkGroups).

reorg_node_contents_aux([_|RestBlockGroupsIndex],[BlkGroup|RestBlockGroups],OrdinaryBlockGroups,[BlkGroup|RestSpecBlkGroups]) :-
        reorg_node_contents_aux(RestBlockGroupsIndex,RestBlockGroups,OrdinaryBlockGroups,RestSpecBlkGroups).

/************************************************************/
% reorg_node(PartitionedNode,Descendants,NewNodeEnvironment)
% Given a list of partitioned node sequences and a list of Descendants,
% assign the Descendants to the first partition and make the remaining
% partitions into terminal nodes.

% There is only one partition. It is non-empty by definition.
reorg_node([Node|[]],Descendants,[tree(Node,Descendants)]).

% There is more than one partition. The first partition is
% empty because there were no ordinary block groups.
% Descendants is also empty.
% Ignore the first partition by calling reorg_node_aux
% on the tail and using its result as the result of
% reorg_node.
reorg_node([[]|RestIn],[],ReorgNode) :-
        reorg_node_aux(RestIn,ReorgNode).

% There is more than one partition. The first partition is
% empty because there were no ordinary block groups.
% Descendants is non-empty. Replace the empty first partition
% with the list of descendants. Call reorg_node_aux on the
% rest of the partitions.
reorg_node([[]|RestIn],Descendants,ReorgNode) :-
        reorg_node_aux(RestIn,RestOut),
```

```
        append(Descendants,RestOut,ReorgNode).

% There is more than one partition. The first partition is
% non-empty. Assign the Descendants to the first partition
% and call reorg_node_aux on the rest.
reorg_node([FirstPartition|RestIn],Descendants,[tree(FirstPartition,Descendants)|RestOut]) :-
        reorg_node_aux(RestIn,RestOut).

% Called on all but the first partition.
% Make each partition into a terminal node.
reorg_node_aux([],[]).

% Hardwired for a body with a single head as in photo with a single caption
reorg_node_aux([Hin|Tin],[tree(Hout,[])|Tout]) :-
        Hin = [[ID1,head,X1,Y1,Xsize,1],[ID2,body,X2,Y2,Xsize2,Ysize2],[ID3,head,X3,Y3,Xsize3,Ysize3],[ID4,head,X4,Y4,Xsize4,1]],
        Hout = [[ID1,head,X1,Y1,Xsize,1],[ID3,head,X3,Y3,Xsize3,Ysize3],[ID2,body,X2,Y2,Xsize2,Ysize2],[ID4,head,X4,Y4,Xsize4,1]],
        reorg_node_aux(Tin,Tout).

reorg_node_aux([Hin|Tin],[tree(Hin,[])|Tout]) :-
        reorg_node_aux(Tin,Tout).

/**********************************************************************/
% Grammar for a node which will be used to partition it into
% ordinary and special block groups. Special block groups will
% be removed and made into older sibling nodes.

node([BlockGroup,TwoLineAllBodyGroup|Rest1],[ordblkgrp,twolinallbodgrp|Rest2]) --> block_group(
BlockGroup),two_line_all_body_group(TwoLineAllBodyGroup),node(Rest1,Rest2).
node([BlockGroup,TwoLineBodyHeadGroup|Rest1],[ordblkgrp,twolinbodhedgrp|Rest2]) --> block_group
(BlockGroup),two_line_body_head_group(TwoLineBodyHeadGroup),node(Rest1,Rest2).
node([BlockGroup,ThreeLineGroup|Rest1],[ordblkgrp,thrlingrp|Rest2]) --> block_group(BlockGroup)
,three_line_group(ThreeLineGroup),node(Rest1,Rest2).

node([BlockGroup],[ordblkgrp]) --> block_group(BlockGroup).

two_line_all_body_group(TwoLineAllBodyGroup) --> [sep_line],body_group(BodyGroup),[sep_line],
                                 {construct_two_line_all_body_group(BodyGroup,TwoLineAllBod
yGroup)}.

% We will reverse the order of the body and the head so that tree transformation rules
% do not separate, for instance, a photo from its underlying caption.
two_line_body_head_group(TwoLineBodyHeadGroup) --> [sep_line],[body_block],[head_block],[sep_li
ne],
                                 {TwoLineBodyHeadGroup = [sep_line,body_b
lock,head_block,sep_line]}.

two_line_misc_group(TwoLineMiscBlockGroup) --> [sep_line],block_group(BlockGroup),[sep_line],
                                 {construct_two_line_misc_block_group(BlockGroup,T
woLineMiscBlockGroup)}.

three_line_group(ThreeLineGroup) --> [sep_line],[body_block],[sep_line],[head_block],[sep_line]
,
                                 {ThreeLineGroup = [sep_line,body_block,sep_line,head_b
lock,sep_line]}.

body_group([H|T]) --> [body_block],body_group(T).
body_group([]) --> [].

block_group([H|T]) --> block(H), block_group(T).
block_group([]) --> [].

block(head_block) --> [head_block].
block(body_block) --> [body_block].

construct_two_line_all_body_group(BodyGroup,TwoLineAllBodyGroup) :-
        append([sep_line],BodyGroup,Temp),
        append(Temp,[sep_line],TwoLineAllBodyGroup).

construct_two_line_misc_block_group(BlockGroup,TwoLineMiscBlockGroup) :-
```

| Mar 11 1993 19:04:25 | build_geom_tree.pl | Page 11 |

```
        append([sep_line],BlockGroup,Temp),
        append(Temp,[sep_line],TwoLineMiscBlockGroup).

/*******************************************************************/
% Given the list of blocks which comprise a node, map each block
% into its separator line class:
%    sep_line for those blocks functioning as separator lines
%    block for those blocks which have no special role
sep_line_class([],[]).

sep_line_class([Hblock|Tblock],[Hclass|Tclass]) :-
        sep_line_class_one_block(Hblock,Hclass),
        sep_line_class(Tblock,Tclass).

/*******************************************************************/
% sep_line_class_one_block([BlockID,HB,X,Y,Xsize,Ysize],Class)
% If a block is a head with a Ysize of 1 then
% it is functioning as a separator line (sep_line).
% Otherwise, it is an ordinary block.

sep_line_class_one_block([_BlockID,head,_X,_Y,_Xsize,1],sep_line).
sep_line_class_one_block([_BlockID,head,_X,_Y,_Xsize,_Ysize],head_block).
sep_line_class_one_block([_BlockID,body,_X,_Y,_Xsize,_Ysize],body_block).

/*******************************************************************/
% Partition the list of blocks, each denoted by [ID,HB,X,Y,Xsize,Ysize] into
% those which are rule lines because they have a Ysize = 1 and the others.

% End of list
rule_line_blocks([],[],[]).

% Block is a rule line
rule_line_blocks([[ID,HB,X,Y,Xsize,1]|RestBlocksIn],[[ID,HB,X,Y,Xsize,1]|RestRuleLineBlocks],Ot
herBlocks) :-
        rule_line_blocks(RestBlocksIn,RestRuleLineBlocks,OtherBlocks).

% Block is not a rule line.
rule_line_blocks([ThisBlock|RestBlocksIn],RuleLineBlocks,[ThisBlock|RestOtherBlocks]) :-
        rule_line_blocks(RestBlocksIn,RuleLineBlocks,RestOtherBlocks).

/*******************************************************************/
% Given a list of non-column-aligned blocks and a list of rule lines,
% partition the rule lines into those which are associated with a
% non-column-aligned block (in a bracketing role) and those which
% are not. The latter will be treated as ordinary blocks, so that
% if they are column aligned (which they should be) they will be
% extended to the furthest meaningful column boundaries.
% Note that we are not testing the rule line for column alignment;
% we are merely selecting those which are vertical_neighbors of
% non_column_aligned blocks.
%
%inset_assoc_rule_line_blocks(RuleLines,NonColumnAlignedBlocks,NonColumnAlignedRuleLines,OtherR
uleLines)

inset_assoc_rule_line_blocks([],_,[],[]).

inset_assoc_rule_line_blocks([Hrule_line|Trule_line],NonColAlignedBlocks,[Hrule_line|Tnoncol_ru
le_line],OtherRuleLines) :-
        member(X,NonColAlignedBlocks),
        vertical_neighbor(Hrule_line,X),
        inset_assoc_rule_line_blocks(Trule_line,NonColAlignedBlocks,Tnoncol_rule_line,OtherRule
Lines).

inset_assoc_rule_line_blocks([Hrule_line|Trule_line],NonColAlignedBlocks,NonColRuleLines,[Hrule
_line|Tother_rule_lines]) :-
        inset_assoc_rule_line_blocks(Trule_line,NonColAlignedBlocks,NonColRuleLines,Tother_rule
_lines).
```

| Mar 11 1993 19:04:25 | build_geom_tree.pl | Page 12 |

```prolog
/*********************************************************************/
vertical_neighbor(Block1,Block2) :-
        vertical_separation(Block1,Block2,Separation),
        !,
        Separation =< 5.

/*********************************************************************/
/*********************************************************************/
/****************** SPECIAL PURPOSE UTILITIES ***********************/
/*********************************************************************/
/*********************************************************************/

/*********************************************************************/
rule_line_blocks_envelope(DataBlocks,RuleLineDataBlocks,OrdinaryDataBlocks) :-
        rule_line_blocks(DataBlocks,RuleLineDataBlocks,OrdinaryDataBlocks).

/*********************************************************************/
non_gutter_blocks_envelope(ColumnBoundedBlocks,ColumnBounds,NonGutterBlocks) :-
        non_gutter_blocks(ColumnBoundedBlocks,ColumnBounds,NonGutterBlocks).

/*********************************************************************/
assert_block_list([]).

assert_block_list([[ID,HB,X,Y,Xsize,Ysize]|RestBlocks]) :-
        assertz(block(ID,HB,X,Y,Xsize,Ysize)),
        assert_block_list(RestBlocks).

/*********************************************************************/
hide_block_feature_clauses([]).

hide_block_feature_clauses([[ID,HB,X,Y,Xsize,Ysize]|RestBlocks]) :-
        retract(block_features(ID,HB,X,Y,Xsize,Ysize,Features)),
        assertz(hidden_block_features(ID,HB,X,Y,Xsize,Ysize,Features)),
        hide_block_feature_clauses(RestBlocks).

unhide_block_feature_clauses([]).

unhide_block_feature_clauses([[ID,HB,X,Y,Xsize,Ysize]|RestBlocks]) :-
        retract(hidden_block_features(ID,HB,X,Y,Xsize,Ysize,Features)),
        assertz(block_features(ID,HB,X,Y,Xsize,Ysize,Features)),
        unhide_block_feature_clauses(RestBlocks).

/*********************************************************************/
% collect_blocks(Granularity,Blocks)
% Bags up clauses of block according to granularity.
%
% Coarse blocks refer to the large blocks created by the x-y segmentation
% process. These are used to partition a page into format bands when we
% think that the column format will not be consistent all the way down
% the page. In this case the block ID and head/body designation are not
% applicable.
%
% Fine blocks refer to the actual data blocks found by the connected
% component segmentation.

collect_blocks(coarse,CoarseBlocks) :-
        mybagof((X,Y,Xsize,Ysize),ID^HB^
                        ( block(ID,HB,X,Y,Xsize,Ysize),
                Ysize > 1 ),
                        CoarseBlocks).

collect_blocks(fine,FineBlocks) :-
        bagof([ID,HB,X,Y,W,D],
                        block(ID,HB,X,Y,W,D),
                        FineBlocks).
/*********************************************************************/
non_trivial_blocks([],_Threshold,[]).
```

| Mar 11 1993 19:04:25 | build_geom_tree.pl | Page 13 |

```prolog
% Area is greater than threshold; retain the block.
non_trivial_blocks([[ID,HB,X,Y,Xsize,Ysize]|Tin],Threshold,[[ID,HB,X,Y,Xsize,Ysize]|Tout]) :-
        Xsize * Ysize > Threshold,
        non_trivial_blocks(Tin,Threshold,Tout).

% Area is less than or equal to threshold; discard the block.
non_trivial_blocks([_Hin|Tin],Threshold,Tout) :-
        non_trivial_blocks(Tin,Threshold,Tout).

%block_features(ID,head,X,Y,Xsize,Ysize,['### non text ###',_,_,_,_,_,_,_])

/**********************************************************************/
data_blocks([],[]).

data_blocks([Hblock|Tblock],TdataBlock) :-
        noise_block(Hblock),
        data_blocks(Tblock,TdataBlock).

data_blocks([Hblock|Tblock],[Hblock|TdataBlock]) :-
        data_blocks(Tblock,TdataBlock).

% We want to eliminate "noise" blocks.
% A block will be considered noise if it is all of:
%    non-text or garbage characters
%    narrow or small
%
% Narrow will be defined as having a ratio of
% larger dimension / smaller dimension > 10
% or the smaller dimension < 6
%
% Small will be defined as having
% area <100.
%
% Note : Non-column-aligned blocks are more likely to be noisy,
%        but at present there is nothing here to take column
%        alignment into account /**********************************************************************/
noise_block([ID,_HB,X,Y,Xsize,Ysize]) :-
        block_features(ID,_,X,Y,Xsize,Ysize,['### non text ###',_,_,_,_,_,_,_]),
        narrow_block(Xsize,Ysize).

noise_block([ID,_HB,X,Y,Xsize,Ysize]) :-
        block_features(ID,_,X,Y,Xsize,Ysize,['### non text ###',_,_,_,_,_,_,_]),
        small_block(Xsize,Ysize).

noise_block([ID,_HB,X,Y,Xsize,Ysize]) :-
        block_features(ID,_,X,Y,Xsize,Ysize,['### garbage ###',_,_,_,_,_,_,_]),
        narrow_block(Xsize,Ysize).

noise_block([ID,_HB,X,Y,Xsize,Ysize]) :-
        block_features(ID,_,X,Y,Xsize,Ysize,['### garbage ###',_,_,_,_,_,_,_]),
        small_block(Xsize,Ysize).

% A block will also be considered a noise block if it is covered by another
% block of the same type. We allow a tolerance in determining whether one
% block is covered by another.

% Block is a text block covered by a text block with the same font attributes
% (meaning it is not likely to be an inset 'highlight' block).
noise_block([ID1,HB1,X1,Y1,Xsize1,Ysize1]) :-
        % Block is a text block
        block_features(ID1,HB1,X1,Y1,Xsize1,Ysize1,[[_,PointSize,FaceStyle],_,_,_,_,_,_,_]),
        % Find another textblock
        block_features(ID2,HB2,X2,Y2,Xsize2,Ysize2,[[_,PointSize,FaceStyle],_,_,_,_,_,_,_]),
```

```
Mar 11 1993 19:04:25          build_geom_tree.pl                    Page 14
        ID1 \== ID2,
        covered_by([ID1,HB1,X1,Y1,Xsize1,Ysize1],[ID2,HB2,X2,Y2,Xsize2,Ysize2],4).

% Block is a non text block covered by a non text block
noise_block([ID1,HB1,X1,Y1,Xsize1,Ysize1]) :-
        % Block is a non text block
        block_features(ID1,HB1,X1,Y1,Xsize1,Ysize1,['### non text ###',_,_,_,_,_,_,_]),
        % Find another non text block
        block_features(ID2,HB2,X2,Y2,Xsize2,Ysize2,['### non text ###',_,_,_,_,_,_,_]),
        ID1 \== ID2,
        covered_by([ID1,HB1,X1,Y1,Xsize1,Ysize1],[ID2,HB2,X2,Y2,Xsize2,Ysize2],4).

% Block is a garbage block covered by a garbage block
noise_block([ID1,HB1,X1,Y1,Xsize1,Ysize1]) :-
        % Block is a garbage block
        block_features(ID1,HB1,X1,Y1,Xsize1,Ysize1,['### garbage ###',_,_,_,_,_,_,_]),
        % Find another garbage block
        block_features(ID2,HB2,X2,Y2,Xsize2,Ysize2,['### garbage ###',_,_,_,_,_,_,_]),
        ID1 \== ID2,
        covered_by([ID1,HB1,X1,Y1,Xsize1,Ysize1],[ID2,HB2,X2,Y2,Xsize2,Ysize2],4).

% Another category of noise block is a rule line block which intersects
% any other block.
noise_block([ID1,HB1,X1,Y1,Xsize1,Ysize1]) :-
        block_features(ID1,HB1,X1,Y1,Xsize1,Ysize1,['### rule line ###',_,_,_,_,_,_,_]),
        collect_blocks(fine,AllBlocks),
        delete(AllBlocks,[ID1,HB1,X1,Y1,Xsize1,Ysize1],OtherBlocks),
        intersect_any([ID1,HB1,X1,Y1,Xsize1,Ysize1],OtherBlocks).

/*************************************************************************/
narrow_block(Xsize,Ysize) :-
        LargerDimension is max(Xsize,Ysize),
        SmallerDimension is min(Xsize,Ysize),
        narrow_block_aux(LargerDimension,SmallerDimension).

narrow_block_aux(LargerDimension,SmallerDimension) :-
        LargerDimension/SmallerDimension > 10.

narrow_block_aux(_LargerDimension,SmallerDimension) :-
        SmallerDimension < 6.

/*************************************************************************/
small_block(Xsize,Ysize) :-
        Xsize*Ysize < 200.

/*************************************************************************/
% covered_by(Block1,Block2)
% Block1 is completely covered by Block2 within a tolerance.

covered_by([_ID1,_HB1,X1,Y1,Xsize1,Ysize1],[_ID2,_HB2,X2,Y2,Xsize2,Ysize2],Tolerance) :-
        % Use area as a quick filter.
        % Area of covered block must not exceed area of uncovered block
        Xsize1*Ysize1 =< Xsize2*Ysize2,
        % Boundary check
        ( (X2 =< X1) | (X2 - X1 =< Tolerance) ),
        ( (Y2 =< Y1) | (Y2 - Y1 =< Tolerance) ),
        ( (X1 + Xsize1 =< X2 + Xsize2) | ( (X1 + Xsize1) - (X2 + Xsize2) =< Tolerance) ),
        ( (Y1 + Ysize1 =< Y2 + Ysize2) | ( (Y1 + Ysize1) - (Y2 + Ysize2) =< Tolerance) ).

/*************************************************************************/
% The list DataBlocks is first determined before blocks are classified
% as to column alignment which sometimes stretches them and reclassifies
% them as to head/body.
% So once the column/noncolumn partition is complete we refresh
% the data blocks list to reflect any stretching that has been done.
```

```
Mar 11 1993 19:04:25          build_geom_tree.pl                        Page 15 refresh_data_blocks_list([],[]).

refresh_data_blocks_list([Hin|Tin],[Hout|Tout]) :-
        Hin = [ID,_HB,_X,_Y,_Xsize,_Ysize],
        block(ID,Class,Xnew,Ynew,XsizeNew,YsizeNew),
        Hout = block(ID,Class,Xnew,Ynew,XsizeNew,YsizeNew),
        refresh_data_blocks_list(Tin,Tout).

/********************************************************************/
% defoliate(Tree,BareTree).
defoliate(tree(Node,Descendants),tree(BareNode,BareDescendants)) :-
        defoliate_node_list(Node,BareNode),
        defoliate_descendants(Descendants,BareDescendants).

defoliate_node_list([],[]).

defoliate_node_list([[ID,HB,_X,_Y,_W,_D]|Tin],[(ID,HB)|Tout]) :-
        defoliate_node_list(Tin,Tout).

defoliate_descendants([],[]).

defoliate_descendants([Hin|Tin],[Hout|Tout]) :-
        functor(Hin,tree,2),
        defoliate(Hin,Hout),
        defoliate_descendants(Tin,Tout).

defoliate_descendants([Hin|Tin],[Hout|Tout]) :-
        defoliate_node_list(Hin,Hout),
        defoliate_descendants(Tin,Tout).

/********************************************************************/
/********************************************************************/
/*****************  GENERAL PURPOSE UTILITIES  ***********************/
/********************************************************************/
/********************************************************************/
% Delete a list from a Superlist, returning FinalResidue.
% delete_list(List,SuperList,Residue).

delete_list([],FinalResidue,FinalResidue).

delete_list([H|T],List,FinalResidue) :-
        delete(List,H,Residue),
        delete_list(T,Residue,FinalResidue).
/********************************************************************/
write_list(L) :-
        write_list(v,L).

write_list(h,[]).

write_list(h,[H|T]) :-
        write(H),
        write(' '),
        write_list(h,T).

write_list(v,[]).

write_list(v,[H|T]) :-
        write(H),
        nl,
        write_list(v,[H|T]).
/********************************************************************/
% Temporary debug utility. The term 'wl' stands for 'write_list'.
wl(_) :-
        nl,
```

```
        nl.
wl([H|T]) :-
        nl,
        write(H),
        wl(T).

/**********************************************************************/
between(A,B,C) :-
        A =< B,
        B =< C.
/**********************************************************************/
mybagof(A,B,C) :-
        bagof(A,B,C).

mybagof(_A,_B,[]).

mysetof(A,B,C) :-
        setof(A,B,C).

mysetof(_A,_B,[]).
```

Mar 11 1993 19:04:2_  chain.pl  Page 1

```prolog
/*********************************************************************/
/*********************************************************************/
/*********************************************************************/ column_bounds(AllBlocks,ColAlignTolerance,MeaningfulBounds) :-
        link_pool(AllBlocks,ColAlignTolerance,LinkPool),
        trial_chain(LinkPool,Chains),
        score_page_spanning_col_chains(Chains,ScoredChains),
        samsort(ScoredChains,AscendingScoredChains),
        reverse(AscendingScoredChains,DescendingScoredChains),
        best_page_spanning_col_chain_aux(DescendingScoredChains,BestScoredChain),
        bounds_only(BestScoredChain,Bounds),
        meaningful_column_bounds(Bounds,MeaningfulBounds).

/*********************************************************************/
% Any outer column which is not meaningful will be deleted from ColumnBounds.
% However, if we find only one column, we will take it unconditionally.

meaningful_column_bounds(AllColumnBounds,AllColumnBounds) :-
        length(AllColumnBounds,1).

meaningful_column_bounds(AllColumnBounds,MeaningfulColumnBounds) :-
        AllColumnBounds = [FirstColumn|RestColumns],
        reverse(RestColumns,[LastColumn|_MiddleColumns]),
        mybagof(CB,
                (
                  member(CB,[FirstColumn,LastColumn]),
                  \+ meaningful_outer_column(CB,AllColumnBounds)
                ),
                NonMeaningfulOuterColumnBounds),
        delete_list(NonMeaningfulOuterColumnBounds,AllColumnBounds,MeaningfulColumnBounds).

/*********************************************************************/
% Given the bounds of an outer column (first or last), ensure that it is a
% meaningful column
%    - The width of the column must be at least 1/3 of the median column width
%      of the remaining columns.
%      (Could have the fraction dependent on the number of columns.)
% meaningful_outer_column([ColStart,ColWidth],AllColumnBounds)
meaningful_outer_column([ColStart,ColWidth],AllColumnBounds) :-
        delete(AllColumnBounds,[ColStart,ColWidth],OtherColumnBounds),
        median_column_width(OtherColumnBounds,MedianColumnWidth),
        ColWidth >= (1/3)*MedianColumnWidth.

/*********************************************************************/
median_column_width(ColumnBounds,MedianColumnWidth) :-
        column_widths(ColumnBounds,ColumnWidths),
        samsort(ColumnWidths,SortedColumnWidths),
        length(SortedColumnWidths,ColumnCount),
        median_column_width_aux(SortedColumnWidths,ColumnCount,MedianColumnWidth).

% Even number of entries. Average the two "middle" ones.
median_column_width_aux(SortedColumnWidths,ColumnCount,MedianColumnWidth) :-
        ColumnCount/2 == ColumnCount//2,
        Index1 is ColumnCount/2,
        Index2 is Index1 + 1,
        nth1(Index1,SortedColumnWidths,Term1),
        nth1(Index2,SortedColumnWidths,Term2),
        MedianColumnWidth is (Term1 + Term2)/2.

% Odd number of entries.
median_column_width_aux(SortedColumnWidths,ColumnCount,MedianColumnWidth) :-
        Index is ColumnCount//2 + 1,
        nth1(Index,SortedColumnWidths,MedianColumnWidth).

/*********************************************************************/
column_widths([],[]).

column_widths([[_Start,Width]|RestIn],[Width|RestOut]) :-
        column_widths(RestIn,RestOut).
```

```
/*******************************************************************/
delete_link([ThisCommonXLinks|RestCommonXLinks],[[Start,Width]],RestCommonXLinks) :-
        delete_link_aux(ThisCommonXLinks,[[Start,Width]],[]).

delete_link([ThisCommonXLinks|RestCommonXLinks],[[Start,Width]],[NewThisCommonXLinks|RestCommon
XLinks]) :-
        delete_link_aux(ThisCommonXLinks,[[Start,Width]],NewThisCommonXLinks).

delete_link([ThisCommonXLinks|RestCommonXLinksIn],[[Start,Width]],[ThisCommonXLinks|RestCommonX
LinksOut]) :-
        delete_link(RestCommonXLinksIn,[[Start,Width]],[RestCommonXLinksOut]).

delete_link_aux([[Start,Width,_BlockIDs]|RestLinks],[[Start,Width]],RestLinks).

delete_link_aux([ThisLink|RestLinksIn],[[Start,Width]],[ThisLink|RestLinksOut]) :-
        delete_link_aux(RestLinksIn,[[Start,Width]],RestLinksOut).

/*******************************************************************/
/*******************************************************************/
/*******************************************************************/
link_pool(AllBlocks,ColAlignTolerance,LinkPool) :-
        % Partition the blocks by X.
        group_by_X(AllBlocks,Xbins),
        % Further partition the blocks by Xsize.
        group_by_Xsize(Xbins,XsizeSubBins),
        col_cand_bounds_all_bins(XsizeSubBins,ColAlignTolerance,TempLinkPool),
        wide_enough_links(TempLinkPool,ColAlignTolerance,LinkPool).

/*******************************************************************/
group_by_X(Blocks,SortedXGroupedBlocks) :-
        % [ID,HB,X,Y,Xsize,Ysize] -> [X,Y,Xsize,Ysize,ID,HB]
        clc_all(Blocks,2,XFirstBlocks),
        samsort(XFirstBlocks,SortedXFirstBlocks),
        bins4(SortedXFirstBlocks,Bins),
        crc_all_bins(Bins,2,SortedXGroupedBlocks).

/*******************************************************************/
crc_all_bins([],_Offset,[]).

crc_all_bins([HbinIn|TbinIn],Offset,[HbinOut|TbinOut]) :-
        crc_all(HbinIn,Offset,HbinOut),
        crc_all_bins(TbinIn,Offset,TbinOut).

/*******************************************************************/
% Given a list of bins which are blocks clustered by X, further partition
% them into groups clustered by Xsize. The input blocks are of the form
% [X,Y,ID,HB,Y,Ysize]. In order to subgroup by Xsize we first transform
% each block into [Xsize,ID,HB,Y,Ysize,X].
group_by_Xsize([],[]).

group_by_Xsize([HbinIn|TbinIn],[HbinOut|TbinOut]) :-
        % [ID,HB,X,Y,Xsize,Ysize] -> [Xsize,Ysize,ID,HB,X,Y]
        clc_all(HbinIn,4,XsizeFirstBin),
        samsort(XsizeFirstBin,SortedXsizeFirstBin),
        bins4(SortedXsizeFirstBin,SortedXsizeGroupedBlocks),
        crc_all_bins(SortedXsizeGroupedBlocks,4,HbinOut),
        group_by_Xsize(TbinIn,TbinOut).

/*******************************************************************/
```

```
Mar 11 1993 19:04:25                    chain.pl                         Page 3
```

```prolog
% Determine the bounds for all bins by recursively determining the bounds for
% each bin.
col_cand_bounds_all_bins([],_,[]).

col_cand_bounds_all_bins([HbinIn|TbinIn],ColAlignTolerance,[HbinOut|TbinOut]) :-
        col_cand_bounds_one_bin(HbinIn,ColAlignTolerance,0,0,_,HbinOut),
        col_cand_bounds_all_bins(TbinIn,ColAlignTolerance,TbinOut).

/****************************************************************/
% Each BinIn is a set of blocks with a common X, subgrouped by common Xsize.
% Each block is represented by the list [ID,HB,X,Y,Xsize,Ysize].
% We will convert each bin to a list of three element lists
%       Column Candidate Start
%       Column Candidate Width
%       List of block IDs which fall within the bounds defined by the first
%           two elements.
% There will be a three element list for each sub-bin.
% col_cand_bounds_one_bin(BinIn,ColAlignTolerance,0,0,_BinAvgX,BinOut)

col_cand_bounds_one_bin([],_ColAlignTolerance,BinSumX,BinCount,BinAvgX,[]) :-
        FloatingBinAvgX is BinSumX / BinCount,
        round(FloatingBinAvgX,BinAvgX).

col_cand_bounds_one_bin([HsubBinIn|TsubBinIn],ColAlignTolerance,CurrBinSumX,CurrBinCount,BinAvg
X,[HsubBinOut|TsubBinOut]) :-
        % Compute :
        %    The average Xsize for all blocks in the sub-bin and
        %    The sum of the X values for all blocks in the sub-bin.
        %    The list of IDs of blocks in the sub-bin.
        sub_bin_statistics(HsubBinIn,SubBinSumX,SubBinAvgXsize,IDlist),
        NewBinSumX is CurrBinSumX + SubBinSumX,
        length(IDlist,SubBinCount),
        NewBinCount is CurrBinCount + SubBinCount,
        HsubBinOut = [BinAvgX,SubBinAvgXsize,IDlist],
        col_cand_bounds_one_bin(TsubBinIn,ColAlignTolerance,NewBinSumX,NewBinCount,BinAvgX,Tsub
BinOut).

/****************************************************************/
sub_bin_statistics(SubBin,SumX,AvgXsize,IDlist) :-
        sub_bin_statistics_aux(SubBin,0,SumX,0,SumXsize,[],IDlist),
        length(IDlist,Count),
        FloatingAvgXsize is SumXsize / Count,
        round(FloatingAvgXsize,AvgXsize).

sub_bin_statistics_aux([],SumX,SumX,SumXsize,SumXsize,IDlist,IDlist).

sub_bin_statistics_aux([Hblock|Tblock],CurrSumX,SumX,CurrSumXsize,SumXsize,CurrIDlist,IDlist) :
-
        Hblock = [ID,_HB,X,_Y,Xsize,_Ysize],
        NewSumX is CurrSumX + X,
        NewSumXsize is CurrSumXsize + Xsize,
        sub_bin_statistics_aux(Tblock,NewSumX,SumX,NewSumXsize,SumXsize,[ID|CurrIDlist],IDlist)
.

/****************************************************************/
/****************************************************************/
/****************************************************************/
max_link_pool_bound(LinkPool,Bound) :-
        prepend_max(LinkPool,AugmentedLinkPool),
        samsort(AugmentedLinkPool,SortedAugmentedLinkPool),
        reverse(SortedAugmentedLinkPool,[[Bound,_,_|_]|_]).

/****************************************************************/
prepend_max([],[]).

prepend_max([HlinkPool|TlinkPool],AugmentedLinkPool) :-
        prepend_max_aux(HlinkPool,HAugmentedLinkPool),
        prepend_max(TlinkPool,TAugmentedLinkPool),
        append(HAugmentedLinkPool,TAugmentedLinkPool,AugmentedLinkPool).
```

```
Mar 11 1993 19:04:25                chain.pl                                Page 4 prepend_max_aux([],[]).

prepend_max_aux([[X,Xsize|IDlist]|RestIn],[[Max,X,Xsize|IDlist]|RestOut]) :-
                Max is X + Xsize,
                prepend_max_aux(RestIn,RestOut).

/***********************************************************************/
wide_enough_links([],_,[]).

wide_enough_links([HlinkIn|TlinkIn],ColAlignTolerance,LinksOut) :-
        wide_enough_link(HlinkIn,ColAlignTolerance,HlinkOut),
        wide_enough_links(TlinkIn,ColAlignTolerance,TlinkOut),
        wide_enough_links_aux(HlinkOut,TlinkOut,LinksOut).

wide_enough_links([HlinkIn|TlinkIn],ColAlignTolerance,[HlinkOut|TlinkOut]) :-
        wide_enough_link(HlinkIn,ColAlignTolerance,HlinkOut),
        wide_enough_links(TlinkIn,ColAlignTolerance,TlinkOut).

wide_enough_link([],_,[]).

wide_enough_link([[Start,Width,BlockIDs]|Tin],ColAlignTolerance,[[Start,Width,BlockIDs]|Tout])
:-
        Width > ColAlignTolerance,
        wide_enough_link(Tin,ColAlignTolerance,Tout).

wide_enough_link([_|Tin],ColAlignTolerance,Tout) :-
        wide_enough_link(Tin,ColAlignTolerance,Tout).

wide_enough_links_aux([],LinksOut,LinksOut).

wide_enough_links_aux(HlinkOut,TlinkOut,[HlinkOut|TlinkOut]).

/***********************************************************************/
/***********************************************************************/
/***********************************************************************/
best_page_spanning_col_chain(LinkPool,MaxLinkPoolBound,BestChain) :-
        bagof(Chain,LinkPool^
                page_spanning_col_chain(LinkPool,MaxLinkPoolBound,Chain),
                Chains),
        score_page_spanning_col_chains(Chains,ScoredChains),
        samsort(ScoredChains,AscendingScoredChains),
        reverse(AscendingScoredChains,DescendingScoredChains),
        best_page_spanning_col_chain_aux(DescendingScoredChains,BestScoredChain),
        bounds_only(BestScoredChain,BestChain).

/***********************************************************************/
% Do not allow a the best column chain to be of length = 1 if there is good
% evidence to the contrary, namely, there is another chain of length > 1.

% The first chain encountered is of length > 1. Take it.
best_page_spanning_col_chain_aux([BestChain|_RestChains],BestChain) :-
        length(BestChain,ChainLength),
        ChainLength > 1.

% This is the only chain. Take it regardless of length.
best_page_spanning_col_chain_aux([BestAndOnlyChain],BestAndOnlyChain).

% There's a better chain further down the list.
best_page_spanning_col_chain_aux([_ThisChain|RestChains],BestChain) :-
        best_page_spanning_col_chain_aux(RestChains,BestChain).

/***********************************************************************/
page_spanning_col_chain([HlinkPool|TlinkPool],MaxPageBound,Chain) :-
        member(FirstLink,HlinkPool),
        col_chain(FirstLink,TlinkPool,Chain),
```

```
                                                    Mar 11 1993 19:04:25              chain.pl                              Page 5
        spans_page(Chain,MaxPageBound).

/***************************************************************************/
% For each link up to the middle of the list of links
% construct a column chain by seeding the chain from the first link trial_chain(LinkPool,Chains) :-
        length(LinkPool,LinkCount),
        MaxFirstLinkIndex is LinkCount//2,
        trial_chain_aux(LinkPool,MaxFirstLinkIndex,1,[],Chains).

trial_chain_aux([],_,_,TempChains,Chains) :-
        keeper_chains(front,TempChains,Chains).

trial_chain_aux([HlinkGroup|TlinkGroup],MaxFirstLinkIndex,CurrIndex,CurrChains,Chains) :-
        CurrIndex =< MaxFirstLinkIndex, bagof(Chain,FirstLink^
                (
                member(FirstLink,HlinkGroup),
                col_chain(FirstLink,TlinkGroup,Chain)
                ),
                TempChains1),
        keeper_chains(back,TempChains1,TempChains2), NewIndex is CurrIndex + 1,
        append(TempChains2,CurrChains,NewChains),
        trial_chain_aux(TlinkGroup,MaxFirstLinkIndex,NewIndex,NewChains,Chains).
trial_chain_aux(_,_,_,TempChains,Chains) :-
        keeper_chains(front,TempChains,Chains).

/***************************************************************************/
% As in fishing we only want to keep a chain if it is long enough.
% The interpretation here will be to discard any chain which is a
% subchain of another in the list. For efficiency's sake, we will sort
% the list by length of entry before making the comparisons.

keeper_chains(back,Chains,KeeperChains) :-
        prepend_length(Chains,AugmentedChains),
        sort(AugmentedChains,SortedAugmentedChains),
        unprepend_length(SortedAugmentedChains,SortedChains),
        keeper_chains_aux(back,SortedChains,KeeperChains).

keeper_chains(front,Chains,KeeperChains) :-
        prepend_length(Chains,AugmentedChains),
        sort(AugmentedChains,SortedAugmentedChains),
        unprepend_length(SortedAugmentedChains,SortedChains),
        keeper_chains_aux(front,SortedChains,KeeperChains).

/***************************************************************************/
unprepend_length([],[]).

unprepend_length([[_Length|Elements]|Tin],[Elements|Tout]) :-
        unprepend_length(Tin,Tout).

keeper_chains_aux(back,[],[]).

keeper_chains_aux(back,[H|Tin],Tout) :-
        member(Chain,Tin),
        append(H,_Back,Chain),
        keeper_chains_aux(back,Tin,Tout).

keeper_chains_aux(back,[H|Tin],[H|Tout]) :-
        keeper_chains_aux(back,Tin,Tout).

keeper_chains_aux(front,[],[]).

keeper_chains_aux(front,[H|Tin],Tout) :-
```

```
        member(Chain,Tin),
        append(_Front,H,Chain),
        keeper_chains_aux(front,Tin,Tout).
keeper_chains_aux(front,[H|Tin],[H|Tout]) :-
        keeper_chains_aux(front,Tin,Tout).

/*******************************************************************/
% We refer to Chain in chain_aux for simplicity.
% In actuality, we are building the chain in reversed
% order.

col_chain(ThisLink,RestLinkPool,Chain) :-
        col_chain_aux(ThisLink,RestLinkPool,[],ReversedRestChain),
        reverse(ReversedRestChain,RestChain),
        Chain = [ThisLink|RestChain].

col_chain_aux(_,[],Chain,Chain).

% Some member of HlinkPool abuts CurrLink.
%     It starts beyond the end of CurrLink.
%     It is not more than 25 points beyond the end of CurrLink.
% Update the current link (first argument) and the
% current chain (third argument) and go on to try
% to form the rest of the chain.
col_chain_aux(CurrLink,[HlinkPool|TlinkPool],CurrChain,Chain) :-
        CurrLink = [X1,X1size,_IDs1],
        member(LinkCand,HlinkPool),
        LinkCand = [X2,_X2size,_IDs2],
        X2 > (X1 + X1size),
        X2 - (X1 + X1size) < 30,
        col_chain_aux(LinkCand,TlinkPool,[LinkCand|CurrChain],Chain).

% If no member of HlinkPool abuts CurrLink, then go on
% to the next link pool.
col_chain_aux(CurrLink,[_HlinkPool|TlinkPool],CurrChain,Chain) :-
        col_chain_aux(CurrLink,TlinkPool,CurrChain,Chain).

/*******************************************************************/
spans_page(Chain,MaxPageBound) :-
        reverse(Chain,[[LastX,LastXsize|_IDlist]|_]),
        abs(LastX + LastXsize - MaxPageBound) < 20.

/*******************************************************************/
/*******************************************************************/
/*******************************************************************/
% score_page_spanning_col_chains(Chains,ScoredChains)

score_page_spanning_col_chains([],[]).

score_page_spanning_col_chains([Hchain|Tchain],[[Score|Hchain]|TscoredChain]) :-
        score_page_spanning_col_chain(Hchain,0,Score),
        score_page_spanning_col_chains(Tchain,TscoredChain).

/*******************************************************************/
% score_page_spanning_col_chain(Chain,CurrScore,Score)

score_page_spanning_col_chain([],Score,Score).

score_page_spanning_col_chain([[_,_,BlockIDs]|RestLinks],CurrSum,Sum) :-
        score_link(BlockIDs,0,LinkScore),
        NewSum is CurrSum - LinkScore,
        score_page_spanning_col_chain(RestLinks,NewSum,Sum).
```

```
/*********************************************************************/
% score_link([BlockIDs],CurrLinkScore,LinkScore).

score_link([],LinkScore,LinkScore).

score_link([HblockID|TblockID],CurrLinkScore,LinkScore) :-
        block(HblockID,_HB,_X,_Y,Xsize,Ysize),
        NewLinkScore is CurrLinkScore - Xsize*Ysize,
        score_link(TblockID,NewLinkScore,LinkScore).

/*********************************************************************/
bounds_only(ScoredChain,Chain) :-
        ScoredChain = [_Score|AugmentedChain],
        bounds_only_aux(AugmentedChain,Chain).

bounds_only_aux([],[]).

bounds_only_aux([[X,Xsize,_IDlist]|RestIn],[[X,Xsize]|RestOut]) :-
        bounds_only_aux(RestIn,RestOut).
```

| Mar 11 1993 19:04:25 | classify_blocks.pl | Page 1 |

```
/*******************************************************************/
/****************** TOP LEVEL FOR THIS FILE ************************/
/*******************************************************************/
% Create block database
create_block_db(fine,InDir,OutDir,InFileRoot,InFileCoarse,InFileFine,OutFile) :-
        % Read .blk file and create initial clauses of block(ID,HB,X,Y,Xsize,Ysize)
        % All but HB (head/body) will be instantiated. Bag up the clauses.
        initialize_db(fine,InDir,OutDir,InFileRoot,InFileCoarse,InFileFine,OutFile),
        collect_blocks(fine,FineBlocks), % Read .doc file for each block, extract typographical block features
        % and ASCII characters for each block. Write out .asc files.
        label_blocks_1(InDir,InFileRoot,FineBlocks,FineBlocksFeatures), % Given the typographical features for the individual blocks,
        % determine certain features for the page as a whole.
        % For now this is limited to determining the predominant point size
        % for the page, which is stored in a clause of page_features(PagePointSize).
        page_point_size(FineBlocksFeatures),
        % Given features for the blocks and for the page, loop through the
        % blocks again, labelling each as 'head' or 'body'.
        label_blocks_2(FineBlocks,FineBlocksFeatures,_Labels).

create_block_db(coarse,InDir,OutDir,InFileRoot,InFileCoarse,InFileFine,OutFile) :-
        % Read .blk file and create initial clauses of block(ID,HB,X,Y,Xsize,Ysize)
        % All but HB (head/body) will be instantiated. Bag up the clauses.
        initialize_db(coarse,InDir,OutDir,InFileRoot,InFileCoarse,InFileFine,OutFile).
        % We do not deal with typographical features for coarse blocks.

/*******************************************************************/
initialize_db(fine,InDir,OutDir,InFileRoot,InFileCoarse,InFileFine,OutFile) :-
        assert(block_counter(1)),
        assert(tree_index(0)),
        create_file_names(InDir,
                                OutDir,
                                InFileRoot,
                                InFileCoarse,
                                InFileFine,
                                OutFile),
        get_blocks(InFileFine),
        page_size(Width,_Depth),
        assert(root([[page,'<hb>',0,0,Width,0]])).

initialize_db(coarse,InDir,OutDir,InFileRoot,InFileCoarse,InFileFine,OutFile) :-
        assert(block_counter(1)),
        assert(tree_index(0)),
        create_file_names(InDir,
                                OutDir,
                                InFileRoot,
                                InFileCoarse,
                                InFileFine,
                                OutFile),
        get_blocks(InFileCoarse),
        page_size(Width,_Depth),
        assert(root([[page,'<hb>',0,0,Width,0]])).
```

| Mar 11 1993 19:04:25 | classify_blocks.pl | Page 2 |

```
/********************************************************************/
% Extracts the typographical features and character count for each block
% in a list.
%
% Based on the typographical features of the blocks, certain features
% for the page as a whole will be computed. For now this is limited to
% determining the page point size.

% The page features in turn will be used by label_blocks_2 to determine
% whether each block should be labelled as 'head' or 'body'.

label_blocks_1(_,_,[],[]).

label_blocks_1(Indir,InFileRoot,[ThisBlock|RestBlocks],[ThisBlockFeatures|RestBlocksFeatures])
:-
        label_block_1(Indir,InFileRoot,ThisBlock,ThisBlockFeatures),
        label_blocks_1(Indir,InFileRoot,RestBlocks,RestBlocksFeatures).

% Block is really a rule line, as denoted by specifications of
% X,Y,Xsize,1. There are no features to compute and no .asc file to write.
label_block_1(_InDir,_InFileRoot,[_ID,_HB,_X,_Y,_Xsize,1],['### rule line ###']).

label_block_1(InDir,InFileRoot,[ID,_LineCount,_X,_Y,_Xsize,_Ysize],Label) :-
        % Construct path names
        block_file_paths(InDir,InFileRoot,ID,OcrFilePath,TxtFilePath),
        % If the .txt file does not exist or has zero bytes,
        % then we will consider the block to be nontext.
        ascii_category(TxtFilePath,Category),
        label_block_1_aux(OcrFilePath,Category,Label).

% label_block_1_aux(OcrFilePath,TextCategory,Label)

% If the TextCategory is text, it is meaningful to proceed
% with feature determination.
% BlockFeatures is a list consisting of:
% [[Typeface,PointSize|Emphasis],Alignment,CharCount,LineCount]
% Of the font related features
%    Currently the Typeface is not available and will be ''
%    PointSize is an integer
%    Emphasis is a list, possibly empty, dealing with posture and weight
%    Example
%       ['',10,italic]
% Alignment will be a member of {left, right, both, neither}
% We are not taking centered text into account at this time
label_block_1_aux(OcrFilePath,text,BlockFeatures) :-
        det_block_features(OcrFilePath,BlockFeatures).

% Otherwise, take the text category as the label.
label_block_1_aux(_OcrFilePath,Category,[Category]).

/********************************************************************/
label_blocks_2([],[],[]).

label_blocks_2([Hblock|Tblock],[Hfeatureset|Tfeatureset],[Hlabel|Tlabel]) :-
        head_body(Hblock,Hfeatureset,Hlabel),
        label_blocks_2(Tblock,Tfeatureset,Tlabel).

/********************************************************************/
% Construct file names
%       'InFileRoot<Index>.txt for file of ASCII characters only.
%       'InFileRoot<Index>.ocr' for file of ASCII characters with imbedded OCR transactions codes
block_file_paths(Dir,FileRoot,BlockID,OcrFilePath,TxtFilePath) :-
        % Strip the 'blk' prefix from the numeric index
        atom_chars(BlockID,[98,108,107|IndexChars]),    % [98,108,107] --> 'blk'
        % Create the indexed root
        atom_chars(FileRoot,RootChars),
```

```
Mar 11 1993 19:04:25          classify_blocks.pl                    Page 3 append(RootChars,IndexChars,TempChars),
        % Create the file names
        append(TempChars,[46,116,120,116],TxtFileChars),    % [46,107,100,99] --> '.txt'
        append(TempChars,[46,120,100,99],OcrFileChars),     % [46,120,100,99] --> '.ocr'
        % Create full path names
        atom_chars(Dir,DirChars),
        append(DirChars,TxtFileChars,InPathTxtChars),
        append(DirChars,OcrFileChars,InPathOcrChars),
        atom_chars(OcrFilePath,InPathOcrChars),
        atom_chars(TxtFilePath,InPathTxtChars).

/*****************************************************************************/

% Given the feature set for a block and the page point size,
% determines whether the Label for the block is a 'head' or a 'body'.
% The HB field is overloaded. When we first create the clause of block
% we will use it to store the number of "lines" as determined by
% image-based routines.
% Now that we have a line count from OCR we will not use
% the line count in the HB field. Instead, we will refer to it
% as _LC.
% Once 'head' or 'body' has been determined, _LC
% can be replaced on the reassert by whichever
% of 'head'/'body' we have determined.
% As a side effect, refreshes the base clause for the block
% by instantiating the HB argument with the value of Label.
% head_body([ID,HB,X,Y,Xsize,Ysize],[[Typeface,PointSize,FaceStyle],Alignment,CharCount,LineCou
nt],Label) :-

% <<<1>>> Block is a nontext block. Designate it to be a body.
head_body([ID,_LC,X,Y,Xsize,Ysize],['### non text ###'],body) :-
        retract(block(ID,_LC,X,Y,Xsize,Ysize)),
        assertz(block(ID,body,X,Y,Xsize,Ysize)),
        assertz(block_features(ID,body,X,Y,Xsize,Ysize,['### non text ###',_,_,_,_,_,_,_])).

% <<<2>>> Block is a "garbage" block. Designate it to be a body.
head_body([ID,_LC,X,Y,Xsize,Ysize],['### garbage ###'],body) :-
        retract(block(ID,_LC,X,Y,Xsize,Ysize)),
        assertz(block(ID,body,X,Y,Xsize,Ysize)),
        assertz(block_features(ID,body,X,Y,Xsize,Ysize,['### non text ###',_,_,_,_,_,_,_])).

% <<<3>>> Block represents a rule line, as denoted by specifications of
% X,Y,Xsize,1. Designate it to be 'head'.
head_body([ID,_LC,X,Y,Xsize,1],['### rule line ###'],head) :-
        retract(block(ID,_LC,X,Y,Xsize,1)),
        assertz(block(ID,head,X,Y,Xsize,1)),
        assertz(block_features(ID,head,X,Y,Xsize,1,['### rule line ###',_,_,_,_,_,_,_])).

%    FaceStyle
%    Line Count
%    Point Size ...
%    Font Emphasis ...
%    Alignment ...
%    Aspect Ratio ...
%    Position on page ...

% <<<4>>> Block is a 'head' if
head_body([ID,_LC,X,Y,Xsize,Ysize],[[Typeface,PointSize,FaceStyle],Alignment,CharCount,LineCoun
t],head) :-
        page_features(PagePointSize),
        ( PointSize > PagePointSize | member(FaceStyle,[i,b,t]) ),    % [italic, bold, bolditalic]
        LineCount =< 3,
        expected_line_count(Ysize,PointSize,ExpectedLineCount),
        abs(ExpectedLineCount - LineCount) =< 2,
        block(ID,_LC,X,Y,Xsize,Ysize),
        retract(block(ID,_LC,X,Y,Xsize,Ysize)),
        assertz(block(ID,head,X,Y,Xsize,Ysize)),
        assertz(block_features(ID,head,X,Y,Xsize,Ysize,[[Typeface,PointSize,FaceStyle],Alignmen
t,CharCount,LineCount,_,_,_,_])).

% Could add a 'head' clause for headers and footers requiring them
% to be <= PagePointSize, have only 1 line of text, only 1 line expected.
```

```
% <<<5>>> Block is a 'body' if
head_body([ID,_LC,X,Y,Xsize,Ysize],[[Typeface,PointSize,FaceStyle],Alignment,CharCount,LineCoun
t],body) :-
        page_features(PagePointSize),
        PointSize = PagePointSize,
        member(Alignment,[left,both]),
        FaceStyle = r,
        retract(block(ID,_HB,X,Y,Xsize,Ysize)),
        assertz(block(ID,body,X,Y,Xsize,Ysize)),
        assertz(block_features(ID,body,X,Y,Xsize,Ysize,[[Typeface,PointSize,FaceStyle],Alignmen
t,CharCount,LineCount,_,_,_,_])).

% <<<6>>> Block is a 'body' by default
% Photo + caption combination blocks will be captured here.
% We could add a criterion that the number of lines is much
% less than the number of expected lines.
head_body([ID,_,X,Y,Xsize,Ysize],[[Typeface,PointSize,FaceStyle],Alignment,CharCount,LineCount]
,body) :-
        retract(block(ID,_HB,X,Y,Xsize,Ysize)),
        assertz(block(ID,body,X,Y,Xsize,Ysize)),
        assertz(block_features(ID,body,X,Y,Xsize,Ysize,[[Typeface,PointSize,FaceStyle],Alignmen
t,CharCount,LineCount,_,_,_,_])).

/***************************************************************/
% Assign to each block feature configuration a score equal to the number
% of characters in the block. The feature configuration with the highest
% score will serve as the feature configuration for the page as a whole.

% Blocks which represent rule lines will not be accompanied by a feature set.
% Instead the feature list will be ['### rule line ###']. These blocks
% should not contribute to the computation of page features.

page_point_size(BlockFeatures) :-
        page_point_size_aux(BlockFeatures,[],PointSizeCharCountPairs),
        reverse_args(PointSizeCharCountPairs,CharCountPointSizePairs),
        samsort(CharCountPointSizePairs,SortedCharCountPointSizePairs),
        reverse(SortedCharCountPointSizePairs,[(_,PagePointSize)|_]),
        assertz(page_features(PagePointSize)).
/***************************************************************/
reverse_args([],[]).

reverse_args([(Arg1,Arg2)|RestPairsIn],[(Arg2,Arg1)|RestPairsOut]) :-
        reverse_args(RestPairsIn,RestPairsOut).

/***************************************************************/ page_point_size_aux([],PointSizeCharCountPairs,PointSizeCharCountPairs).

% Blocks which represent rule lines will not be accompanied by a feature set.
% Instead the feature list will be ['### rule line ###']. These blocks
% should not contribute to the computation of page features.
% page_point_size_aux(BlockFeatures,CurrPointSizeCharCountPairs,PointSizeCharCountPairs)
page_point_size_aux([['### rule line ###']|RestBlocks],CurrPointSizeCharCountPairs,PointSizeCha
rCountPairs) :-
        page_point_size_aux(RestBlocks,CurrPointSizeCharCountPairs,PointSizeCharCountPairs).

% Blocks which are non text will not be accompanied by a feature set.
% Instead the feature list will be ['### non text ###']. These blocks
% should not contribute to the computation of page features.
% page_point_size_aux(BlockFeatures,CurrPointSizeCharCountPairs,PointSizeCharCountPairs)
page_point_size_aux([['### non text ###']|RestBlocks],CurrPointSizeCharCountPairs,PointSizeChar
CountPairs) :-
        page_point_size_aux(RestBlocks,CurrPointSizeCharCountPairs,PointSizeCharCountPairs).

% Blocks which are "garbage" will not be accompanied by a feature set.
% Instead the feature list will be ['### garbage ###']. These blocks
% should not contribute to the computation of page features.
```

| Mar 11 1993 19:04:25 | classify_blocks.pl | Page 5 |

```
page_point_size_aux([['### garbage ###']|RestBlocks],CurrPointSizeCharCountPairs,PointSizeCharC
ountPairs) :-
        page_point_size_aux(RestBlocks,CurrPointSizeCharCountPairs,PointSizeCharCountPairs).

% Update the point size character count pairs using the features
% of this block and go on to the rest of the blocks.
page_point_size_aux([[[_Typeface,PointSize|_],_Alignment,CharCount,_LineCount]|RestBlocks],Curr
PointSizeCharCountPairs,PointSizeCharCountPairs) :-
        update_point_size_char_count(PointSize,CharCount,CurrPointSizeCharCountPairs,UpdatedPai
rs),
        page_point_size_aux(RestBlocks,UpdatedPairs,PointSizeCharCountPairs).

% There is not already a pair for this point size. Create one.
update_point_size_char_count(PointSize,CharCount,[],[(PointSize,CharCount)]).

% If there is already a pair for this point size, add the CharCount
% to the CurrCharCount.
update_point_size_char_count(PointSize,CharCount,[(PointSize,CurrCharCount)|RestPairs],[(PointS
ize,NewCharCount)|RestPairs]) :-
        NewCharCount is CurrCharCount + CharCount.

update_point_size_char_count(PointSize,CharCount,[(PtSz,ChCt)|RestPairsIn],[(PtSz,ChCt)|RestPai
rsOut]) :-
        update_point_size_char_count(PointSize,CharCount,RestPairsIn,RestPairsOut).

/****************************************************************/
expected_line_count(BlockHt,PtSize,ExpectedLineCount) :-
        % The leading is hard coded at 2. We could try using a percentage,
        % say 20%, of the PtSize, rounded to the nearest integer.
        FloatingPointExpectedLineCount is BlockHt/(PtSize + 2),
        round(FloatingPointExpectedLineCount,ExpectedLineCount).

/****************************************************************/
/****************************************************************/
det_block_features(OcrFilePath,Features) :-
        % open OcrFilePath for reading
        open(OcrFilePath,read,Stream),
        set_input(Stream),
        % Assume first character in file is not -1
        process_ocr_file(Stream,Features),
        close(Stream),
        % Restore fileerrors in case other procedures
        % rely on it.
        fileerrors.

/****************************************************************/
/******************    Utilities    ******************************/
/****************************************************************/
name_attribute_list([],[]).

name_attribute_list([[HcharList|TcharLists],[Hname|Tnames]) :-
        name(Hname,HcharList),
        name_attribute_list(TcharLists,Tnames).

reverse_all(In,Out) :-
        reverse(In,ReversedIn),
        reverse_all_aux(ReversedIn,Out).

reverse_all_aux([],[]).

reverse_all_aux([HlistIn|TlistIn],[HlistOut|TlistOut]) :-
        reverse(HlistIn,HlistOut),
        reverse_all_aux(TlistIn,TlistOut).

/****************************************************************/
```

| Mar 11 1993 19:04:25 | cntrl_geom_tree.pl | Page 1 |

```prolog
:- dynamic block_counter/1.
:- dynamic block/6.
:- dynamic block_features/7.
:- dynamic hidden_block_features/7.
:- dynamic page_size/2.
:- dynamic tree_index/1.
:- dynamic root/1.
:- dynamic page_features/1.
:- dynamic first_column_width/1.

:- dynamic node_count/2.
:- dynamic parent/3.
:- dynamic node/5.
:- dynamic block/8.
:- dynamic merged/2.

% xform_geom_tree.pl
:- dynamic remaining_nodes/1.
:- dynamic succ_msg/1.
:- dynamic transferee_scope/1.
:- dynamic block_renum/2.
:- dynamic offspring/2.

:- dynamic column_bounds/1.

:- dynamic column_aligned_blocks/1.
/****************************/ do_tree :-
        unix(argv(ArgList)),
        nth1(1,ArgList,InDir),
        nth1(2,ArgList,OutDir),
        nth1(3,ArgList,FileRoot),
        nth1(4,ArgList,ColMode),
        do_tree(ColMode,InDir,OutDir,FileRoot),
        halt.

/***********************************************************************/
% For pages with a single configuration of columns like a newspaper.

do_tree(1,InDir,OutDir,InFileRoot) :-
        create_block_db(fine,InDir,OutDir,InFileRoot,_InFileCoarse,_InFileFine,OutFile),
        geom_tree_sup(1,page,ColAlignedTree,NonColAlignedTree),
        rule_s_super(ColAlignedTree,ColAlignedTree0),
        rule_s_super(NonColAlignedTree,NonColAlignedTree0),
        insert_nodes(ColAlignedTree0,NonColAlignedTree0,Tree0),
        defoliate(Tree0,BareTree0),
        rule_a_b(rule_a,BareTree0,BareTree1),
        rule_a_b(rule_b,BareTree1,BareTree2),
        rule_c_super(BareTree2,BareTree3),
        rule_d_super(BareTree3,BareTree4),
        make_tree_facts(OutFile,BareTree0,BareTree4),
        clean_up_db.

/***********************************************************************/
% For pages with two or more configurations of columns, like the lead page
% of a technical journal article.

do_tree(2,InDir,OutDir,InFileRoot) :-
        % Create block db for coarse blocks
        create_block_db(coarse,InDir,OutDir,InFileRoot,InFileCoarse,InFileFine,OutFile),
        page_size(PageXsize,_PageYsize),
        collect_blocks(coarse,CoarseBlocks),
        bins1(CoarseBlocks,PageXsize,Bins1), % Create block db for fine blocks
        create_block_db(fine,InDir,OutDir,InFileRoot,InFileCoarse,InFileFine,OutFile),
        collect_blocks(fine,FineBlocks), % Associate fine blocks with coarse blocks
        % Finds the bin and coarse block within which each fine block
        % is located and prepends the bin number and coarse block
        % number within bin to each fine block.
        % [FineBlockID,HB,X,Y,Xsize,Ysize] -> [BinNum,CoarseBlockNum,FineBlockID,HB,X,Y,Xsize,Y
```

| Mar 11 1993 19:04:25 | cntrl_geom_tree.pl | Page 2 |

```
size]
        map_blocks_to_cols(FineBlocks,Bins1,BinAugmentedFineBlocks),
        sort(BinAugmentedFineBlocks,BinSortedFineBlocks),
        % Groups the FineBlocks by bin.
        bins2(BinSortedFineBlocks,BinGroupedFineBlocks),
        merge_within_coarse_bins(BinGroupedFineBlocks,CoalescedBinGroupedFineBlocks), % Determine the geometric tree for each Bin, i.e., each column configuration band.
        geom_tree_branches([[page,'<hb>',0,0,PageXsize,0]],CoalescedBinGroupedFineBlocks,Branch
Trees),
        % Merge the branch trees.
        merge_trees(BranchTrees,Tree0),
        % Proceed as with single configuration case.
        defoliate(Tree0,BareTree0),
        rule_ab(rule_a,BareTree0,BareTree1),
        rule_ab(rule_b,BareTree1,BareTree2),
        rule_c_super(BareTree2,BareTree3),
        rule_d_super(BareTree3,BareTree4),
        make_tree_facts(OutFile,BareTree0,BareTree4),
        clean_up_db.

/*************************************************************************/
clean_up_db :-
        abolish(block,6),
        abolish(block_counter,1),
        abolish(block_features,7),
        abolish(hidden_block_features,7),
        abolish(page_features,1),
        abolish(page_size,2),
        abolish(root,1),
        abolish(tree_index,1),
        abolish(column_bounds,1),
        abolish(column_aligned_blocks,1).
```

| Mar 11 1993 19:04:25 | col_bands.pl | Page 1 |

```prolog
/*********************************************************************/
merge_within_coarse_bins(BinsIn,BinsOut) :-
        merge_within_coarse_bins_and_blocks(BinsIn,BinsTemp),
        group_by_bins(BinsTemp,BinsOut).

merge_within_coarse_bins_and_blocks([],[]).

merge_within_coarse_bins_and_blocks([HbinIn|TbinIn],[HbinOut|TbinOut]) :-
        bins3(HbinIn,Bins3),
        merge_within_coarse_blocks(Bins3,HbinOut),
        merge_within_coarse_bins_and_blocks(TbinIn,TbinOut).

merge_within_coarse_blocks([],[]).

merge_within_coarse_blocks([HcoarseBlockIn|TcoarseBlockIn],[HcoarseBlockOut|TcoarseBlockOut]) :-
        merge_horizontal_neighbors(HcoarseBlockIn,HcoarseBlockOut),
        merge_within_coarse_blocks(TcoarseBlockIn,TcoarseBlockOut).

/*********************************************************************/
% CoarseBlockIn is a list of fine blocks contained by CoarseBlock.
% We partition them into classes based upon the relation
% horiz_neighbor. Each such class is merged into a single block,
% ClassRep, by merge_horizontal_neighbors_aux.

merge_horizontal_neighbors(CoarseBlockIn,CoarseBlockOut) :-
        partition(horiz_neighbor,CoarseBlockIn,EquivClasses),
        merge_horizontal_neighbors_aux(EquivClasses,CoarseBlockOut).

/*********************************************************************/
merge_horizontal_neighbors_aux([],[]).

merge_horizontal_neighbors_aux([Hclass|Tclass],[Hblock|Tblock]) :-
        length(Hclass,1),
        Hclass = [Hblock],
        merge_horizontal_neighbors_aux(Tclass,Tblock).

merge_horizontal_neighbors_aux([Hclass|Tclass],[Hblock|Tblock]) :-
        merge_blocks(Hclass,Hblock),
        merge_horizontal_neighbors_aux(Tclass,Tblock).

/*********************************************************************/
% Use the first input block as the initial CurrBlockOut. Then
% call merge_blocks_aux to recur through the rest of the input
% blocks merging them one at a time to CurrBlockOut.
merge_blocks(BlocksIn,BlockOut) :-
        BlocksIn = [HblockIn|TblockIn],
        merge_blocks_aux(TblockIn,HblockIn,AnonymousBlockOut),
        block_counter(BlockCount),
        NewBlockCount is BlockCount + 1,
        AnonymousBlockOut = [CoarseBin,CoarseBlock,_,HB,X,Y,Xsize,Ysize],
        concat(blk,NewBlockCount,NewBlockID),
        BlockOut = [CoarseBin,CoarseBlock,NewBlockID,HB,X,Y,Xsize,Ysize],
        assertz(block(NewBlockID,HB,X,Y,Xsize,Ysize)),
        retract(block_counter(BlockCount)),
        assert(block_counter(NewBlockCount)).

merge_blocks_aux([],BlockOut,BlockOut).

merge_blocks_aux([Hblock|Tblock],CurrBlockOut,BlockOut) :-
        merge_block_pair(Hblock,CurrBlockOut,NewBlockOut),
        Hblock = [_,_,BlockID1,_,_,_,_,_],
        retract(block(BlockID1,_,_,_,_,_)),
        % If this is the first time through, then we
        % are merging two original blocks, in which case
```

```
Mar 11 1993 19:04:25                    col_bands.pl                              Page 2
        % both will have IDs and both will have to be
        % retracted from the block db. Otherwise, the
        % second block will not have its ID instantiated
        % until this procedure returns, so only one
        % block will be retracted from the block db
        % on each pass.
        CurrBlockOut = [_,_,BlockID2,_,_,_,_,_],
        (atom(BlockID2) -> retract(block(BlockID2,_,_,_,_,_)) ; true),
        merge_blocks_aux(Tblock,NewBlockOut,BlockOut).

merge_block_pair(Block1,Block2,MergedBlock) :-
        Block1 = [CoarseBin,CoarseBlock,_BlockID1,HB1,X1,Y1,X1size,Y1size],
        Block2 = [CoarseBin,CoarseBlock,_BlockID2,HB2,X2,Y2,X2size,Y2size],
        (X1 < X2
            -> Xnew = X1
            ;  Xnew = X2),
        (Y1 < Y2
            -> Ynew = Y1
            ;  Ynew = Y2),
        (X2 + X2size < X1 + X1size
            -> Xsizenew is X1 + X1size - Xnew
            ;  Xsizenew is X2 + X2size - Xnew),
        (Y2 + Y2size < Y1 + Y1size
            -> Ysizenew is Y1 + Y1size - Ynew
            ;  Ysizenew is Y2 + Y2size - Ynew),
        merge_block_labels(HB1,HB2,MergedBlockHB),
        MergedBlock =
            [CoarseBin,CoarseBlock,_MergedBlockID,MergedBlockHB,Xnew,Ynew,Xsizenew,Ysizenew].

/***********************************************************************/
merge_block_labels(head,head,head).
merge_block_labels(body,body,body).
merge_block_labels(_,_,body).

/***********************************************************************/
horiz_neighbor(Block1,Block2) :-
        Block2 = [_CoarseBin,_CoarseBlock,_BlockID2,_HB2,X2,Y2,X2size,Y2size],
        % BlockID2 will be a horizontal neighbor of BlockID1 if BlockID2
        % intersects the projection of BlockID1 to the left and right within
        % the neighborhood. For ease of data management we will take the side
        % edges of the page as the left and right boundaries of the neighborhood.
        % This will yield a valid result because the two blocks are already
        % known to be in the same local neighborhood, i.e., the same CoarseBlock.
        page_size(PageXsize,_PageYsize),
        horizontal_extension(Block1,0,PageXsize,ExtendedBlock1),
        ( overlap_p(ExtendedBlock1,(X2,Y2,X2size,Y2size)) | overlap_p((X2,Y2,X2size,Y2size),Ext
endedBlock1) ).

% horizontal_extension(Block,ColumnStart,ColumnWidth,ExtendedBlock)
horizontal_extension(Block,ColumnStart,ColumnWidth,ExtendedBlock) :-
        Block = [_CoarseBinNum,_CoarseBlockNum,_BlockID,_HB,_X,Y,_Xsize,Ysize],
        ExtendedBlock = (ColumnStart,Y,ColumnWidth,Ysize).

/***********************************************************************/
% bins1(ScoresList,ScoresBins).
% Takes a list of "scores" (more generally, terms) and assigns them to
% bins if they meet the conditions of same_bin.
% Assumes scores are ordered in such a way that all scores which belong
% in the same bin will occupy contiguous positions in the input list.
% In this case the scores will be four-tuples of the form (X,Y,Xsize,Ysize).

bins1([Hscore|Tscores],PageXsize,Bins) :-
        bins1_aux([Hscore|Tscores],PageXsize,[Hscore],Bins).

bins1_aux([_Score],_PageXsize,List,[List]).
```

```
Mar 11 1993 19:04:25              col_bands.pl                              Page 3 bins1_aux([Score1,Score2|Tin],PageXsize,CurrBin,[Bin|Tout]) :-
        same_bin1(Score1,Score2,PageXsize),
        bins1_aux([Score2|Tin],PageXsize,[Score2|CurrBin],[Bin|Tout]).

bins1_aux([_Score1,Score2|Tin],PageXsize,Bin,[Bin|Tout]) :-
        bins1_aux([Score2|Tin],PageXsize,[Score2],Tout).

/**********************************************************************/
% bins2(ScoresList,ScoresBins).
% Takes a list of "scores" (more generally, terms) and assigns them to
% bins if they meet the conditions of same_bin.
% Assumes scores are ordered in such a way that all scores which belong
% in the same bin will occupy contiguous positions in the input list.
% In this case the scores will be seven element lists of the form
% [BinNum,BlockID,HB,X,Y,Xsize,Ysize].

bins2([Hscore|Tscores],Bins) :-
        bins2_aux([Hscore|Tscores],[Hscore],Bins).

bins2_aux([_Score],List,[List]).

bins2_aux([Score1,Score2|Tin],CurrBin,[Bin|Tout]) :-
        same_bin2(Score1,Score2),
        bins2_aux([Score2|Tin],[Score2|CurrBin],[Bin|Tout]).

bins2_aux([_Score1,Score2|Tin],Bin,[Bin|Tout]) :-
        bins2_aux([Score2|Tin],[Score2],Tout).

/**********************************************************************/
% bins3(ScoresList,ScoresBins).
% Takes a list of "scores" (more generally, terms) and assigns them to
% bins if they meet the conditions of same_bin.
% Assumes scores are ordered in such a way that all scores which belong
% in the same bin will occupy contiguous positions in the input list.
% In this case the scores will be eight element lists of the form
% [CoarseBinNum,CoarseBlockNum,BlockID,HB,X,Y,Xsize,Ysize].

bins3([Hscore|Tscores],Bins) :-
        bins3_aux([Hscore|Tscores],[Hscore],Bins).

bins3_aux([_Score],List,[List]).

bins3_aux([Score1,Score2|Tin],CurrBin,[Bin|Tout]) :-
        same_bin3(Score1,Score2),
        bins3_aux([Score2|Tin],[Score2|CurrBin],[Bin|Tout]).

bins3_aux([_Score1,Score2|Tin],Bin,[Bin|Tout]) :-
        bins3_aux([Score2|Tin],[Score2],Tout).

/**********************************************************************/
% Two consecutive blocks which have the same Y value and
% same depth are part of the same horizontal band.
same_bin1((_X1,Y,_Xsize1,Ysize),(_X2,Y,_Xsize2,Ysize),_PageXsize).

% Two consecutive blocks which span the full width of
% the page are part of the same horizontal band.
same_bin1((0,_Y1,PageXsize,_Ysize1),(0,_Y2,PageXsize,_Ysize2),PageXsize).

/**********************************************************************/
% Two consecutive blocks which have the same BinNum (first element)
% are in the same bin.
same_bin2([BinNum,_,_,_,_,_,_,_],[BinNum,_,_,_,_,_,_,_]).

/**********************************************************************/
% Two consecutive blocks which have the same CoarseBlockNum (second
% element) are in the same bin.
same_bin3([_,CoarseBlockNum,_,_,_,_,_,_],[_,CoarseBlockNum,_,_,_,_,_,_]).
```

| Mar 11 1993 19:04:25 | col_bands.pl | Page 4 |

```prolog
/*******************************************************************/
%group_by_bins(BinsIn,BinsOut).
% BinsIn is a list of bins. Each bin is a list of groupings of fine
% blocks into coarse blocks. Each fine block has its bin number and
% coarse block number prepended to the basic six items of information.
% This procedure will reduce the levels of grouping to fine blocks
% within bin and will restore the fine blocks to the basic six items
% of information.

group_by_bins([],[]).

group_by_bins([HBinIn|TBinIn],[HBinOut|TBinOut]) :-
        simplify_bin_1(HBinIn,HBinTemp),
        simplify_bin_2(HBinTemp,HBinOut),
        group_by_bins(TBinIn,TBinOut).

simplify_bin_1([],[]).

simplify_bin_1([Hcoarse_grouping|Tcoarse_grouping],SimplifiedBin) :-
        simplify_bin_1(Tcoarse_grouping,TempSimplifiedBin),
        append(Hcoarse_grouping,TempSimplifiedBin,SimplifiedBin).

simplify_bin_2([],[]).

simplify_bin_2([[_,_|RestBlock]|RestBinIn],[RestBlock|RestBinOut]) :-
        simplify_bin_2(RestBinIn,RestBinOut).

/*******************************************************************/
% Create a geometric structure tree branch for each column zone.

geom_tree_branches(_Root,[],[]).

geom_tree_branches(Root,[Hcolzone|Tcolzone],[Tree0|Tbranch]) :-
        geom_tree_sup(2,page,Hcolzone,ColAlignedTree,NonColAlignedTree),
        rule_s_super(ColAlignedTree,ColAlignedTree0),
        rule_s_super(NonColAlignedTree,NonColAlignedTree0),
        insert_nodes(ColAlignedTree0,NonColAlignedTree0,Tree0),
        geom_tree_branches(Root,Tcolzone,Tbranch).

/*******************************************************************/
sort_blocks_by_x_y(Blocks,SortedBlocks) :-
        clc_all(Blocks,2,CLC_Blocks),
        sort(CLC_Blocks,SortedCLC_Blocks),
        crc_all(SortedCLC_Blocks,2,SortedBlocks).
/*******************************************************************/
sort_blocks_by_y_x(Blocks,SortedBlocks) :-
        clc_all(Blocks,2,CLC_Blocks),
        exchange_first_two(CLC_Blocks,ExchCLC_Blocks),
        sort(ExchCLC_Blocks,SortedExchCLC_Blocks),
        exchange_first_two(SortedExchCLC_Blocks,SortedCLC_Blocks),
        crc_all(SortedCLC_Blocks,2,SortedBlocks).
/*******************************************************************/
% clc_all(InList,Offset,OutList)
% Takes each element of InList and performs a circular left shift
% by Offset positions.
clc_all([],_Offset,[]).

clc_all([Hin|Tin],Offset,[Hout|Tout]) :-
        clc_one(Hin,Offset,Hout),
        clc_all(Tin,Offset,Tout).

clc_one(InList,Offset,OutList) :-
        first_n(Offset,InList,FirstN,Rest),
        append(Rest,FirstN,OutList).

/*******************************************************************/
```

| Mar 11 1993 19:04:25 | col_bands.pl | Page 5 |

```prolog
% crc_all(InList,Offset,OutList)
% Takes each element of InList and performs a circular right shift
% by Offset positions.
crc_all([],_Offset,[]).
crc_all([Hin|Tin],Offset,[Hout|Tout]) :-
        crc_one(Hin,Offset,Hout),
        crc_all(Tin,Offset,Tout).

crc_one(InList,Offset,OutList) :-
        length(InList,InLength),
        OffsetComplement is InLength - Offset,
        first_n(OffsetComplement,InList,FirstN,Rest),
        append(Rest,FirstN,OutList).
/********************************************************************/
first_n(N,InList,FirstN,Rest) :-
        first_n_aux(N,InList,0,FirstN,Rest).

first_n_aux(N,List,N,[],List).

first_n_aux(N,[H|Tin],M,[H|Tout],Rest) :-
        NewM is M + 1,
        first_n_aux(N,Tin,NewM,Tout,Rest).
/********************************************************************/
exchange_first_two([],[]).

exchange_first_two([[A,B|T]|RestIn],[[B,A|T]|RestOut]) :-
        exchange_first_two(RestIn,RestOut).

/********************************************************************/
merge_trees(Trees,MergedTree) :-
        Trees = [tree(PageNode,_)|_],
        merge_trees_aux(Trees,Branches),
        MergedTree = tree(PageNode,Branches).

merge_trees_aux([],[]).

merge_trees_aux([tree(_Hnode,Hdesc)|Ttree],Branches) :-
        merge_trees_aux(Ttree,Tbranch),
        append(Hdesc,Tbranch,Branches).

/********************************************************************/
% Two rectangles will overlap if a vertex of one lies on or within
% the bounds of the other or vice-versa.
% This should be called twice with the arguments in opposite order
% and linked by a disjunct as in ( overlap_p(A,B) | overlap_p(B,A) ).

% Test NW
overlap_p((NWx1,NWy1,_Xsize1,_Ysize1),(NWx2,NWy2,Xsize2,Ysize2)) :-
        NWx2 =< NWx1,
        NWx1 =< NWx2 + Xsize2,
        NWy2 =< NWy1,
        NWy1 =< NWy2 + Ysize2.

% Test NE
overlap_p((NWx1,NWy1,Xsize1,_Ysize1),(NWx2,NWy2,Xsize2,Ysize2)) :-
        NWx2 =< NWx1 + Xsize1,
        NWx1 + Xsize1 =< NWx2 + Xsize2,
        NWy2 =< NWy1,
        NWy1 =< NWy2 + Ysize2.

% Test SE
overlap_p((NWx1,NWy1,Xsize1,Ysize1),(NWx2,NWy2,Xsize2,Ysize2)) :-
        NWx2 =< NWx1 + Xsize1,
        NWx1 + Xsize1 =< NWx2 + Xsize2,
        NWy2 =< NWy1 + Ysize1,
        NWy1 + Ysize1 =< NWy2 + Ysize2.
```

```
% Test SW1
overlap_p((NWx1,NWy1,_Xsize1,Ysize1),(NWx2,NWy2,Xsize2,Ysize2)) :-
        NWx2 =< NWx1,
        NWx1 =< NWx2 + Xsize2,
        NWy2 =< NWy1 + Ysize1,
        NWy1 + Ysize1 =< NWy2 + Ysize2.
```

| Mar 11 1993 19:04:25 | equiv_class.pl | Page 1 |

```prolog
/*********************************************************************/
% Partitions the members of InList into EquivClasses based on Relation
% by finding one equivalence class at a time. Real work done by
% partition_aux where the third argument is the list of classes found
% thus far. That argument is seeded with [].

partition(Relation,InList,EquivClasses) :-
        partition_aux(Relation,InList,[],EquivClasses).

partition_aux(_Relation,[],EquivClasses,EquivClasses).

partition_aux(Relation,InList,CurrClasses,EquivClasses) :-
        equiv_class(Relation,InList,OneClass,Remainder),
        partition_aux(Relation,Remainder,[OneClass|CurrClasses],EquivClasses).

/*********************************************************************/
% Finds a single equivalence Class based on Relation within InList and
% computes the Remainder of those elements which are not in the Class.
% Given a list of elements known to be in the class, computes the next generation
% of class members by seeing which of the remaining members has the relation
% Relation with the current members. This next generation is then appended
% to the current generation and the remainder updated. The process is repeated
% until no more candidates qualify. We take the first member of InList as
% the initial class member and use it to seed the process. The rest of
% InList becomes the list of InitCandidates.
equiv_class(Relation,InList,Class,Remainder) :-
        InList = [InitSeed|InitCandidates],
        equiv_class_aux(Relation,[InitSeed],InitCandidates,[InitSeed],Class,Remainder).

/*********************************************************************/
% Does the real work of equiv_class.
% Given a list of Seeds comprising the current class and a list of
% Candidates for the next generation,
%     calls next_gen to obtain NextSeeds and NextCand
%     updates CurrClass by appending NextSeeds and goes on.
% Remainder is what is left in the initial Candidate list
% after deleting all the class members.

equiv_class_aux(_Relation,[],Remainder,Class,Class,Remainder).

equiv_class_aux(Relation,Seeds,Candidates,CurrClass,Class,Remainder) :-
        next_gen(Relation,Seeds,Candidates,[],[],NextSeeds,NextCand),
        append(CurrClass,NextSeeds,NewClass),
        equiv_class_aux(Relation,NextSeeds,NextCand,NewClass,Class,Remainder).

/*********************************************************************/
% Serves as an auxiliary predicate to equiv_class_aux % Given a list of seeds (CurrGen) and a Candidate list of other elements,
% find the Kids of CurrGen from among the candidates and compute the Remainder.
% CurrGen is a list for which Relation holds. That is, every element in
% CurrGen relates to at least one other element in CurrGen.
% Kids will be those elements for which Relation holds between a kid
% and some member of CurrGen.

next_gen(_Relation,_CurrGen,[],Kids,Remainder,Kids,Remainder).

next_gen(Relation,CurrGen,[Hcand|Tcand],CurrKids,CurrRemainder,Kids,Remainder) :-
        next_gen_one_cand(Relation,CurrGen,Hcand),
        next_gen(Relation,CurrGen,Tcand,[Hcand|CurrKids],CurrRemainder,Kids,Remainder).

next_gen(Relation,CurrGen,[Hcand|Tcand],CurrKids,CurrRemainder,Kids,Remainder) :-
        next_gen(Relation,CurrGen,Tcand,CurrKids,[Hcand|CurrRemainder],Kids,Remainder).
```

```
/*********************************************************************/
% An auxiliary procedure to next_gen.
% Recursively tests the seeds which comprise the current generation
% with the Candidate to see whether Relation holds. If it does, then
% the Candidate is a member of the next generation.
% There is no termination clause because we want this to fail if we
% have exhausted the list.

next_gen_one_cand(Relation,[Hseed|_Tseed],Cand) :-
        Procedure1 =.. [Relation,Hseed,Cand],
        Procedure2 =.. [Relation,Cand,Hseed],
        (call(Procedure1) | call(Procedure2)).

next_gen_one_cand(Relation,[_Hseed|Tseed],Cand) :-
        next_gen_one_cand(Relation,Tseed,Cand).
```

```
/********************************************************************/
process_ocr_file(InStream,BlockFeatures) :-
        get_ocr_lines(InStream),
        % vertically_partition_text_block(BlockFeaturesLIST)
        % Determine_block_features
        block_pt_size(BlockPtSize),
        block_face_style(BlockFaceStyle),
        block_line_count(BlockLineCount),
        block_char_count(BlockCharCount),
        alignment(10,Alignment),
        BlockFeatures = [['',BlockPtSize,BlockFaceStyle],Alignment,BlockCharCount,BlockLineCoun
t],
        % Cleanup the database
        abolish(ocr_text_line,7),
        abolish(ocr_font_line,3).

/********************************************************************/
/********************************************************************/
/********************************************************************/
% Using the data for each line, compute the point size which applies to
% the largest number of characters.
block_pt_size(BlockPtSize) :-
        bagof([PtSize,CharCt],
                line_pt_size_char_ct(PtSize,CharCt),
                LinePtSizeCharCtPairs),
        freq_dist(LinePtSizeCharCtPairs,BlockPtSizeCharCtPairs),
        mode(BlockPtSizeCharCtPairs,BlockPtSize).

/********************************************************************/
% Using the data for each line, compute the the face style which applies to
% the largest number of characters.
block_face_style(BlockFaceStyle) :-
        bagof([FaceStyle,CharCt],
                line_face_style_char_ct(FaceStyle,CharCt),
                LineFaceStyleCharCtPairs),
        freq_dist(LineFaceStyleCharCtPairs,BlockFaceStyleCharCtPairs),
        mode(BlockFaceStyleCharCtPairs,BlockFaceStyle).

/********************************************************************/
% Count the number of clauses of ocr_text_line, by counting the number
% of occurrences of its last argument : LineAdvance.
% We could have chosen any argument, of course, but we chose Temple ...
% I mean, by selecting LineAdvance, we have the data in hand in case
% we ever choose to change the method in the note which follows.
% Note : This method ignores spacing, so that if there are 10 double-spaced
%        lines of print, the result will be 10, not 20.
block_line_count(BlockLineCount) :-
        bagof(LineAdvance,
                line_advance(LineAdvance),
                LineAdvances),
        length(LineAdvances,BlockLineCount).

/********************************************************************/
block_char_count(BlockCharCt) :-
        bagof(LineCharCt,
                line_char_ct(LineCharCt),
                CharCts),
        block_char_count_aux(CharCts,0,BlockCharCt).

block_char_count_aux([],BlockCharCt,BlockCharCt).

block_char_count_aux([H|T],CurrSum,FinalSum) :-
        NewSum is CurrSum + H,
        block_char_count_aux(T,NewSum,FinalSum).

/********************************************************************/
freq_dist(AtomQuantPairs,FreqDist) :-
        freq_dist_aux(AtomQuantPairs,[],FreqDist).

% freq_dist_aux(AtomQuantPairs,CurrFreqDist,FinalFreqDist)
% Given a list of [Atom,Quant] pairs
```

| Mar 11 1993 19:04:25 | feature.pl | Page 2 |

```prolog
% determine the frequency distribution of [Atom,Quant] pairs.

freq_dist_aux([],FreqDist,FreqDist).

freq_dist_aux([[Atom,Quant]|RestPairs],CurrFreqDist,FinalFreqDist) :-
        apply_one_pair([Atom,Quant],CurrFreqDist,NewFreqDist),
        freq_dist_aux(RestPairs,NewFreqDist,FinalFreqDist).

/**********************************************************************/
% apply_one_pair(LinePtSizeCharCtPairs,WorkingBlockPtSizeCharCtPairs,FinalBlockPtSizeCharCtPair
s)
% Update the PtSizeCharCtPairs for the Block based upon the PtSizeCharCtPair for this line.

% There is not already a pair for this Atom. Create one.
apply_one_pair([Atom,Quant],[],[[Atom,Quant]]).

% We have reached an existing pair for this Atom.
% Add LineCharCt to CurrFreq.
apply_one_pair([Atom,Quant],[[Atom,CurrFreq]|RestFreqDist],[[Atom,NewFreq]|RestFreqDist]) :-
        NewFreq is CurrFreq + Quant.

% We have not reached an existing pair for this Atom.
% Try the remaining pairs.
apply_one_pair([Atom1,Quant],[[Atom2,CurrFreq]|RestCurrFreqDist],[[Atom2,CurrFreq]|RestFreqDist
]) :-
        apply_one_pair([Atom1,Quant],RestCurrFreqDist,RestFreqDist).

/**********************************************************************/
mode(FreqDist12,Mode) :-
        reverse_each_sublist(FreqDist12,FreqDist21),
        samsort(FreqDist21,SortedFreqDist21),
        reverse(SortedFreqDist21,[[_,Mode]|_]).

/**********************************************************************/
% FontID is 0.
% Since this probably means there weren't enough characters to
% determine a point size, there probably weren't enough characters
% to be significant, either. We assign point size 0 as a default.
line_pt_size_char_ct(0,CharCt) :-
        ocr_text_line(_,_,0,_,CharCt,_,_),
        !.

line_pt_size_char_ct(PtSize,CharCt) :-
        ocr_text_line(_,_,FontID,_,CharCt,_,_),
        ocr_font_line(FontID,_,PtSize).

/**********************************************************************/
% FontID is 0.
% Since this probably means there weren't enough characters to
% determine a face style, there probably weren't enough characters
% to be significant, either. We assign face style r (roman) as a default.
line_face_style_char_ct(r,CharCt) :-
        ocr_text_line(_,_,0,_,CharCt,_,_),
        !.

line_face_style_char_ct(FaceStyle,CharCt) :-
        ocr_text_line(_,_,FontID,_,CharCt,_,_),
        ocr_font_line(FontID,FaceStyle,_).

/**********************************************************************/
line_advance(LineAdvance) :-
        ocr_text_line(_,_,_,_,_,_,LineAdvance).

/**********************************************************************/
line_char_ct(CharCt) :-
        ocr_text_line(_,_,_,_,CharCt,_,_).
```

| Mar 11 1993 19:04:25 | feature.pl | Page 3 |

```prolog
/******************************************************************/
ascii_category(TxtFilePath,Category) :-
        file_exists(TxtFilePath),
        ascii_category_aux(TxtFilePath,Category).

% We reach this clause only if file_exists is false,
% in which case the category is nontext.
ascii_category(_TxtFilePath,'### non text ###').

% If the byte count is zero, then there is no need to
% check anything further; the block is nontext.
ascii_category_aux(TxtFilePath,'### non text ###') :-
        file_property(TxtFilePath,size_in_bytes,ByteCount),
        ByteCount = 0.

% The file has contents, but they are deemed garbage.
ascii_category_aux(TxtFilePath,Category) :-
        file_property(TxtFilePath,size_in_bytes,ByteCount),
        ByteCount > 0,
        % open InFile for reading
        open(TxtFilePath,read,InStream),
        set_input(InStream),
        % Assume first character in file is not -1
        get_text_lines(InStream,TextChars),
        text_category(TextChars,Category),
        close(InStream),
        % Restore fileerrors in case other procedures
        % rely on it.
        fileerrors.

/******************************************************************/
get_text_lines(InStream,AllChars) :-
        fget_line(InStream,Chars,EOLchar),
        get_text_lines_aux(InStream,RestChars,EOLchar),
        append(Chars,RestChars,AllChars).

get_text_lines_aux(_InStream,[],-1).

get_text_lines_aux(InStream,Chars,_EOLchar) :-
        get_text_lines(InStream,Chars).

/******************************************************************/
% text_category(CharList,Category)
text_category(CharList,'### garbage ###') :-
        garbage_text(CharList).

text_category(_CharList,text).

/******************************************************************/
% If at least 5/8 of the characters in CharList are non-alphanumeric, then
% we will consider the characters to be garbage. Alphanumeric characters are
% those whose ASCII codes fall (inclusively)
%      from 65 to 90 for upper case letters
%      from 97 to 122 for lower case letters
%      from 48 to 57 for digits
garbage_text(CharList) :-
        alpha_chars(CharList,AlphaChars),
        !,
        length(CharList,AllCharsCount),
        length(AlphaChars,AlphaCharsCount),
        AlphaCharsCount/AllCharsCount < 3/8.

alpha_chars([],[]).

alpha_chars([Hchar|TcharIn],[Hchar|TcharOut]) :-
        alpha_char(Hchar),
```

| Mar 11 1993 19:04:25 | feature.pl | Page 4 |
|---|---|---|

```
        alpha_chars(TcharIn,TcharOut).

alpha_chars([_Hchar|TcharIn],TcharOut) :-
        alpha_chars(TcharIn,TcharOut).

alpha_char(Char) :-
        65 =< Char,
        Char =< 90.

alpha_char(Char) :-
        97 =< Char,
        Char =< 122.

alpha_char(Char) :-
        48 =< Char,
        Char =< 57.

/********************************************************************/
/********************************************************************/
/********************************************************************/ alignment(MarginThreshold,both) :-
        justified(left,MarginThreshold),
        justified(right,MarginThreshold).

alignment(MarginThreshold,left) :-
        justified(left,MarginThreshold).

alignment(MarginThreshold,right) :-
        justified(right,MarginThreshold).

alignment(_,neither).

/********************************************************************/
justified(Side,MarginThreshold) :-
        bagof(Margin,
                margin(Side,Margin),
                Margins),
        bins7(Margins,MarginThreshold,MarginRuns),
        % Now separate the bins into those with runs (i.e., list length) > 1 and
        % those with run length 1. If the percentage of lines in the longer run
        % category is at least 50% of the number of lines in all, then consider
        % the block to be justified (on the given side).
        justified_aux(MarginRuns,0,MultiLinesRunTotal,0,SingleLineRunTotal),
        !,
        MultiLinesRunTotal >= 0.5*(MultiLinesRunTotal + SingleLineRunTotal).

% justified_aux(MarginRuns,CurrMultiLinesRunTotal,MultiLinesRunTotal,
%                         CurrSingleLineRunTotal,SingleLineRunTotal)

justified_aux([],MultiLinesRunTotal,MultiLinesRunTotal,
                        SingleLineRunTotal,SingleLineRunTotal).

% Hrun is a multi-line run.
justified_aux([Hrun|Trun],CurrMultiLinesRunTotal,MultiLinesRunTotal,
                        CurrSingleLineRunTotal,SingleLineRunTotal) :-
        length(Hrun,RunLength),
        RunLength > 1,
        NewMultiLinesRunTotal is CurrMultiLinesRunTotal + RunLength,
        justified_aux(Trun,NewMultiLinesRunTotal,MultiLinesRunTotal,
                        CurrSingleLineRunTotal,SingleLineRunTotal).

% Hrun is a single-line run.
justified_aux([_Hrun|Trun],CurrMultiLinesRunTotal,MultiLinesRunTotal,
                        CurrSingleLineRunTotal,SingleLineRunTotal) :-
        NewSingleLineRunTotal is CurrSingleLineRunTotal + 1,
```

| Mar 11 1993 19:04:25 | feature.pl | Page 5 |

```prolog
        justified_aux(Trun,CurrMultiLinesRunTotal,MultiLinesRunTotal,
                        NewSingleLineRunTotal,SingleLineRunTotal).

/***********************************************************************/
bins7([Hscore|Tscores],MarginThreshold,Bins) :-
        bins7_aux([Hscore|Tscores],MarginThreshold,[Hscore],Bins).

bins7_aux([_Score],_MarginThreshold,List,[List]).

bins7_aux([Score1,Score2|Tin],MarginThreshold,CurrBin,[Bin|Tout]) :-
        same_bin7(Score1,Score2,MarginThreshold),
        bins7_aux([Score2|Tin],MarginThreshold,[Score2|CurrBin],[Bin|Tout]).

bins7_aux([_Score1,Score2|Tin],MarginThreshold,Bin,[Bin|Tout]) :-
        bins7_aux([Score2|Tin],MarginThreshold,[Score2],Tout).

same_bin7(Score1,Score2,MarginThreshold) :-
        abs(Score1 - Score2) < MarginThreshold.

/***********************************************************************/
margin(left,LeftMargin) :-
        ocr_text_line(LeftMargin,_StyleTag,_FontID,_TextAtom,_CharCt,_RightMargin,_LineAdvances
).

margin(right,RightMargin) :-
        ocr_text_line(_LeftMargin,_StyleTag,_FontID,_TextAtom,_CharCt,RightMargin,_LineAdvances
).

/***********************************************************************/
% multi_line_bins(BinsIn,MultiLineBinsLineCount)

multi_line_bins(Bins,MultiLineBinsLineCount) :-
        multi_line_bins_aux(Bins,0,MultiLineBinsLineCount).

multi_line_bins_aux([],LineCount,LineCount).

multi_line_bins_aux([Hbin|TbinIn],CurrLineCount,LineCount) :-
        length(Hbin,RunLength),
        RunLength > 1,
        NewLineCount is CurrLineCount + RunLength,
        multi_line_bins_aux(TbinIn,NewLineCount,LineCount).

multi_line_bins_aux([_Hbin|TbinIn],CurrLineCount,LineCount) :-
        multi_line_bins_aux(TbinIn,CurrLineCount,LineCount).

/***********************************************************************/ vertically_partition_text_block(FontGroupedTextLines) :-
        bagof(ocr_text_line(LeftMargin,StyleTag,FontID,TextAtom,CharCt,RightMargin,LineAdvances
),
                    ocr_text_line(LeftMargin,StyleTag,FontID,TextAtom,CharCt,RightMargin,LineAdva
nces),
                    TextLines),
        % Partition the text lines by font
        bins10(TextLines,FontGroupedTextLines),
        !,
        % There should only be two partitions, corresponding to a 'head' block and a 'body' blo
ck.
        FontGroupedTextLines = [HeadGroup,BodyGroup],
        % Need to do a preliminary head/body classification on the two partitions
        % to determine whether to make the split.
```

| Mar 11 1993 19:04:25 | feature.pl | Page 6 |

```prolog
        % We do not have page point size at our disposal and wish to avoid
        % the computation of treating each prospective block as an actual block,
        % so we will adopt the simpler heuristic that
        %    in partition 1
        %       number of lines =<3
        %    in partition 2
        %       number of lines > number of lines in partition 1
        %       point size < point size in partition 1 or
        %       face style is one of {italic, bold, bolditalic}
        length(HeadGroup,HeadLines),
        HeadLines =< 3,
        length(BodyGroup,BodyLines),
        BodyLines > HeadLines,
        HeadGroup = [ocr_text_line(_,_,HeadFontID,_,_,_,_)|_],
        ocr_font_line(HeadFontID,HeadFaceStyle,HeadPointSize),
        BodyGroup = [ocr_text_line(_,_,BodyFontID,_,_,_,_)|_],
        ocr_font_line(BodyFontID,_BodyFaceStyle,BodyPointSize),
        ( BodyPointSize < HeadPointSize | member(HeadFaceStyle,[i,b,t]) ).

/*******************************************************************/
bins10([Hscore|Tscores],Bins) :-
        bins10_aux([Hscore|Tscores],[Hscore],Bins).

bins10_aux([_Score],List,[List]).

bins10_aux([Score1,Score2|Tin],CurrBin,[Bin|Tout]) :-
        same_bin10(Score1,Score2),
        bins10_aux([Score2|Tin],[Score2|CurrBin],[Bin|Tout]).

bins10_aux([_Score1,Score2|Tin],Bin,[Bin|Tout]) :-
        bins10_aux([Score2|Tin],[Score2],Tout).

% Two text lines will be in the same bin if they have the same FontID
% Note that the FontID references a two-field record which encompasses
% FaceStyle and PointSize.
same_bin10(Score1,Score2) :-
        Score1 = ocr_text_line(_LeftMargin1,_StyleTag1,FontID,_TextAtom1,_CharCt1,_RightMargin1
,_LineAdvances1),
        Score2 = ocr_text_line(_LeftMargin2,_StyleTag2,FontID,_TextAtom2,_CharCt2,_RightMargin2
,_LineAdvances2).

/*******************************************************************/
/*******************************************************************/
/*******************************************************************/
reverse_each_sublist([],[]).

reverse_each_sublist([Hin|Tin],[Hout|Tout]) :-
        reverse(Hin,Hout),
        reverse_each_sublist(Tin,Tout).

/*******************************************************************/
write_ocr_line([]).

write_ocr_line(Chars) :-
        atom_chars(String,Chars),
        write(String),
        nl.

/*******************************************************************/
quote_char(129,96).
quote_char(130,39).
```

```
Mar 11 1993 19:04:25                      feature.pl                              Page 7
quote_char(131,34).
quote_char(132,34).
```

| Mar 11 1993 19:04:25 | inset_boxes.pl | Page 1 |

```prolog
/

/***********************************************************************/
/***********************************************************************/
/********************  COLUMN BOUNDARY DETERMINATION  ******************/
/***********************************************************************/
/***********************************************************************/

% We partition the blocks into those which are column aligned and those which are not
% and create a geometric structure tree out of each partition.  The first partition
% is the main tree; the second can be considered a tree for a sort of overlay plane.
% We expect the second tree to be quite flat, but we must still construct it to
% ensure that those blocks which are part of the same node become grouped that way.
% We then walk the second tree, peeling off each node (other than root, of course)
% and inserting it into the first tree. The combined tree is then ready for
% transformations involving head/body properties.

/***********************************************************************/
% col_noncol_partition(AllBlocks,ColAlignTolerance,ColumnBounds,ColumnAlignedBlocks,NonColumnAl
ignedBlocks)
col_noncol_partition(Blocks,ColAlignTolerance,Bounds,FirstColStart,LastColEnd,ColumnAlignedBloc
ks,NonColumnAlignedBlocks) :-
       col_noncol_partition_aux(Blocks,ColAlignTolerance,Blocks,Bounds,
                                            FirstColStart,LastColEnd,[],[],Reverse
dColumnAlignedBlocks,ReversedNonColumnAlignedBlocks),
       reverse(ReversedColumnAlignedBlocks,ColumnAlignedBlocks),
       reverse(ReversedNonColumnAlignedBlocks,NonColumnAlignedBlocks).

col_noncol_partition_aux([],_ColAlignTolerance,_AllBlocks,_Bounds,_FirstColStart,_LastColEnd,
                                            ColumnAligned,NonColumnAligned,ColumnAligned,N
onColumnAligned).

col_noncol_partition_aux([Hblock|Tblock],ColAlignTolerance,AllBlocks,Bounds,
                        FirstColStart,LastColEnd,CurrColAligned,CurrNonColAligned,ColumnAligne
d,NonColumnAligned) :-
       host_columns(Hblock,ColAlignTolerance,Bounds,FirstColStart,LastColEnd,LeftHost,LeftComp
lement,RightHost,RightComplement),
       update_block_features_host_cols(Hblock,LeftHost,LeftComplement,RightHost,RightComplemen
t),
       (
       column_aligned_block(Hblock,ColAlignTolerance,AllBlocks,LeftHost,LeftComplement,RightHo
st,RightComplement,NewHblock)
       ->   col_noncol_partition_aux(Tblock,ColAlignTolerance,AllBlocks,Bounds,FirstColStart,La
stColEnd,
                                               [NewHblock|CurrColAligned],Cur
rNonColAligned,ColumnAligned,NonColumnAligned)
       ;    col_noncol_partition_aux(Tblock,ColAlignTolerance,AllBlocks,Bounds,FirstColStart,La
stColEnd,
                                               CurrColAligned,[Hblock|CurrNon
ColAligned],ColumnAligned,NonColumnAligned)
       ).

/***********************************************************************/
% Since the code has a column-orientation, any block wholly outside
% the column bounds must be considered noise. This procedure eliminates
% such blocks.
% Note that if there is only one column, column_bounded_blocks will fail.
% If a second try finds more than one column, all should go well based
% on using asserta for column_bounds and block_features for page.

column_bounded_blocks([],_,_,[]).

column_bounded_blocks([Hblock|TblockIn],FirstColStart,LastColEnd,[Hblock|TblockOut]) :-
       % For a block not to be wholly outside the column bounds
       %    its right edge must be inside the leftmost column bound and
       %    its left edge must be inside the rightmost column bound
       Hblock = [_ID,_HB,X,_Y,Xsize,_Ysize],
       X + Xsize > FirstColStart,
       X < LastColEnd,
```

```
Mar 11 1993 19:04:25                inset_boxes.pl                           Page 2
        column_bounded_blocks(TblockIn,FirstColStart,LastColEnd,TblockOut).

column_bounded_blocks([_Hblock|TblockIn],FirstColStart,LastColEnd,TblockOut) :-
        column_bounded_blocks(TblockIn,FirstColStart,LastColEnd,TblockOut).

/**********************************************************************/
% non_gutter_blocks(Blocks,ColumnBounds,NonGutterBlocks).

non_gutter_blocks([],_ColumnBounds,[]).

% Hblock is a gutter_block. Do not retain it.
non_gutter_blocks([Hblock|TblockIn],ColumnBounds,TblockOut) :-
        gutter_block(Hblock,ColumnBounds),
        non_gutter_blocks(TblockIn,ColumnBounds,TblockOut).

% Hblock is not a gutter_block. Place it in the output list.
non_gutter_blocks([Hblock|TblockIn],ColumnBounds,[Hblock|TblockOut]) :-
        non_gutter_blocks(TblockIn,ColumnBounds,TblockOut).

% A block will be a gutter_block - and therefore considered noise -
% if it falls wholly in a gutter which separates adjacent columns.
% gutter_block(Block,ColumnBounds)

% Block falls entirely in the gutter between last two columns.
gutter_block([_ID,_HB,X,_Y,Xsize,_Ysize],[[ColStart1,ColWidth1],[ColStart2,_ColWidth2]]) :-
        ColStart1 + ColWidth1 < X,
        X + Xsize < ColStart2.

% Block falls entirely in the gutter between current Col1 and Col2
gutter_block([_ID,_HB,X,_Y,Xsize,_Ysize],[[ColStart1,ColWidth1],[ColStart2,_ColWidth2]|_RestCol
Bounds]) :-
        ColStart1 + ColWidth1 < X,
        X + Xsize < ColStart2.

% Block didn't fall in this gutter; try next.
gutter_block([ID,HB,X,Y,Xsize,Ysize],[[_ColStart1,_ColWidth1],[ColStart2,ColWidth2]|RestColBoun
ds]) :-
        gutter_block([ID,HB,X,Y,Xsize,Ysize],[[ColStart2,ColWidth2]|RestColBounds]).

/**********************************************************************/
% bins4(ScoresList,ScoresBins).
% Takes a list of "scores" (more generally, terms) and assigns them to
% bins if they meet the conditions of same_bins.
% Assumes scores are ordered in such a way that all scores which belong
% in the same bin will occupy contiguous positions in the input list.
% In this case the scores will be six element lists of the form
% [X,Xsize,BlockID,HB,Y,Ysize] or [Xsize,X,BlockID,HB,Y,Ysize]

bins4([Hscore|Tscores],Bins) :-
        bins4_aux([Hscore|Tscores],[Hscore],Bins).

bins4_aux([_Score],List,[List]).

bins4_aux([Score1,Score2|Tin],CurrBin,[Bin|Tout]) :-
        same_bin4(Score1,Score2),
        bins4_aux([Score2|Tin],[Score2|CurrBin],[Bin|Tout]).

bins4_aux([_Score1,Score2|Tin],Bin,[Bin|Tout]) :-
        bins4_aux([Score2|Tin],[Score2],Tout).

/**********************************************************************/
same_bin4([X1,_Xsize1,_ID1,_HB1,_Y1,_Ysize1],[X2,_Xsize2,_ID2,_HB2,_Y2,_Ysize2]) :-
        abs(X1 - X2) < 10.

/**********************************************************************/
% Given a set of bins, each of which has a block count and then a list
% of the blocks themselves, select all the bins whose block count matches
% that of the first bin in the list. These are the bins whose Xsize is
```

| Mar 11 1993 19:04:25 | inset_boxes.pl | Page 3 |

```prolog
% the most frequently occuring. Then take the mean of the Xsize for each
% selected bin. Of those, choose the bin with the smallest mean Xsize.
width_determining_bin(DescendingLengthAugmentedBins,ColWidth) :-
        width_determining_bin_aux_1(DescendingLengthAugmentedBins,HighestFreqXsizeBins),
        width_determining_bin_aux_2(HighestFreqXsizeBins,MeanXsizeList),
        min_list(MeanXsizeList,ColWidth).

/*******************************************************************/
% Select those bins from the first argument whose block count matches
% that of the first bin in the list.
% width_determining_bin_aux_1(DescendingLengthAugmentedBins,HighestFreqXsizeBins)
width_determining_bin_aux_1([HbinIn|TbinIn],[Hbin|TbinOut]) :-
        width_determining_bin_aux_1_aux(Hbin,TbinIn,TbinOut).

width_determining_bin_aux_1_aux(_,[],[]).

width_determining_bin_aux_1_aux([BlockCount|Blocks],[[BlockCount|BlocksIn]|RestBinsIn],[[BlockC
ount|BlocksIn]|RestBinsOut]) :-
        width_determining_bin_aux_1_aux([BlockCount|Blocks],RestBinsIn,RestBinsOut).

width_determining_bin_aux_1_aux([BlockCount|Blocks],[_HbinIn|TbinIn],BinsOut) :-
        width_determining_bin_aux_1_aux([BlockCount|Blocks],TbinIn,BinsOut).
/*******************************************************************/
% width_determining_bin_aux_2(HighestFreqXsizeBins,MeanXsizeList)
% Determine the mean Xsize for each Bin.
width_determining_bin_aux_2([],[]).

width_determining_bin_aux_2([[_BlockCount|BlockList]|RestBins],[MeanXsize|RestMeans]) :-
        mean_first_element(BlockList,MeanXsize),
        width_determining_bin_aux_2(RestBins,RestMeans).

/*******************************************************************/
prepend_length([],[]).

prepend_length([HlistIn|TlistIn],[[Len|HlistIn]|TlistOut]) :-
        length(HlistIn,Len),
        prepend_length(TlistIn,TlistOut).

/*******************************************************************/
mean_first_element(Lists,Mean) :-
        mean_first_element_aux(Lists,0,0,Sum,Count),
        TempMean is Sum/Count,
        round(TempMean,Mean).

mean_first_element_aux([],Sum,Count,Sum,Count).

mean_first_element_aux([[El1,_,_,_,_,_]|Rest],CurrSum,CurrCount,Sum,Count) :-
        NewSum is CurrSum + El1,
        NewCount is CurrCount + 1,
        mean_first_element_aux(Rest,NewSum,NewCount,Sum,Count).

/*******************************************************************/
/*******************************************************************/
/*********************** ALIGNMENT *********************************/
/*******************************************************************/
/*******************************************************************/

/*******************************************************************/
% column_aligned_block(Block,ColAlignTolerance,AllColumnBoundaries,AllBlocks)

% A column-aligned block has meets one of the following set of criteria
%
% Aligns left
% Aligns right
%
% Aligns left
```

```
Mar 11 1993 19:04:25                inset_boxes.pl                              Page 4

% Column complement is whitespace (it does not overlap any other block)
%
% Aligns left
% Any block which the column complement overlaps is not wholly contained
% by the same column.
%
% Aligns right
% Column complement is whitespace (it does not overlap any other block)
%
% Aligns right
% Any block which the column complement overlaps is not wholly contained
% by the same column.
%
% Doesn't align left or right, but column complement is whitespace
% (it does not overlap any other block) on both sides.
% This circumstance fits mainly centered titles near the top of the page.
% However, for now we are not imposing any positional constraints.
%
% Any block which does not qualify as a column-aligned block is
% considered to be an inset block. By the above definitions an inset
% block has at most one column-aligned boundary and either intersects
% at least one block or has a column complement wholly contained by
% the same column.
%
% We use the auxiliary procedure, host_columns, to find the complements
% of the left and right edges of the block with respect to their
% host columns. If a block meets the alignment criterion, then all
% fields of its complement will be set to zero.

% If a Block aligns on one side and has a column complement which
% is whitespace, then we will "stretch" the block over the
% whitespace, creating NewBlock, to make the tree building process better defined.
% If it aligns on neither side, but both column complements are
% whitespace, then we will "stretch" the block on both sides.

% column_aligned_block(Block,ColAlignTolerance,AllBlocks,LeftHost,LeftComplement,RightHost,Righ
tComplement,NewBlock)

% If a block has either a LeftComplement or a RightComplement of [_,_,-1,-1,-1,-1], then
% this is a signal that the block is NOT column_aligned because it extends beyond the set
% of all column boundaries or fell entirely between two columns.

column_aligned_block(Block,_ColAlignTolerance,_AllBlocks,_LeftHost,[_,_,-1,-1,-1,-1],_RightHost
,_RightComplement,Block) :-
        !,
        fail.
column_aligned_block(Block,_ColAlignTolerance,_AllBlocks,_LeftHost,_LeftComplement,_RightHost,[
_,_,-1,-1,-1,-1],Block) :-
        !,
        fail.

% <<< 3 >>>
% Aligns left
% Aligns right
column_aligned_block(Block,_ColAlignTolerance,AllBlocks,LeftHost,LeftComplement,RightHost,Right
Complement,NewBlock) :-
        LeftComplement = [_,_,0,0,0,0],
        RightComplement = [_,_,0,0,0,0],
        leftmost_extension_col(Block,LeftHost,AllBlocks,LeftMostExtensionCol),
        %(write(Block),write(' lec '),write(LeftHost),write(' '),write(LeftMostExtensionCol),nl
),
        rightmost_extension_col(Block,RightHost,AllBlocks,RightMostExtensionCol),
        %(write(Block),write(' rec '),write(RightHost),write(' '),write(RightMostExtensionCol),
nl,nl),
        Block = [ID,HB,X,Y,Xsize,Ysize],
        LeftMostExtensionCol = [Xnew,_],
        RightMostExtensionCol = [RMstart,RMwidth],
        XsizeNew is RMstart + RMwidth - Xnew,
        block_features(ID,HB,X,Y,Xsize,Ysize,Features),
        Features = [Typog,Align,CharCt,LineCt,LeftHost,LeftComplement,RightHost,RightComplement
```

```
                update_block_class(ID,HB,Ysize,Typog,LineCt,LeftHost,RightHost,AllBlocks,Class),
                NewBlock = [ID,Class,Xnew,Y,XsizeNew,Ysize],
                retract(block(ID,_,_,_,_,_)),
                assertz(block(ID,Class,Xnew,Y,XsizeNew,Ysize)),
                retract(block_features(ID,_,_,_,_,_,_)),
                assertz(block_features(ID,Class,Xnew,Y,XsizeNew,Ysize,[Typog,Align,CharCt,LineCt,
                        LeftMostExtensionCol,[_,_,0,0,0,0],RightMostExtensionCol,[_,_,0,0,0,
0]])).

% <<< 4 >>>
% Aligns left
% Column complement is whitespace (it does not overlap any other block)
column_aligned_block(Block,_ColAlignTolerance,AllBlocks,LeftHost,LeftComplement,RightHost,Right
Complement,NewBlock) :-
        LeftComplement = [_,_,0,0,0,0],
        \+ intersect_any(RightComplement,AllBlocks),
        Block = [ID,HB,X,Y,Xsize,Ysize],
        leftmost_extension_col(Block,LeftHost,AllBlocks,LeftMostExtensionCol),
        %(write(Block),write(' lec '),write(LeftHost),write(' '),write(LeftMostExtensionCol),nl
),
        rightmost_extension_col(Block,RightHost,AllBlocks,RightMostExtensionCol),
        %(write(Block),write(' rec '),write(RightHost),write(' '),write(RightMostExtensionCol),
nl,nl),
        LeftMostExtensionCol = [Xnew,_],
        RightMostExtensionCol = [RMstart,RMwidth],
        XsizeNew is RMstart + RMwidth - Xnew,
        block_features(ID,HB,X,Y,Xsize,Ysize,Features),
        Features = [Typog,Align,CharCt,LineCt,LeftHost,LeftComplement,RightHost,RightComplement
],
        update_block_class(ID,HB,Ysize,Typog,LineCt,LeftHost,RightHost,AllBlocks,Class),
        NewBlock = [ID,Class,Xnew,Y,XsizeNew,Ysize],
        retract(block(ID,_,_,_,_,_)),
        assertz(block(ID,Class,Xnew,Y,XsizeNew,Ysize)),
        retract(block_features(ID,_,_,_,_,_,_)),
        assertz(block_features(ID,Class,Xnew,Y,XsizeNew,Ysize,[Typog,Align,CharCt,LineCt,
                LeftMostExtensionCol,[_,_,0,0,0,0],RightMostExtensionCol,[_,_,0,
0,0,0]])).

% <<< 5 >>>
% Aligns left
% Any block which the column complement overlaps is not wholly contained
% by the same column.
column_aligned_block(Block,ColAlignTolerance,AllBlocks,LeftHost,LeftComplement,RightHost,RightC
omplement,NewBlock) :-
        LeftComplement = [_,_,0,0,0,0],
        leftmost_extension_col(Block,LeftHost,AllBlocks,LeftMostExtensionCol),
        %(write(Block),write(' lec '),write(LeftHost),write(' '),write(LeftMostExtensionCol),nl
,nl),
        \+ (member(OtherBlock,AllBlocks),
            OtherBlock \== Block,
                intersects(OtherBlock,RightComplement),
                contained_in_column(OtherBlock,RightHost,ColAlignTolerance)),
        Block = [ID,HB,X,Y,Xsize,Ysize],
        LeftMostExtensionCol = [Xnew,_],
        XsizeNew is X + Xsize - Xnew,
        block_features(ID,HB,X,Y,Xsize,Ysize,Features),
        Features = [Typog,Align,CharCt,LineCt,LeftHost,LeftComplement,RightHost,RightComplement
],
        update_block_class(ID,HB,Ysize,Typog,LineCt,LeftHost,RightHost,AllBlocks,Class),
        NewBlock = [ID,Class,Xnew,Y,XsizeNew,Ysize],
        retract(block(ID,_,_,_,_,_)),
        assertz(block(ID,Class,Xnew,Y,XsizeNew,Ysize)),
        retract(block_features(ID,_,_,_,_,_,_)),
        assertz(block_features(ID,Class,Xnew,Y,XsizeNew,Ysize,[Typog,Align,CharCt,LineCt,
                LeftMostExtensionCol,LeftComplement,RightHost,RightComplement])).
```

Mar 11 1993 19:04:25     inset_boxes.pl     Page 6

```
% <<< 6 >>>
% Aligns right
% Column complement is whitespace (it does not overlap any other block)
column_aligned_block(Block,_ColAlignTolerance,AllBlocks,LeftHost,LeftComplement,RightHost,Right
Complement,NewBlock) :-
        RightComplement = [_,_,0,0,0,0],
        \+ intersect_any(LeftComplement,AllBlocks),
        Block = [ID,HB,X,Y,Xsize,Ysize],
        leftmost_extension_col(Block,LeftHost,AllBlocks,LeftMostExtensionCol),
        %(write(Block),write(' lec '),write(LeftHost),write(' '),write(LeftMostExtensionCol),nl
),
        rightmost_extension_col(Block,RightHost,AllBlocks,RightMostExtensionCol),
        %(write(Block),write(' rec '),write(RightHost),write(' '),write(RightMostExtensionCol),
nl,nl), LeftMostExtensionCol = [Xnew,_],
        RightMostExtensionCol = [RMstart,RMwidth],
        XsizeNew is RMstart + RMwidth - Xnew,
        block_features(ID,HB,X,Y,Xsize,Ysize,Features),
        Features = [Typog,Align,CharCt,LineCt,LeftHost,LeftComplement,RightHost,RightComplement
_,
        update_block_class(ID,HB,Ysize,Typog,LineCt,LeftHost,RightHost,AllBlocks,Class),
        NewBlock = [ID,Class,Xnew,Y,XsizeNew,Ysize],
        retract(block(ID,_,_,_,_,_)),
        assertz(block(ID,Class,Xnew,Y,XsizeNew,Ysize)),
        retract(block_features(ID,_,_,_,_,_,_)),
        assertz(block_features(ID,Class,Xnew,Y,XsizeNew,Ysize,[Typog,Align,CharCt,LineCt,
                        LeftMostExtensionCol,[_,_,0,0,0,0],RightMostExtensionCol,[_,_,0,
0,0,0]])).

% <<< 7 >>>
% Aligns right
% Any block which the column complement overlaps is not wholly contained
% by the same column.
column_aligned_block(Block,ColAlignTolerance,AllBlocks,LeftHost,LeftComplement,RightHost,RightC
omplement,NewBlock) :-
        RightComplement = [_,_,0,0,0,0],
        rightmost_extension_col(Block,RightHost,AllBlocks,RightMostExtensionCol),
        %(write(Block),write(' rec '),write(RightHost),write(' '),write(RightMostExtensionCol),
nl,nl),
        \+ (member(OtherBlock,AllBlocks),
            OtherBlock \== Block,
                intersects(OtherBlock,LeftComplement),
                contained_in_column(OtherBlock,LeftHost,ColAlignTolerance)),
        Block = [ID,HB,X,Y,Xsize,Ysize],
        RightMostExtensionCol = [RMstart,RMwidth],
        XsizeNew is RMstart + RMwidth - X,
        block_features(ID,HB,X,Y,Xsize,Ysize,Features),
        Features = [Typog,Align,CharCt,LineCt,LeftHost,LeftComplement,RightHost,RightComplement
],
        update_block_class(ID,HB,Ysize,Typog,LineCt,LeftHost,RightHost,AllBlocks,Class),
        NewBlock = [ID,Class,X,Y,XsizeNew,Ysize],
        retract(block(ID,_,_,_,_,_)),
        assertz(block(ID,Class,X,Y,XsizeNew,Ysize)),
        retract(block_features(ID,_,_,_,_,_,_)),
        assertz(block_features(ID,Class,X,Y,XsizeNew,Ysize,[Typog,Align,CharCt,LineCt,
                        LeftHost,LeftComplement,RightMostExtensionCol,[_,_,0,0,0,0]])).

% <<< 8 >>>
% Doesn't align left or right, but column complement is whitespace
% (it does not overlap any other block) on both sides.
% This circumstance fits mainly centered titles near the top of the page.
% However, for now we are not imposing any positional constraints.
column_aligned_block(Block,_ColAlignTolerance,AllBlocks,LeftHost,LeftComplement,RightHost,Right
Complement,NewBlock) :-
        \+ intersect_any(LeftComplement,AllBlocks),
        \+ intersect_any(RightComplement,AllBlocks),
        Block = [ID,HB,X,Y,Xsize,Ysize],
        leftmost_extension_col(Block,LeftHost,AllBlocks,LeftMostExtensionCol),
```

| Mar 11 1993 19:04:25 | inset_boxes.pl | Page 7 |

```
        %(write(Block),write(' lec '),write(LeftHost),write(' '),write(LeftMostExtensionCol),nl
),
        rightmost_extension_col(Block,RightHost,AllBlocks,RightMostExtensionCol),
        %(write(Block),write(' rec '),write(RightHost),write(' '),write(RightMostExtensionCol),
nl,nl),
        LeftMostExtensionCol = [Xnew,_],
        RightMostExtensionCol = [RMstart,RMwidth],
        XsizeNew is RMstart + RMwidth - Xnew,
        block_features(ID,HB,X,Y,Xsize,Ysize,Features),
        Features = [Typog,Align,CharCt,LineCt,LeftHost,LeftComplement,RightHost,RightComplement
],
        update_block_class(ID,HB,Ysize,Typog,LineCt,LeftHost,RightHost,AllBlocks,Class),
        NewBlock = [ID,Class,Xnew,Y,XsizeNew,Ysize],
        retract(block(ID,_,_,_,_,_)),
        assertz(block(ID,Class,Xnew,Y,XsizeNew,Ysize)),
        retract(block_features(ID,_,_,_,_,_,_)),
        assertz(block_features(ID,Class,Xnew,Y,XsizeNew,Ysize,[Typog,Align,CharCt,LineCt,
                        LeftMostExtensionCol,[_,_,0,0,0,0],RightMostExtensionCol,[_,_,0,0,0,
0]])).

/***************************************************************************/
% host_columns(Block,ColumnAlignTolerance,ColumnBoundaries,FirstColStart,LastColEnd,
% LeftHost,LeftComplement,RightHost,RightComplement)
% Given a block, find the column or columns which are its left edge host and its
% right edge host. A column will be a left edge host if the left edge of the block
% falls within or on the column boundaries. Similarly for a right edge host and the
% right edge of the block. Once we have found the left edge host, we need only
% check the current and succeeding columns to be a right edge host.

% If an edge meets the criterion for alignment, then designate its
% complement at that edge to be a block of all 0's.
% If an edge protrudes beyond an extremum of all the column boundaries,
% then designate its complement at that edge to be a block of all -1's
% Otherwise, compute the complement block.

% Block protrudes beyond the left edge of the first column.
% We will consider the first column to be its left host,
% but will set the LeftComplement to be all -1's.
host_columns(Block,Tolerance,[ThisColBounds|RestColBounds],FirstColStart,LastColEnd,ThisColBoun
ds,LeftComplement,
                RightHost,RightComplement) :-
        Block = [_ID,_HB,X,_Y,_Xsize,_Ysize],
        X < FirstColStart - Tolerance,
        LeftComplement = [_,_,-1,-1,-1,-1],
        host_columns_aux(Block,Tolerance,[ThisColBounds|RestColBounds],LastColEnd,RightHost,Rig
htComplement).

% Block is left-aligned with respect to current column.
host_columns(Block,Tolerance,[ThisColBounds|RestColBounds],_FirstColStart,LastColEnd,ThisColBou
nds,LeftComplement,
                RightHost,RightComplement) :-
        Block = [_ID,_HB,X,_Y,_Xsize,_Ysize],
        ThisColBounds = [Start,_Width],
        abs(X - Start) =< Tolerance,
        LeftComplement = [_,_,0,0,0,0],
        host_columns_aux(Block,Tolerance,[ThisColBounds|RestColBounds],LastColEnd,RightHost,Rig
htComplement).

% Block is merely left hosted by current column.
host_columns(Block,Tolerance,[ThisColBounds|RestColBounds],_FirstColStart,LastColEnd,LeftHost,L
eftComplement,
                RightHost,RightComplement) :-
        Block = [_ID,_HB,X,Y,_Xsize,Ysize],
```

```
                ThisColBounds = [Start,Width],
                % Establish "hostness"
                Start =< X,
                X =< Start + Width,
                LeftHost = ThisColBounds,
                % Determine complement
                LeftGap is X - Start,
                LeftComplement = [_,_,Start,Y,LeftGap,Ysize],
                host_columns_aux(Block,Tolerance,[ThisColBounds|RestColBounds],LastColEnd,RightHost,Rig
htComplement).

% Block is not left hosted by current column. Try next column.
host_columns(Block,Tolerance,[_ThisColBounds|RestColBounds],FirstColStart,LastColEnd,LeftHost,L
eftComplement,
             RightHost,RightComplement) :-
        host_columns(Block,Tolerance,RestColBounds,FirstColStart,LastColEnd,LeftHost,LeftComple
ment,
                     RightHost,RightComplement).

% Given the left host column, search this and succeeding columns to find right host column.
% host_columns_aux(Block,Tolerance,RelevantColBounds,FirstColStart,LastColEnd,RightHost,RightCo
mplement)

% We are at the last column and Block protrudes beyond the right edge of the column.
% We will consider this last column to be its right host,
% but will set the RightComplement to be all -1's.
host_columns_aux(Block,Tolerance,[LastColBounds],LastColEnd,LastColBounds,RightComplement) :-
        Block = [_ID,_HB,X,_Y,Xsize,_Ysize],
        X + Xsize > LastColEnd + Tolerance,
        RightComplement = [_,_,-1,-1,-1,-1].

% Block is right-aligned with respect to current column.
host_columns_aux(Block,Tolerance,[ThisColBounds|_RestColBounds],_LastColEnd,ThisColBounds,Right
Complement) :-
        Block = [_ID,_HB,X,_Y,Xsize,_Ysize],
        ThisColBounds = [Start,Width],
        abs((Start + Width) - (X + Xsize)) =< Tolerance,
        RightComplement = [_,_,0,0,0,0].

% Block is merely right hosted by current column
host_columns_aux(Block,_Tolerance,[ThisColBounds|_RestColBounds],_LastColEnd,RightHost,RightCom
plement) :-
        Block = [_ID,_HB,X,Y,Xsize,Ysize],
        ThisColBounds = [Start,Width],
        % Establish "hostness"
        Start =< X + Xsize,
        X + Xsize =< Start + Width,
        RightHost = ThisColBounds,
        % Determine complement
        ComplementStart is X + Xsize,
        RightGap is (Start + Width) - (X + Xsize),
        RightComplement = [_,_,ComplementStart,Y,RightGap,Ysize].

% Block is not right hosted by current column. Try next column.
host_columns_aux(Block,Tolerance,[_ThisColBounds|RestColBounds],LastColEnd,RightHost,RightCompl
ement) :-
        host_columns_aux(Block,Tolerance,RestColBounds,LastColEnd,RightHost,RightComplement).

% We have been unable to find a right host because the block falls entirely between columns.
% Set the RightHost to [] and the RightComplement to [_,_,-1,-1,-1,-1].
host_columns_aux(_Block,_Tolerance,[],_LastColEnd,[],[_,_,-1,-1,-1,-1]).
```

```
/*********************************************************************/
% We want this to fail if we have exhausted the list.
% Hence, there is no termination clause.

% Avoid the reflexive case.
% In our application although both blocks carry the same ID they may not
% have the same location parameters.

% We have found a block, Hblock, with which Block intersects.
intersect_any([ID1,HB1,X1,Y1,Xsize1,Ysize1],[[ID2,HB2,X2,Y2,Xsize2,Ysize2]|_Rest]) :-
        intersects([ID1,HB1,X1,Y1,Xsize1,Ysize1],[ID2,HB2,X2,Y2,Xsize2,Ysize2]).

% Block doesn't intersect Hblock. Try the Rest.
intersect_any(Block,[_Hblock|Rest]) :-
        intersect_any(Block,Rest).

/*********************************************************************/
% intersects(BlockA,BlockB)
% Two rectangular blocks intersect if
%    A vertex of one lies in or one the other (or vice-versa)
%    -- or --
%    The X boundaries of one lie within the X boundaries of the other
%    and the Y boundaries of the other lie within the Y boundaries of the
%    first (or vice-versa).
intersects([_ID1,_HB1,X1,Y1,Xsize1,Ysize1],[_ID2,_HB2,X2,Y2,Xsize2,Ysize2]) :-
        penetrates_p((X1,Y1,Xsize1,Ysize1),(X2,Y2,Xsize2,Ysize2)).

intersects([_ID1,_HB1,X1,Y1,Xsize1,Ysize1],[_ID2,_HB2,X2,Y2,Xsize2,Ysize2]) :-
        penetrates_p((X2,Y2,Xsize2,Ysize2),(X1,Y1,Xsize1,Ysize1)).

intersects([_ID1,_HB1,X1,Y1,Xsize1,Ysize1],[_ID2,_HB2,X2,Y2,Xsize2,Ysize2]) :-
        X2 =< X1,
        X1 + Xsize1 =< X2 + Xsize2,
        Y1 =< Y2,
        Y2 + Ysize2 =< Y1 + Ysize1.

intersects([_ID1,_HB1,X1,Y1,Xsize1,Ysize1],[_ID2,_HB2,X2,Y2,Xsize2,Ysize2]) :-
        X1 =< X2,
        X2 + Xsize2 =< X1 + Xsize1,
        Y2 =< Y1,
        Y1 + Ysize1 =< Y2 + Ysize2.

/*********************************************************************/
% Two rectangles will penetrate if a vertex of one lies (strictly) within
% the bounds of the other or vice-versa.
% This should be called twice with the arguments in opposite order
% and linked by a disjunct as in ( penetrates_p(A,B) | penetrates_p(B,A) ).

% Test NW1
penetrates_p((NWx1,NWy1,_Xsize1,_Ysize1),(NWx2,NWy2,Xsize2,Ysize2)) :-
        NWx2 < NWx1,
        NWx1 < NWx2 + Xsize2,
        NWy2 < NWy1,
        NWy1 < NWy2 + Ysize2.

% Test NE1
penetrates_p((NWx1,NWy1,Xsize1,_Ysize1),(NWx2,NWy2,Xsize2,Ysize2)) :-
        NWx2 < NWx1 + Xsize1,
        NWx1 + Xsize1 < NWx2 + Xsize2,
        NWy2 < NWy1,
        NWy1 < NWy2 + Ysize2.

% Test SE1
penetrates_p((NWx1,NWy1,Xsize1,Ysize1),(NWx2,NWy2,Xsize2,Ysize2)) :-
        NWx2 < NWx1 + Xsize1,
        NWx1 + Xsize1 < NWx2 + Xsize2,
        NWy2 < NWy1 + Ysize1,
        NWy1 + Ysize1 < NWy2 + Ysize2.

% Test SW1
```

```
Mar 11 1993 19:04:25                inset_boxes.pl                           Page 10 penetrates_p((NWx1,NWy1,_Xsize1,Ysize1),(NWx2,NWy2,Xsize2,Ysize2)) :-
        NWx2 < NWx1,
        NWx1 < NWx2 + Xsize2,
        NWy2 < NWy1 + Ysize1,
        NWy1 + Ysize1 < NWy2 + Ysize2.
/**********************************************************************/
% contained_in_column(Block,Column,ColAlignTolerance)
contained_in_column([_ID,_HB,X,_Y,Xsize,_Ysize],[Start,Width],ColAlignTolerance) :-
        Start - ColAlignTolerance  =< X,
        X + Xsize =< Start + Width + ColAlignTolerance.

/**********************************************************************/
% If the block is one for which we have meaningful features, add data
% to store the left host column,left complement, right host column, and
% right complement. Otherwise, leave the clause of block_features alone.

update_block_features_host_cols(Block,LeftHost,LeftComplement,RightHost,RightComplement) :-
        Block = [ID,HB,X,Y,Xsize,Ysize],
        retract(block_features(ID,HB,X,Y,Xsize,Ysize,[TypographicFeatures,Alignment,CharCount,L
ineCount,_,_,_,_])),
        assertz(block_features(ID,HB,X,Y,Xsize,Ysize,[TypographicFeatures,Alignment,CharCount,L
ineCount,
                        LeftHost,LeftComplement,RightHost,RightComplement])).

update_block_features_host_cols(Block,LeftHost,LeftComplement,RightHost,RightComplement) :-
        Block = [ID,HB,X,Y,Xsize,Ysize],
        retract(block_features(ID,HB,X,Y,Xsize,Ysize,['### non text ###',_,_,_,_,_,_,_])),
        assert(block_features(ID,HB,X,Y,Xsize,Ysize,['### non text ###',_,_,_,LeftHost,LeftComp
lement,RightHost,RightComplement])).

update_block_features_host_cols(Block,LeftHost,LeftComplement,RightHost,RightComplement) :-
        Block = [ID,HB,X,Y,Xsize,Ysize],
        retract(block_features(ID,HB,X,Y,Xsize,Ysize,['### rule line ###',_,_,_,_,_,_,_])),
        assert(block_features(ID,HB,X,Y,Xsize,Ysize,['### rule line ###',_,_,_,LeftHost,LeftCom
plement,RightHost,RightComplement])).

update_block_features_host_cols(Block,LeftHost,LeftComplement,RightHost,RightComplement) :-
        Block = [ID,HB,X,Y,Xsize,Ysize],
        retract(block_features(ID,HB,X,Y,Xsize,Ysize,['### garbage ###',_,_,_,_,_,_,_])),
        assert(block_features(ID,HB,X,Y,Xsize,Ysize,['### garbage ###',_,_,_,LeftHost,LeftCompl
ement,RightHost,RightComplement])).

/**********************************************************************/
/**********************************************************************/
/****************   INSERTION OF TREE FROM OVERLAY PLANE  **************/
/**********************************************************************/
/**********************************************************************/
% insert_nodes(ColAlignedTree,NonColAlignedTree,CombinedTree)
insert_nodes(tree(Node,AlignedDesc),tree(NonAlignedNode,NonAlignedDesc),tree(Node,MixedDesc)) :
-
        insert_node(tree(Node,AlignedDesc),NonAlignedNode,tree(Node,TempDesc)),
        insert_nodes_desc(tree(Node,TempDesc),NonAlignedDesc,tree(Node,MixedDesc)).

insert_nodes_desc(tree(Node,Desc),[],tree(Node,Desc)).

insert_nodes_desc(tree(Node,Desc),[HnonAlignedDesc|TnonAlignedDesc],tree(Node,MixedDesc)) :-
        insert_nodes(tree(Node,Desc),HnonAlignedDesc,tree(Node,TempDesc)),
        insert_nodes_desc(tree(Node,TempDesc),TnonAlignedDesc,tree(Node,MixedDesc)).

/**********************************************************************/

% Ignore the root node of the tree from which insertion candidates come.
insert_node(tree(Node,Descendants),[[page,_,_,_,_,_]],tree(Node,Descendants)).

% Walk the tree to determine the Parent block of the Candidate to be inserted
% by calling potential_parents. Then walk the tree again to perform
```

```
Mar 11 1993 19:04:25          inset_boxes.pl                          Page 11

% the actual insertion when we get to the node which includes Parent
insert_node(tree(Node,Descendants),CandidateNode,tree(Node,NewDesc)) :-
        highest(CandidateNode,HighestCandidateBlock),
        potential_parents(HighestCandidateBlock,tree(Node,Descendants),[],PotentialParents),
        best_parent(CandidateNode,PotentialParents,ParentNode),
        insert_node_aux_1(CandidateNode,ParentNode,tree(Node,Descendants),tree(Node,NewDesc)).

insert_node_aux_1(CandidateNode,ParentNode,tree(ParentNode,Descendants),tree(ParentNode,NewDesc
)) :-
        append(Descendants,[tree(CandidateNode,[])],NewDesc).

insert_node_aux_1(CandidateNode,ParentNode,tree(Node,Descendants),tree(Node,NewDesc)) :-
        insert_node_aux_2(CandidateNode,ParentNode,Descendants,NewDesc).

insert_node_aux_2(_CandidateNode,_ParentNode,[],[]).

insert_node_aux_2(CandidateNode,ParentNode,[Hin|Tin],[Hout|Tout]) :-
        insert_node_aux_1(CandidateNode,ParentNode,Hin,Hout),
        insert_node_aux_2(CandidateNode,ParentNode,Tin,Tout).

/****************************************************************/
% The Candidate is a valid descendant of Node so include Node on
% CurrParents, the current list of potential parents and
% continue to walk the tree by calling potential_parents_aux on Descendants.
potential_parents(Candidate,tree(Node,Descendants),CurrParents,Parents) :-
        descendant(Candidate,Node),
        potential_parents_aux(Candidate,Descendants,[Node|CurrParents],Parents).

% The Candidate was not a valid descendant of Node. Stop the walk.
potential_parents(_Candidate,tree(_Node,_Descendants),Parents,Parents).

% We have reached the end of this descendant list.
potential_parents_aux(_Candidate,[],Parents,Parents).

% Recur through a descendant list by calling potential_parents on
% each descendant in turn. Each such call could update the
% list of current potential parents into FurtherParents.
potential_parents_aux(Candidate,[Hdesc|Tdesc],CurrParents,Parents) :-
        potential_parents(Candidate,Hdesc,CurrParents,FurtherParents),
        potential_parents_aux(Candidate,Tdesc,FurtherParents,Parents).

/****************************************************************/
% descendant(Descendant,Ancestor)
% Ancestor is a list of blocks. Find the block in Ancestor which
% is the lowest on the page. Descendant is a valid descendant
% of Ancestor if it is a valid descendant of LowestAncestor, meaning
% * Its highest point is no higher than the lowest
%   point of LowestAncestor.
% * The horizontal range of Descendant does not
%   extend beyond the horizontal range of LowestAncestor.

descendant(Descendant,Ancestor) :-
        lowest(Ancestor,LowestAncestor),
        !,
        descendant_aux(Descendant,LowestAncestor).

/****************************************************************/
descendant_aux([_IDd,_HBd,Xd,Yd,Xsize_d,_Ysize_d],[_IDa,_HBa,Xa,Ya,Xsize_a,Ysize_a]) :-
        % Vertical Criterion
        Yd >= Ya + Ysize_a,
        % Horizontal Criteria
        Xa =< Xd,
        Xd + Xsize_d =< Xa + Xsize_a.

/****************************************************************/
% best_parent(ChildNode,AcceptableParentNodes,BestParentNode)
% The best parent will be the one which is closest to the ChildNode.
```

```
% in each AcceptableParentNode find the Y value for the bottom of the
% lowest block in the node. Then find the vertical distance from there
% to the Y value for the top of the highest block in the ChildNode.
% The ParentNode with the shortest vertical distance is the best parent.

best_parent(ChildNode,AcceptableParentNodes,BestParentNode) :-
        % Determine Y value of top of highest block in ChildNode.
        highest_block(ChildNode,[_,_,_,Ychild,_,_]),
        % Determine Y values for bottom of lowest block in each member of
        % AcceptableParentNodes.
        best_parent_aux(AcceptableParentNodes,YparentList),
        % Determine the separations
        child_parent_separations(Ychild,YparentList,Separations),
        % Determine least separation
        samsort(Separations,[LeastSeparation|_RestSeparations]),
        % Associate least separation with BestParentNode
        nth1(Index,Separations,LeastSeparation),
        nth1(Index,AcceptableParentNodes,BestParentNode).

best_parent_aux([],[]).

best_parent_aux([Hnode|Tnodes],[HY|TY]) :-
        lowest_block(Hnode,[_,_,_,Y,_,Ysize]),
        HY is Y + Ysize,
        best_parent_aux(Tnodes,TY).

child_parent_separations(_,[],[]).

child_parent_separations(Ychild,[HYparent|TYparent],[Hsep|Tsep]) :-
        Hsep is Ychild - HYparent,
        child_parent_separations(Ychild,TYparent,Tsep).

/********************************************************************/
/********************************************************************/
/******************      UTILITIES       ****************************/
/********************************************************************/
/********************************************************************/
% highest(BlockList,Highest)
highest([Hblock|Tblock],Highest) :-
        highest_aux(Tblock,Hblock,Highest).

%highest_aux(BlockList,CurrHighest,Highest)
highest_aux([],Highest,Highest).

highest_aux([Hblock|Tblock],CurrHighest,Highest) :-
        Hblock = [_ID1,_HB1,_X1,Y1,_Xsize1,_Ysize1],
        CurrHighest = [_ID2,_HB2,_X2,Y2,_Xsize2,_Ysize2],
        Y1 < Y2,
        highest_aux(Tblock,Hblock,Highest).

highest_aux([_Hblock|Tblock],CurrHighest,Highest) :-
        highest_aux(Tblock,CurrHighest,Highest).

/********************************************************************/
% lowest(BlockList,Lowest)
lowest([Hblock|Tblock],Lowest) :-
        lowest_aux(Tblock,Hblock,Lowest).

%lowest_aux(BlockList,CurrLowest,Lowest)
lowest_aux([],Lowest,Lowest).

lowest_aux([Hblock|Tblock],CurrLowest,Lowest) :-
        Hblock = [_ID1,_HB1,_X1,Y1,_Xsize1,Ysize1],
        CurrLowest = [_ID2,_HB2,_X2,Y2,_Xsize2,Ysize2],
        Y1 + Ysize1 > Y2 + Ysize2,
```

| Mar 11 1993 19:04:25 | inset_boxes.pl | Page 13 |

```prolog
        lowest_aux(Tblock,Hblock,Lowest).

lowest_aux([_Hblock|Tblock],CurrLowest,Lowest) :-
        lowest_aux(Tblock,CurrLowest,Lowest).

/*********************************************************************/
min_list([H|T],Min) :-
        min_list_aux(H,T,Min).

min_list_aux(Min,[],Min).

min_list_aux(CurrMin,[H|T],Min) :-
        H < CurrMin,
        min_list_aux(H,T,Min).

min_list_aux(CurrMin,[_H|T],Min) :-
        min_list_aux(CurrMin,T,Min).

/*********************************************************************/
% If a block has no neighbors in adjacent columns intersecting its vertical range,
% then we will extend the block across the span of columns which are empty in
% that swath. This is useful for extending left-justified page titles across
% the full width of the page and for extending centered page titles in both
% directions.
%
% However, we want to avoid the conflicts which would arise when the
% extension to the right from one block overlaps the extension to the right
% from another block. So we could allow each block to be extended in each
% direction until it reaches an occupied column, but we would have to
% process the blocks from left to right, immediately update the block
% database and rebag all the blocks. Given the orientation of English,
% we would probably want to extend to the left only if we could extend
% to the right.
%
% Instead, we will implement the following slightly less general, but
% greatly less computationally expesnsive rule:
%     Extend a block to the right until it reaches an occupied column,
%     but extend it to the left only if it can be extended all the way
%     to the left margin.

/*********************************************************************/
% Only column_aligned_blocks should be eligible for extension.
leftmost_extension_col(Block,LeftHostCol,AllBlocks,LeftMostExtensionCol) :-
        column_bounds(AllColumnBounds),
        % Determine the leftmost column which can be used to
        % extend Block because there is only whitespace from
        % Block to the left edge of column.
        leftmost_extension_col_aux(Block,LeftHostCol,AllBlocks,AllColumnBounds,LeftMostExtensio
nCol),
        AllColumnBounds = [LeftMostExtensionCol|_].

leftmost_extension_col(_Block,LeftHostCol,_AllBlocks,LeftHostCol).

% If the AppendageBlock whose
%    left boundary is the left edge of HCol
%    right boundary is the left edge of LeftHostCol
% does not intersect any other block,
% then
%    redefine LeftHostCol as NewLeftHostCol
% leftmost_extension_col_aux(Block,LeftHostCol,AllBlocks,AllColumnBounds,NewLeftHostCol).

leftmost_extension_col_aux(Block,LeftHostCol,AllBlocks,[HCol|_TCol],HCol) :-
        % Ensure HCol is to the left of LeftHostCol
        LeftHostCol = [LeftHostColStart,_],
        HCol = [HColStart,_],
        HColStart < LeftHostColStart,
        % Define AppendageBlock
        Block = [_ID,_HB,_X,Y,_Xsize,Ysize],
        AppXsize is LeftHostColStart - HColStart,
        AppendageBlock = [_,_,HColStart,Y,AppXsize,Ysize],
```

```
                \+ intersect_any(AppendageBlock,AllBlocks).

% Otherwise, try the next column.
leftmost_extension_col_aux(Block,LeftHostCol,AllBlocks,[HCol|TCol],NewLeftHostCol) :-
        % Ensure HCol is to the left of LeftHostCol
        LeftHostCol = [LeftHostColStart,_],
        HCol = [HColStart,_],
        HColStart < LeftHostColStart,
        leftmost_extension_col_aux(Block,LeftHostCol,AllBlocks,TCol,NewLeftHostCol).

% If we have tried all the columns to the left of Block,
% then we must be satisifed with what we have as
% the LeftHostColumn.
leftmost_extension_col_aux(_Block,LeftHostCol,_AllBlocks,_AllColumnBounds,LeftHostCol).

/**********************************************************************/
% Only column_aligned_blocks should be eligible for extension.
rightmost_extension_col(Block,RightHostCol,AllBlocks,RightMostExtensionCol) :-
        column_bounds(ColumnBounds),
        reverse(ColumnBounds,ReversedColumnBounds),
        % Determine the rightmost column which can be used to
        % extend Block because there is only whitespace from
        % Block to the right edge of column.
        rightmost_extension_col_aux(Block,RightHostCol,AllBlocks,ReversedColumnBounds,RightMost
ExtensionCol).

% If the AppendageBlock whose
%    left boundary is the right edge of RightHostCol
%    right boundary is the right edge of HCol
% does not intersect any other block,
% then
%    redefine RightHostCol as NewRightHostCol
% rightmost_extension_col_aux(Block,RightHostCol,AllBlocks,AllColumnBounds,NewRightHostCol).

rightmost_extension_col_aux(Block,RightHostCol,AllBlocks,[HCol|_TCol],HCol) :-
        % Ensure HCol is to the right of RightHostCol
        RightHostCol = [RightHostColStart,RightHostColWidth],
        HCol = [HColStart,HColWidth],
        RightHostColStart < HColStart,
        % Define AppendageBlock
        AppX is RightHostColStart + RightHostColWidth,
        Block = [_ID,_HB,_X,Y,_Xsize,Ysize],
        AppXsize is (HColStart + HColWidth) - AppX,
        AppendageBlock = [_,_,AppX,Y,AppXsize,Ysize],
        \+ intersect_any(AppendageBlock,AllBlocks).

% Otherwise, try the next column.
rightmost_extension_col_aux(Block,RightHostCol,AllBlocks,[HCol|TCol],NewRightHostCol) :-
        % Ensure HCol is to the right of RightHostCol
        RightHostCol = [RightHostColStart,_],
        HCol = [HColStart,_],
        RightHostColStart < HColStart,
        rightmost_extension_col_aux(Block,RightHostCol,AllBlocks,TCol,NewRightHostCol).

% If we have tried all the columns to the right of Block,
% then we must be satisifed with what we have as
% the RightHostColumn.
rightmost_extension_col_aux(_Block,RightHostCol,_AllBlocks,_AllColumnBounds,RightHostCol).

/**********************************************************************/
% Until we can read large size type, this means that banners
% and large headlines will not qualify as head blocks because
% they will be considered non text.

update_block_class(_,head,_,_,_,_,_,_,head).

% If a block is found to span the full range of columns and
% has the line count characteristics of a head block, then
% update its block class to 'head'.
update_block_class(_ID,body,Ysize,Typog,LineCount,LeftHost,RightHost,_AllBlocks,head) :-
        Typog = [_,PointSize,_],
```

```
                    % Spans full range of columns
                    column_bounds([LeftHost|Rest]),
                    reverse(Rest,[RightHost|_]),
                    % Has line count characteristics
                    LineCount =< 3,
                    expected_line_count(Ysize,PointSize,ExpectedLineCount),
                    abs(ExpectedLineCount - LineCount) =< 2.

% If a block is found to span the full range of columns and
% is the uppermost block on the page, then
% update its block class to 'head'.
update_block_class(ID,body,_Ysize,_Typog,_LineCount,LeftHost,RightHost,AllBlocks,head) :-
            % Spans full range of columns
            column_bounds([LeftHost|Rest]),
            reverse(Rest,[RightHost|_]),
            % Is uppermost block on the page.
            highest(AllBlocks,[ID,_,_,_,_,_]).

update_block_class(_,body,_,_,_,_,_,_,body).
```

| Mar 11 1993 19:04:25 | resegment.pl | Page 1 |

```
/********************************************************************/
reclassify_non_column_aligned(NonColumnAlignedBlocks,DataBlocks,ColAlignedBlocks,NewlyAlignedBl
ocks,StillUnAlignedBlocks) :-
        reclassify_non_column_aligned_aux(NonColumnAlignedBlocks,DataBlocks,ColAlignedBlocks,[]
,NewlyAlignedBlocks,[],StillUnAlignedBlocks).

reclassify_non_column_aligned_aux([],_DataBlocks,_ColAlignedBlocks,
                                                    NewlyAlignedBlocks,NewlyAlignedBl
ocks,StillUnAlignedBlocks,StillUnAlignedBlocks).

reclassify_non_column_aligned_aux([HnonAligned|TnonAligned],DataBlocks,ColAlignedBlocks,
                        CurrNewAligned,NewlyAlignedBlocks,CurrUnAligned,StillUnAlignedBlo
cks) :-
        treat_as_aligned(HnonAligned,DataBlocks,ColAlignedBlocks,HnewAligned),
        reclassify_non_column_aligned_aux(TnonAligned,DataBlocks,ColAlignedBlocks,
                                                [HnewAligned|CurrNewAligned],
NewlyAlignedBlocks,CurrUnAligned,StillUnAlignedBlocks).

reclassify_non_column_aligned_aux([HnonAligned|TnonAligned],DataBlocks,ColAlignedBlocks,
                        CurrNewAligned,NewlyAlignedBlocks,CurrUnAligned,StillUnAligne
dBlocks) :-
        reclassify_non_column_aligned_aux(TnonAligned,DataBlocks,ColAlignedBlocks,
                                                CurrNewAligned,NewlyAlignedBl
ocks,[HnonAligned|CurrUnAligned],StillUnAlignedBlocks).

/********************************************************************/
% The segmentation process may result in a block which has both text and non-text
% and which is deemed non-column-aligned because the non-text spills over a column boundary.
% Rather than have all further processing be based on this segmentation flaw,
% we will constrain the block to be column aligned if certain conditions are met.
% The non-text portion will essentially be lost, but we would not be able to
% use it as is anyway.

treat_as_aligned([ID,HB,X,Y,Xsize,Ysize],DataBlocks,ColAlignedBlocks,[ID,HB,X,Y,XsizeNew,Ysize]
) :-
        block_features(ID,HB,X,Y,Xsize,Ysize,[Typog,Align,CharCt,LineCount,LeftHost,LeftComplem
ent,RightHost,RightComplement]),
        % Block contains at least two lines of text to eliminate capturing a
        % photo + caption which should remain non-column-aligned.
        atomic(LineCount),
        LineCount > 2,
        % Block spills over a column boundary.
        LeftHost \== RightHost,
        % Block is column-aligned on the left
        LeftComplement = [_,_,0,0,0,0],
        % Find all the blocks that Block intersects
        intersecting_blocks([ID,HB,X,Y,Xsize,Ysize],DataBlocks,IntersectingBlocks),
        members_all(IntersectingBlocks,ColAlignedBlocks),
        LeftHost = [Start,Width],
        XsizeNew is Start + Width - X,
        % Update the block database.
        retract(block(ID,_,_,_,_,_)),
        assertz(block(ID,HB,X,Y,XsizeNew,Ysize)),
        retract(block_features(ID,_,_,_,_,_,_,_)),
        assertz(block_features(ID,HB,X,Y,XsizeNew,Ysize,[Typog,Align,CharCt,LineCount,LeftHost,
LeftComplement,RightHost,RightComplement])).

treat_as_aligned([ID,HB,X,Y,Xsize,Ysize],DataBlocks,ColAlignedBlocks,[ID,HB,Xnew,Y,XsizeNew,Ysi
ze]) :-
        block_features(ID,HB,X,Y,Xsize,Ysize,[Typog,Align,CharCt,LineCount,LeftHost,LeftComplem
ent,RightHost,RightComplement]),
        % Block contains at least two lines of text to eliminate capturing a
        % photo + caption which should remain non-column-aligned.
        atomic(LineCount),
        LineCount > 2,
        % Block spills over a column boundary.
        LeftHost \== RightHost,
        % Block is column-aligned on the right
        RightComplement = [_,_,0,0,0,0],
        % Find all the blocks that Block intersects
        intersecting_blocks([ID,HB,X,Y,Xsize,Ysize],DataBlocks,IntersectingBlocks),
```

| Mar 11 1993 19:04:25 | resegment.pl | Page 2 |

```
        members_all(IntersectingBlocks,ColAlignedBlocks),
        RightHost = [Start,_Width],
        Xnew = Start,
        XsizeNew is X + Xsize - Start,
        % Update the block database.
        retract(block(ID,_,_,_,_,_)),
        assertz(block(ID,HB,Xnew,Y,XsizeNew,Ysize)),
        retract(block_features(ID,_,_,_,_,_,_)),
        assertz(block_features(ID,HB,Xnew,Y,XsizeNew,Ysize,[Typog,Align,CharCt,LineCount,LeftHo
st,LeftComplement,RightHost,RightComplement])).

/****************************************************************/
% merge_non_column_aligned(Blocks,ColumnBounds,MergedBlocks).
% First select only those blocks whose righthost=lefthost and map them
% to a list where each block is augmented by its host column
% Do a "binsort"
% Then within each bin compute the bounding box.
% If the bounding box does not intersect any other block, fuse the bin.

merge_non_column_aligned(Blocks,ColumnBounds,AllBlocks,NewBlocks,RemainingBlocks) :-
        % Select those blocks which reside within a single column
        % and group them by column.
        unitary_host_column(Blocks,ColumnBounds,AugmentedSingleColumnBlocks),
        samsort(AugmentedSingleColumnBlocks,SortedAugmentedSingleColumnBlocks),
        bins5(SortedAugmentedSingleColumnBlocks,Bins),
        strip_col_index_all_bins(Bins,BareBins),
        % Further partition each bin into sub-bins in which the blocks have some
        % vertical overlap.
        vert_overlap_groups_all_bins(BareBins,VertOverlapBins),
        % At this point the bins (VertOverlapBins) contain blocks
        % which are contained in the same column and have some vertical overlap.
        % Merging is well-defined only if a bin contains more than one block.
        bins_of_at_least_two(VertOverlapBins,LargeEnoughBins),
        % Ensure we have at least one bin which merits merging.
        LargeEnoughBins \= [],
        % We will form the bounding box for each such bin.
        bounding_boxes_all_bins(LargeEnoughBins,BinBoundingBoxPairs),
        % For each bin whose bounding box does not overlap any other block
        % consider the bounding box to be the merger of the blocks in the bin.
        non_intersecting_bounding_box_all_bins(BinBoundingBoxPairs,AllBlocks,MergedBins),
        merge_non_column_aligned_aux(Blocks,MergedBins,NewBlocks,RemainingBlocks).

% No mergers took place.
merge_non_column_aligned(Blocks,_ColumnBounds,_AllBlocks,[],Blocks).

/****************************************************************/
unitary_host_column([],_,[]).

unitary_host_column([H|Tin],ColumnBounds,[[N,H]|Tout]) :-
        H = [ID,HB,X,Y,Xsize,Ysize],
        block_features(ID,HB,X,Y,Xsize,Ysize,[_,_,_,_,HostCol,_,HostCol,_]),
        nth1(N,ColumnBounds,HostCol),
        unitary_host_column(Tin,ColumnBounds,Tout).

unitary_host_column([_Hin|Tin],ColumnBounds,Tout) :-
        unitary_host_column(Tin,ColumnBounds,Tout).

/****************************************************************/
bins5([Hscore|Tscores],Bins) :-
        bins5_aux([Hscore|Tscores],[Hscore],Bins).

bins5_aux([_Score],List,[List]).

bins5_aux([Score1,Score2|Tin],CurrBin,[Bin|Tout]) :-
        same_bin5(Score1,Score2),
        bins5_aux([Score2|Tin],[Score2|CurrBin],[Bin|Tout]).

bins5_aux([_Score1,Score2|Tin],Bin,[Bin|Tout]) :-
        bins5_aux([Score2|Tin],[Score2],Tout).
```

```
/****************************************************************/
same_bin5([N,_Block1],[N,_Block2]).

/****************************************************************/
strip_col_index_all_bins([],[]).

strip_col_index_all_bins([HbinIn|TbinIn],[HbinOut|TbinOut]) :-
        strip_col_index_one_bin(HbinIn,HbinOut),
        strip_col_index_all_bins(TbinIn,TbinOut).

strip_col_index_one_bin([],[]).

strip_col_index_one_bin([[_N,Hblock]|RestIn],[Hblock|RestOut]) :-
        strip_col_index_one_bin(RestIn,RestOut).

/****************************************************************/
vert_overlap_groups_all_bins(InBins,OutBins) :-
        vert_overlap_groups_all_bins_aux(InBins,NestedBins),
        peel_one_layer(NestedBins,OutBins).

/****************************************************************/
vert_overlap_groups_all_bins_aux([],[]).

vert_overlap_groups_all_bins_aux([HbinIn|TbinIn],[HbinOut|TbinOut]) :-
        vert_overlap_groups_one_bin(HbinIn,HbinOut),
        vert_overlap_groups_all_bins_aux(TbinIn,TbinOut).

vert_overlap_groups_one_bin(Bin,VertPartitionedBin) :-
        bins6(Bin,VertPartitionedBin).

/****************************************************************/
bins6([Hscore|Tscores],Bins) :-
        bins6_aux([Hscore|Tscores],[Hscore],Bins).

bins6_aux([_Score],List,[List]).

bins6_aux([Score1,Score2|Tin],CurrBin,[Bin|Tout]) :-
        same_bin6(Score1,Score2),
        bins6_aux([Score2|Tin],[Score2|CurrBin],[Bin|Tout]).

bins6_aux([_Score1,Score2|Tin],Bin,[Bin|Tout]) :-
        bins6_aux([Score2|Tin],[Score2],Tout).

/****************************************************************/
% Two blocks will be in the same bin if they overlap vertically.

same_bin6([_ID1,_HB1,_X1,Y1,_Xsize1,_Ysize1],[_ID2,_HB2,_X2,Y2,_Xsize2,Ysize2]) :-
        Y2 =< Y1,
        Y1 =< Y2 + Ysize2.

same_bin6([_ID1,_HB1,_X1,Y1,_Xsize1,Ysize1],[_ID2,_HB2,_X2,Y2,_Xsize2,Ysize2]) :-
        Y2 =< Y1 + Ysize1,
        Y1 + Ysize1 =< Y2 + Ysize2.

same_bin6([_ID1,_HB1,_X1,Y1,_Xsize1,Ysize1],[_ID2,_HB2,_X2,Y2,_Xsize2,_Ysize2]) :-
        Y1 =< Y2,
        Y2 =< Y1 + Ysize1.

same_bin6([_ID1,_HB1,_X1,Y1,_Xsize1,Ysize1],[_ID2,_HB2,_X2,Y2,_Xsize2,Ysize2]) :-
        Y1 =< Y2 + Ysize2,
        Y2 + Ysize2 =< Y1 + Ysize1.

/****************************************************************/
bins_of_at_least_two([],[]).

bins_of_at_least_two([Hbin|TbinIn],[Hbin|TbinOut]) :-
        length(Hbin,BlockCount),
        BlockCount >= 2,
```

```
        bins_of_at_least_two(TbinIn,TbinOut).

bins_of_at_least_two([_Hbin|TbinIn],TbinOut) :-
        bins_of_at_least_two(TbinIn,TbinOut).

/*********************************************************************/
% Given a list of lists, remove one layer to merge the inner lists.
% peel_one_layer([[[a,b],[c,d,e]],[[f,g],[h,i]]],[[a,b],[c,d,e],[f,g],[h,i]])

peel_one_layer([],[]).

peel_one_layer([Hlist|Tlist],OutList) :-
        peel_one_layer(Tlist,TempOutList),
        append(Hlist,TempOutList,OutList).

/*********************************************************************/
bounding_boxes_all_bins([],[]).

bounding_boxes_all_bins([HbinIn|TbinIn],[[HbinIn,Hbox]|Tbox]) :-
        bounding_box_one_bin(HbinIn,Hbox),
        bounding_boxes_all_bins(TbinIn,Tbox).

bounding_box_one_bin([Hblock|Tblock],BoundingBox) :-
        % Seed the process by making the first block the initial bounding box
        bounding_box_one_bin_aux(Tblock,Hblock,BoundingBox).

bounding_box_one_bin_aux([],BoundingBox,BoundingBox).

bounding_box_one_bin_aux([Hblock|Tblock],CurrBox,BoundingBox) :-
        % Create NewBox by using the extrema of Hblock where
        % they exceed the extrema of CurrBox, using the existing
        % extrema of CurrBox where they still stand.
        Hblock = [_,_,XH,YH,XsizeH,YsizeH],
        CurrBox = [_,_,XC,YC,XsizeC,YsizeC], (XH < XC
          -> XN is XH
          ;  XN is XC),
        (XH + XsizeH > XC + XsizeC
          -> XsizeN is XH + XsizeH - XN
          ;  XsizeN is XC + XsizeC - XN), (YH < YC
          -> YN is YH
          ;  YN is YC),
        (YH + YsizeH > YC + YsizeC
          -> YsizeN is YH + YsizeH - YN
          ;  YsizeN is YC + YsizeC - YN), NewBox = [_,_,XN,YN,XsizeN,YsizeN],
        bounding_box_one_bin_aux(Tblock,NewBox,BoundingBox).

/*********************************************************************/
non_intersecting_bounding_box_all_bins(Bins,AllBlocks,MergedBins) :-
        non_intersecting_bounding_box_all_bins_aux(Bins,AllBlocks,[],MergedBins).

non_intersecting_bounding_box_all_bins_aux([],_,FinalMerge,FinalMerge).

non_intersecting_bounding_box_all_bins_aux([HbinIn|TbinIn],AllBlocks,CurrMerge,FinalMerge) :-
        non_intersecting_bounding_box_one_bin(HbinIn,AllBlocks),
        non_intersecting_bounding_box_all_bins_aux(TbinIn,AllBlocks,[HbinIn|CurrMerge],FinalMerge).

non_intersecting_bounding_box_all_bins_aux([_HbinIn|TbinIn],AllBlocks,CurrMerge,FinalMerge) :-
        non_intersecting_bounding_box_all_bins_aux(TbinIn,AllBlocks,CurrMerge,FinalMerge).
```

| Mar 11 1993 19:04:25 | resegment.pl | Page 5 |

```prolog
non_intersecting_bounding_box_one_bin([Bin,Box],AllBlocks) :-
        delete_list(Bin,AllBlocks,OtherBlocks),
        \+ intersect_any(Box,OtherBlocks).

/****************************************************************************/
% merge_non_column_aligned_aux(Blocks,MergedBins,NewBlocks,RemainingBlocks) :-
% Take each merged bin which is of the form [ListofBlocks,BoundingBox]
%    delete the entries in ListOfBlocks from the block database
%    create a new entry for the merged block in the block database
% Delete all the blocks in MergedBins from Blocks to determine RemainingBlocks.

% Take the RemainingBins and remove the bin delimiters to obtain RemainingBlocks.
% The latter are our best effort at determining true non-column-aligned blocks.
merge_non_column_aligned_aux(Blocks,MergedBins,NewBlocks,RemainingBlocks)   :-
        new_merged_blocks(MergedBins,NewBlocks,ConsumedBlocks),
        delete_list(ConsumedBlocks,Blocks,RemainingBlocks).

/****************************************************************************/
new_merged_blocks(MergedBins,NewBlocks,ConsumedBlocks) :-
        new_merged_blocks_aux(MergedBins,NewBlocks,[],ConsumedBlocks).

new_merged_blocks_aux([],[],ConsumedBlocks,ConsumedBlocks).

new_merged_blocks_aux([Hbin|Tbin],[Hblock|Tblock],CurrConsumedBlocks,ConsumedBlocks)  :-
        one_new_merged_block(Hbin,Hblock),
        Hbin = [ConsumedBlocksThisBin,_BoundingBox],
        append(CurrConsumedBlocks,ConsumedBlocksThisBin,NewConsumedBlocks),
        new_merged_blocks_aux(Tbin,Tblock,NewConsumedBlocks,ConsumedBlocks).

one_new_merged_block([ListOfBlocks,BoundingBox],NewBlock)  :-
        % trace,
        retract_blocks(ListOfBlocks), % Merge the clauses of block_features
        % Take the key block features from the first of the blocks
        % being merged.
        ListOfBlocks = [[ID1,HB1,_,_,_,_]|_],
        block_features(ID1,HB1,_,_,_,_,[_,_,_,_,HostCol,_,HostCol,_]), retract_block_features(ListOfBlocks), retract(block_counter(BlockCounter)),
        NewBlockCounter is BlockCounter + 1,
        assert(block_counter(NewBlockCounter)),
        concat(blk,BlockCounter,BlockID), BoundingBox = [_,_,X,Y,Xsize,Ysize],
        NewBlock = [BlockID,HB1,X,Y,Xsize,Ysize],
        assertz(block(BlockID,HB1,X,Y,Xsize,Ysize)),
        assertz(block_features(BlockID,HB1,X,Y,Xsize,Ysize,[_,_,_,_,HostCol,_,HostCol,_])), assertz(merged(ListOfBlocks,[BlockID,HB1,X,Y,Xsize,Ysize])).

/****************************************************************************/
retract_blocks([]).

retract_blocks([[ID,HB,X,Y,Xsize,Ysize]|Rest]) :-
        retract(block(ID,HB,X,Y,Xsize,Ysize)),
        nl,write(retracted),write(' '),write(ID),nl,
        retract_blocks(Rest).
/****************************************************************************/
retract_block_features([]).

retract_block_features([[ID,HB,X,Y,Xsize,Ysize]|Rest]) :-
        retract(block_features(ID,HB,X,Y,Xsize,Ysize,_Features)),
```

```
                nl,write(retracted),write(' '),write(ID),write(' features'),nl,
                retract_block_features(Rest).

/************************************************************************/
intersecting_blocks(Block,IntersectionCandidates,IntersectingBlocks) :-
        intersecting_blocks_aux(Block,IntersectionCandidates,[],IntersectingBlocks).

intersecting_blocks_aux(_Block,[],IntersectingBlocks,IntersectingBlocks).

intersecting_blocks_aux(Block,[Hblock|Tblock],CurrIntersectingBlocks,IntersectingBlocks) :-
        Block \== Hblock,
        intersects(Block,Hblock),
        intersecting_blocks_aux(Block,Tblock,[Hblock|CurrIntersectingBlocks],IntersectingBlocks
).

intersecting_blocks_aux(Block,[_Hblock|Tblock],CurrIntersectingBlocks,IntersectingBlocks) :-
        intersecting_blocks_aux(Block,Tblock,CurrIntersectingBlocks,IntersectingBlocks).

/************************************************************************/
members_all([],_).

members_all([H|T],List2) :-
        member(H,List2),
        members_all(T,List2).
```

| Mar 11 1993 19:04:25 | xform_geom_tree.pl | Page 1 |

```prolog
/********************************************************************/
/********************************************************************/
/*********************     RULES     ********************************/
/********************************************************************/
/********************************************************************/

/********************************************************************/
/*************************** RULE S *********************************/
/********************************************************************/
% Reorder the children of a node so that child nodes which are groups
% delimited by separator lines become the "youngest" children of the node.
% This allows inset boxes of text or photos to be isolated so that the text
% which flows around them can be connected. This could be described as a
% "textist" philosophy because it allows text portions to dominate (be the
% elder children) non-text portions such as photos.
% This rule is to be applied before Rules A, B, C and D.
/********************************************************************/
rule_s_super(tree(Node,Descendants),tree(Node,NewDesc)) :-
        rule_s_desc(Descendants,NewDesc).

/********************************************************************/
rule_s_node(tree(Node,Descendants),tree(Node,FurtherDesc)) :-
        reorder_desc(Descendants,NewDesc),
        rule_s_desc(NewDesc,FurtherDesc).

rule_s_desc([],[]).

rule_s_desc([tree(Node,Desc)|RestIn],[tree(Node,NewDesc)|RestOut]) :-
        rule_s_node(tree(Node,Desc),tree(Node,NewDesc)),
        rule_s_desc(RestIn,RestOut).

/********************************************************************/
% Reorder the descendants of a node so that the ordinary block
% groups come first, followed by the special block groups.
% Special block groups are detected by having a classification of
% "head" and a Ysize = 1.
% reorder_desc(Descendants,ReorderedDesc)

reorder_desc(Descendants,ReorderedDescendants) :-
        reorder_desc_aux(Descendants,Ordinary,Special),
        append(Ordinary,Special,ReorderedDescendants).

reorder_desc_aux([],[],[]).

reorder_desc_aux([Hdesc|Tdesc],Ordinary,[Hdesc|Tspec]) :-
        Hdesc = tree([[_BlockID,head,_X,_Y,_Xsize,1]|_!,_],_),
        reorder_desc_aux(Tdesc,Ordinary,Tspec).

reorder_desc_aux([Hdesc|Tdesc],[Hdesc|Tord],Special) :-
        reorder_desc_aux(Tdesc,Tord,Special).
/********************************************************************/
/*********************** RULE A / RULE B ****************************/
/********************************************************************/

/********************************************************************/
% rule_a_b(rule_{a,b},tree(Node,Desc),tree(Node,NewDesc))
% Given a series of adjacent terminal nodes (not necessarily siblings)
% take them a pair at a time.
%
% Rule A
% If the first element of the second node in the pair is a body,
% then remove it from the second node and append it to the first node.
% Continue until a head is encountered or the list is exhausted.
```

```
Mar 11 1993 19:04:25         xform_geom_tree.pl                          Page 2

% If the list is exhausted, remove the branch leading to it from the tree.
% When processing has been completed for a given pair, apply it to
% the pair comprised of the second node from the previous pair and the
% next (non-null) node.
%
% Rule B
% If the last element of the first node in the pair is a head,
% then remove the first element from the second node in the pair
% and append it to the first node. Continue as long as the elements
% being appended are heads and then take one more node - or until
% the list is exhausted.
% If the list is exhausted, remove the branch leading to it from the tree.
% When processing has been completed for a given pair, apply it to
% the pair comprised of the second node from the previous pair and the
% next (non-null) node.

rule_a_b(RuleID,tree(Node,Desc),tree(Node,NewDesc)) :-
        disassemble_tree(tree(Node,Desc)),
        rule_a_b_aux(RuleID,Node),
        assemble_tree(tree(Node,NewDesc)),
        abolish(offspring,2).

% The adjacent nodes are terminal.
%
% To avoid having the headlines of the next "article"
% falsely appended to the end of the current "article"
% when the end of the current "article" is a non-column-aligned
% block (a situation not dealt with by Tsujimoto and Asada),
% ensure that Node ends in a column aligned block.
%
% If RuleID = rule_b then check
% that Node ends in 'head'
% before checking that NextNode is terminal.

rule_a_b_aux(RuleID,Node) :-
        next_node(Node,NextNode),
        \+ offspring(Node,_), reverse(Node,[(LastBlockID,HB)|_]), column_aligned_blocks(ColumnAlignedBlocks),
        member([LastBlockID,HB,_,_,_,_],ColumnAlignedBlocks), (RuleID = rule_b
            -> HB = head
            ;  true), \+ offspring(NextNode,_),
        transferees(RuleID,NextNode,Transferees),
        append(Node,Transferees,NewNode),
        append(Transferees,NewNextNode,NextNode),
        offspring(ParentOfNode,Node),
        offspring(ParentOfNextNode,NextNode), % Since each of the nodes being replaced is a
        % terminal node, we need replace only the
        % clauses of offspring in which they are the
        % second argument.
        re_assert_in_place([[offspring(ParentOfNode,Node),offspring(ParentOfNode,NewNode)],
                            [offspring(ParentOfNextNode,NextNode),offspring(ParentOfNextNode,Ne
wNextNode)]]),
        % Remove clauses of offspring whose second argument is [].
        mybagof(offspring(Parent,[]),offspring(Parent,[]),Barren),
        retract_list(Barren),
        (
        Transferees = NextNode
                ->    rule_a_b_aux(RuleID,NewNode)
        ;     rule_a_b_aux(RuleID,NewNextNode)
        ).

% At least one of the adjacent nodes is non-terminal.
% Just keep going.
rule_a_b_aux(RuleID,Node) :-
```

| Mar 11 1993 19:04:25 | xform_geom_tree.pl | Page 3 |

```prolog
        next_node(Node,NextNode),
        rule_a_b_aux(RuleID,NextNode).

% No more nodes.
rule_a_b_aux(_,_).

/************************************************************************/
/************************************************************************/
/************************************************************************/
% Given a node, the next node in the tree will be its eldest child.
% If there are no children, then the next node will be its next sibling.
% If there is no next sibling, then the next node will
% be the next node of its parent.

% Node has children.
next_node(Node,NextNode) :-
        offspring(Node,NextNode).

% Node has a younger sibling.
next_node(Node,NextNode) :-
        % Find Node's parent
        offspring(Parent,Node),
        % Find all of Parent's children.
        bagof(Child,offspring(Parent,Child),Children),
        % Find next child which is NextNode.
        nth1(N,Children,Node),
        NewN is N+1,
        nth1(NewN,Children,NextNode).

% Node has no younger sibling.
% Find the next node of the parent,
% as long as it is not Node itself or
% a younger sibling.
next_node(Node,NextNode) :-
        offspring(Parent,Node),
        next_node(Parent,NextNode),
        \+ offspring(Parent,NextNode).

/************************************************************************/
% Take elements from InList as long as they are "body" blocks.
% Quit as soon as the sequence is broken.
% transferees(rule_a,InList,OutList)

transferees(rule_a,[],[]).

transferees(rule_a,[(BlockID,body)|RestIn],[(BlockID,body)|RestOut]) :-
        !,
        transferees(rule_a,RestIn,RestOut).

transferees(rule_a,_InList,[]) :-
        !.

% Take elements from InList as long as they are "head" blocks.
% When a "body" block is encountered take it, but then stop.
% transferees(rule_b,InList,OutList)

% The entire list was usable.
transferees(rule_b,[],[]).

% The current element is a "head"; use it.
transferees(rule_b,[(BlockID,head)|RestIn],[(BlockID,head)|RestOut]) :-
        transferees(rule_b,RestIn,RestOut).

% We have encountered a "body"; take it and stop.
transferees(rule_b,[H|_],[H]).

/************************************************************************/
% Given a list of [OldClause,NewClause] pairs, replace each instance
% of OldClause with NewClause so that the order of clauses in the
% database is preserved. This assumes that OldClause and NewClause
% have the same functor.
```

| Mar 11 1993 19:04:25 | xform_geom_tree.pl | Page 4 |

```prolog
re_assert_in_place([]).

re_assert_in_place([[OldClause,NewClause]|RestPairs]) :-
        re_assert_in_place_one_pair(OldClause,NewClause),
        re_assert_in_place(RestPairs).

re_assert_in_place_one_pair(OldClause,NewClause) :-
        OldClause =.. [Functor|Args],
        length(Args,L),
        length(NewArgs,L),
        ClauseTemplate =.. [Functor|NewArgs],
        bagof(ClauseTemplate,
                ClauseTemplate,
                ClauseInstances),
        abolish(Functor,L),
        replace_one_clause(ClauseInstances,OldClause,NewClause).

/*******************************************************************/
replace_one_clause([],_,_).

replace_one_clause([H|T],H,Hprime) :-
        assertz(Hprime),
        replace_one_clause(T,H,Hprime).

replace_one_clause([H|T],C,Cprime) :-
        assertz(H),
        replace_one_clause(T,C,Cprime).

/*******************************************************************/
retract_list([]).

retract_list([H|T]) :-
        retract(H),
        retract_list(T).

/*******************************************************************/
% Given a node, assert clauses for each of its offspring.
% disassemble_tree(tree(Node,[])) :-
%       assertz(offspring(Node,[])).

disassemble_tree(tree(Node,Descendants)) :-
        disassemble_tree_aux(Node,Descendants).

disassemble_tree_aux(_Node,[]).

disassemble_tree_aux(Node,[tree(OffspringNode,Desc)|Rest]) :-
        % Assert a clause for this Node and OffspringNode.
        assertz(offspring(Node,OffspringNode)),
        % Treat tree(OffspringNode,Desc) as a tree node in its own right
        disassemble_tree(tree(OffspringNode,Desc)),
        % Process the Rest of the descendants of Node
        disassemble_tree_aux(Node,Rest).

/*******************************************************************/
assemble_tree(tree(Node,Desc)) :-
        mybagof(Child,offspring(Node,Child),Children),
        assemble_tree_aux(Children,Desc).

assemble_tree_aux([],[]).

assemble_tree_aux([ThisChild|RestChildren],[tree(ThisChild,ThisDesc)|RestDesc]) :-
        assemble_tree(tree(ThisChild,ThisDesc)),
        assemble_tree_aux(RestChildren,RestDesc).

/*******************************************************************/
clean_up(rule_a) :-
        ( succ_msg(_) -> abolish(succ_msg/1); true),
        ( transferee_scope(_) -> abolish(transferee_scope/1); true),
```

```
                    ( remaining_nodes(_) -> abolish(remaining_nodes/1); true).
clean_up(rule_b) :-
        clean_up(rule_a).

/***********************************************************************/
/*************************** RULE C ************************************/
/***********************************************************************/
% Given a node in which an element other than the first is a "head"
% block, partition the node into two nodes such that all the elements
% preceding the head block comprise the first node and the rest
% comprise the second. The two new nodes will be siblings which
% together will replace the node from which they sprang. Descendants
% of the original node will belong to the second partition. Apply the
% rule recursively to the second new node until the original node is
% completely partitioned into sublists each beginning with a "head",
% possibly excepting the first.

/***********************************************************************/
rule_c_super(tree(Node,Descendants),tree(Node,NewDesc)) :-
        rule_c_desc(Descendants,NewDesc).

/***********************************************************************/
% rule_c_node(tree(N,D),[tree(N1,[]),tree(N2,[]),...,tree(Nn,D)].

% The node has a single element.
% Return that element enclosed in a list.
rule_c_node(tree(Node,Descendants),[tree(Node,NewDesc)]) :-
        length(Node,1),
        rule_c_desc(Descendants,NewDesc).

% The node has more than one element.
% Split the elements into head-body sequences via rule_c_node_split.
% Then using rule_c_node_graft, create a list of sibling nodes from the
% sequences in place of the original node. All but the last sibling are
% terminal nodes and the last gets the original descendants, as modified
% by rule_c_desc.
rule_c_node(tree(Node,Descendants),NewNodeEnvironment) :-
        % Split the elements of the Node itself.
        rule_c_node_split(Node,PartitionedNode),
        rule_c_desc(Descendants,NewDesc),
        % Create a terminal node for each partition but the last.
        % Attach the Descendants of the original Node to the last new node.
        rule_c_node_graft(PartitionedNode,NewDesc,NewNodeEnvironment).

/***********************************************************************/
% Given a list of partitioned node sequences and a list of Descendents,
% make each but the last into a terminal node and make the last into a node
% with Descendants.

rule_c_node_graft([LastPartition],Descendants,[tree(LastPartition,Descendants)]).

rule_c_node_graft([Hpartition|Tpartition],Descendants,[tree(Hpartition,[])|Tnewnode]) :-
        rule_c_node_graft(Tpartition,Descendants,Tnewnode).

/***********************************************************************/
% Once we have reached the stage of applying rule_c, associations of blocks
% with one another have been established, so rule lines, which were used
% for the association process, can be eliminated as they play no further
% functional role. A rule line is represented as a 'head' block with a Ysize of 1.
% elim_rule_lines(NodeIn,NodeOut).

% End of list.
elim_rule_lines([],[]).

% The block in hand is a rule line. Do not retain it.
elim_rule_lines([(ID,head)|TblockIn],TblockOut) :-
        block(ID,head,_X,_Y,_Xsize,1),
        elim_rule_lines(TblockIn,TblockOut).
```

| Mar 11 1993 19:04:25 | xform_geom_tree.pl | Page 6 |

```prolog
% The block in hand is a normal block. Retain it.
elim_rule_lines([Hblock|TblockIn],[Hblock|TblockOut]) :-
        elim_rule_lines(TblockIn,TblockOut).

/*****************************************************************/
% Given the list of "head" and "body" blocks which comprise a node, partition
% it into sequences which begin with a "head", possibly excepting the first.
rule_c_node_split([],[]).

rule_c_node_split([H|Tin],[[H|T1]|Rest]) :-
        % Partition the elements of the node
        rule_c_node_split_aux(H,Tin,T1,T2),
        rule_c_node_split(T2,Rest).

% rule_c_node_split_aux(InList,OutList1,OutList2).
% No "head" was encountered at all
rule_c_node_split_aux((_,_),[],[],[]).

% As long as the elements are "body", put them
% in the first list.
rule_c_node_split_aux((_,_),[(ID,body)|Tin],[(ID,body)|Tout1],OutList2) :-
        rule_c_node_split_aux((_,body),Tin,Tout1,OutList2).

% We have encountered a "head", but the previous element
% was also a "head". Put it in the first list and keep going.
rule_c_node_split_aux((_,head),[(ID,head)|Tin],[(ID,head)|Tout1],OutList2) :-
        rule_c_node_split_aux((_,head),Tin,Tout1,OutList2).

% We have encountered a "head" and the preceding element was a "body".
rule_c_node_split_aux((_,body),OutList2,[],OutList2).

/*****************************************************************/
% Apply rule c to each node in a descendant list, which results in each
% node being transformed into a list of sibling nodes, and append them
% together to get the transformed descendant list.
rule_c_desc([],[]).

rule_c_desc([Hin|Tin],NewDesc) :-
        % Hout will now be a list of elements of the form tree(Node,Desc)
        % so we must append it to the list of elements in Tout.
        % That is to say the list of descendants being processed will
        % in general have more elements in it after processing and we
        % must ensure the correct structure.
        rule_c_node(Hin,Hout),
        rule_c_desc(Tin,Tout),
        (Tout = []
            -> NewDesc = Hout
        ;   append(Hout,Tout,NewDesc)).

/*****************************************************************/
/************************** RULE D *******************************/
/*****************************************************************/

% In all clauses the focus is on the list of elements
% comprising Node. Each element is an ordered pair
% (ID, Hierarchical Class) where Hierarchical Class
% is either "head" or "body".

% Because the other rules (rule a, rule b, and rule c) will already have
% been applied, we should only encounter a "head" sequence at the front
% of the node. If we do find such a sequence, then partition the node
% into the "head" sequence and a child node of all the "body" blocks.

rule_d_super(tree(Node,Descendants),tree(Node,NewDescendants)) :-
        rule_d(Descendants,NewDescendants).

% Clause 1
rule_d([],[]).
```

| Mar 11 1993 19:04:25 | xform_geom_tree.pl | Page 7 |

```prolog
% Clause 2
% The first and only element is a "head".
% Just go on.
rule_d([tree([(ID,head)],Descendants)|RestIn],[tree([(ID,head)],NewDesc)|RestOut]) :-
        rule_d(Descendants,NewDesc),
        rule_d(RestIn,RestOut).

% Clause 3
% The initial sequence is at least one "head".
% It is followed by at least one "body".
% Make the remaining elements into a child node of the "head" node.
rule_d([tree([(ID,head)|RestNode],Descendants)|RestIn],[tree(Heads,[tree(Bodies,NewDescendants)
])|RestOut]) :-
        head_body_partition([(ID,head)|RestNode],Heads,Bodies),
        Bodies \== [],
        rule_d(Descendants,NewDescendants),
        rule_d(RestIn,RestOut).

% Clause 4
% The node is all "heads". Leave it alone.
rule_d([tree([(ID,head)|RestNode],Descendants)|RestIn],[tree([(ID,head)|RestNode],NewDescendant
s)|RestOut]) :-
        head_body_partition([(ID,head)|RestNode],_Heads,Bodies),
        Bodies = [],
        rule_d(Descendants,NewDescendants),
        rule_d(RestIn,RestOut).

% Clause 5
% The node does not start with a "head".
rule_d([tree(Node,Descendants)|RestIn],[tree(Node,NewDesc)|RestOut]) :-
        rule_d(Descendants,NewDesc),
        rule_d(RestIn,RestOut).

/*********************************************************************/
% Assumes that any initial sequence of "head" blocks will be followed
% by a sequence containing only "body" blocks.

head_body_partition([(ID,head)|RestIn],[(ID,head)|RestHeads],Bodies) :-
        !,
        head_body_partition(RestIn,RestHeads,Bodies).

head_body_partition(Bodies,[],Bodies) :-
        !.

/*********************************************************************/
/*********************************************************************/
/******************** AUXILIARY PROCEDURES *************************/
/*********************************************************************/
/*********************************************************************/

% Take elements from InList as long as they are "body" blocks.
% Quit as soon as the sequence is broken.
% transferees(rule_a,_,InList,OutList)
% Second argument is not needed if first argument is 'rule_a'.

transferees(rule_a,_,[],[]).

transferees(rule_a,_,[(BlockID,body)|RestIn],[(BlockID,body)|RestOut]) :-
        !,
        transferees(rule_a,_,RestIn,RestOut).

transferees(rule_a,_,_InList,[]) :-
        !.

/***********************************************************************
```

| Mar 11 1993 19:04:25 | xform_geom_tree.pl | Page 8 |

```prolog
% Take elements from InList as long as they are "head" blocks.
% When a "body" block is encountered take it, but then stop.
% The second argument carries the value of NodeClass for the
% last element in the Node which will receive the transferees,
% if any. If that NodeClass is not 'head', then we return [].
% transferees(rule_b,head,InList,OutList)

% The entire list was usable.
transferees(rule_b,head,[],[]).

% The current element is a "head"; use it.
transferees(rule_b,head,[(BlockID,head)|RestIn],[(BlockID,head)|RestOut]) :-
        transferees(rule_b,head,RestIn,RestOut).

% We have encountered a "body"; take it and stop.
transferees(rule_b,head,[H|_],[H]).

transferees(rule_b,body,_,[]).

/***********************************************************************/
% The second argument carries the value of NodeClass for the
% last element in the Node which will receive the transferee,
% if any. If that NodeClass is not 'head', then we return [].
% We transfer at most the head of InList.
% transferees(rule_b,head,InList,OutList).

% If the last element of the first list was a head, take the next
% element.
transferees(rule_b,head,[H|_],[H]).

% If the last element of the first list was a body, don't transfer any
% elements.
transferees(rule_b,body,_,[]).

/***********************************************************************/
/***********************************************************************/
/********************        UTILITIES        **************************/
/***********************************************************************/
/***********************************************************************/
print_titled_tree(Title,Tree) :-
        write(Title),
        nl,
        print_tree(Tree,0),
        nl.

% tree(Node,Descendants) has already been defoliated; i.e., each node
% is expressed in the short form (BlockID,HB). Simply hand it off to
% print_tree_aux which does the real work.
print_tree(tree(Node,Descendants),Indent) :-
        Node = [H|_],
        functor(H,',',2),
        print_tree_aux(tree(Node,Descendants),Indent).

% Tree has not been defoliated, so strip it before handing it
% off to print_tree_aux which does the real work.
print_tree(Tree,Indent) :-
        defoliate(Tree,BareTree),
        print_tree_aux(BareTree,Indent).

print_tree_aux(tree(Node,Descendants),Indent) :-
        print_node(Node,Indent),
        nl,nl,
        NewIndent is Indent + 4,
        print_descendants(Descendants,NewIndent).

print_node(Node,Indent) :-
        tab_to(Indent),
        write_node_list(Node).
        % write_list(h,Node).
```

| Mar 11 1993 19:04:25 | xform_geom_tree.pl | Page 9 |

```prolog
print_descendants([],_Indent).

print_descendants([H|T],Indent) :-
        functor(H,tree,2),
        tab_to(Indent),
        print_tree_aux(H,Indent),
        print_descendants(T,Indent).

write_node_list([]).

write_node_list([(HID,HHB)|T]) :-
        write(HID),
        write('-'),
        write(HHB),
        write(' '),
        write_node_list(T).

/**********************************************************************/
index_tree(tree(Node,Descendants),tree([NewIndex|Node],IndexedDescendants)) :-
        retract(tree_index(Index)),
        NewIndex is Index + 1,
        assert(tree_index(NewIndex)),
        index_descendants(Descendants,IndexedDescendants).

/**********************************************************************/
%stack_tree(tree(Node,Descendants),CurrNodeStack,FinalNodeStack).
% Must call with second argument [].
% Produces a list of the nodes in the tree in stack order.
% Each node is annotated as to whether it is terminal or nonterminal.
stack_tree(tree(Node,[]),NodeStack,FinalNodeStack) :-
        stack_desc([],[(Node,[])|NodeStack],FinalNodeStack).

stack_tree(tree(Node,Descendants),NodeStack,FinalNodeStack) :-
        stack_desc(Descendants,[(Node,heirs)|NodeStack],FinalNodeStack).

stack_desc([],FinalNodeStack,FinalNodeStack).

stack_desc([H|T],NodeStack,FinalNodeStack) :-
        stack_tree(H,NodeStack,NewNodeStack),
        stack_desc(T,NewNodeStack,FinalNodeStack).

/**********************************************************************/
% Determines whether every block in a list comprising a node
% is a body.

all_body([]).

all_body([(_ID,body)|Rest]) :-
        all_body(Rest).

/**********************************************************************/
index_descendants([],[]).

index_descendants([Hin|Tin],[Hout|Tout]) :-
        functor(Hin,tree,2),
        index_tree(Hin,Hout),
        index_descendants(Tin,Tout).

index_descendants([_Hin|Tin],[_Hout|Tout]) :-
        index_descendants(Tin,Tout).

/**********************************************************************/
% The tree is represented by the structure
% tree(Node,ListOfDescendants)
```

```
Mar 11 1993 19:04:25          xform_geom_tree.pl                    Page 10

% If the ListOfDescendants is null, then node is
% a terminal node, so print it out.

terminal_nodes(tree(Node,[])) :-
        write_node_list(Node),
        nl.

terminal_nodes(tree(_Node,Descendants)) :-
        terminal_nodes_aux(Descendants).

terminal_nodes_aux([]).

terminal_nodes_aux([H|T]) :-
        terminal_nodes(H),
        terminal_nodes_aux(T).

/************************************************************************/
% The structure of a node is a list of ordered pairs.
% Each ordered pair is (BlockID,BlockClass).

% tree([d],[tree([a,b,c],[]),tree([e,f],[])])

list_of_nodes(tree(Node,Descendants),NodesList) :-
        list_of_nodes_aux(tree(Node,Descendants),[],ReversedNodesList),
        rev(ReversedNodesList,NodesList).

list_of_nodes_aux(tree(Node,Descendants),InList,FinalList) :-
        list_of_desc_nodes(Descendants,[Node|InList],FinalList).

list_of_desc_nodes([],FinalList,FinalList).

list_of_desc_nodes([H|T],InList,FinalList) :-
        list_of_nodes_aux(H,InList,NewList),
        list_of_desc_nodes(T,NewList,FinalList).
```

What is claimed is:

1. A method for analyzing a digital image of a document page, comprising the steps of:

detecting and removing one or more lines from the digital image, if any are present;

segmenting the line-removed image into one or more coarse blocks;

performing run-length smoothing on the coarse blocks;

performing connected component analysis on each of the smoothed coarse blocks to produce at least one connected component;

determining a bounding box for each of the connected components;

merging any overlapping bounding boxes to produce one or more finer blocks;

finding the block features of the digital image;

finding the page features of the digital image;

creating a geometric structure tree for the digital image;

said step of creating further comprising:
   a) grouping the coarse blocks produced by said segmenting step into horizontal bands;
   b) first determining column boundaries of each of the horizontal bands;
   c) assigning finer blocks produced by the merging step to the horizontal bands;
   d) second determining a geometric structure tree for all of the finer blocks in each of the horizontal bands;
   e) merging the geometric structure trees producesd by the second determining step; and logically transforming the geometric structure to produce a rearranged page image arranged in a proper reading order.

2. A method as defined in claim 1 wherein the second determining step comprises the steps of:

identifying which of the finer blocks, produced by the merging step, are column-aligned or non-column aligned;

creating a column-aligned geometric structure tree for the column-aligned finer blocks;

creating a non-column aligned geometric structure tree for the non-column aligned finer blocks; and combining the non-column aligned geometric tree with the column-aligned geometric tree.

3. A method as defined in claim 2 wherein said step of creating the column-aligned geometric structure tree comprises the steps of:

creating a synthetic block which spans the top of the digital image and has zero height;

defining the synthetic block as the root node; and finding the children of the root node.

4. A method as defined in claim 2 wherein said step of creating the non-column aligned geometric structure tree comprises the steps of:

creating a synthetic block which spans the top of the digital image and has zero height;

defining the synthetic block as the root node; and finding the children of the root node.

5. The method as defined in claim 1 wherein said segmenting step comprises an X-Y tree segmentation.

* * * * *